US012612531B2

(12) United States Patent
Yazdani-Ahmadabadi et al.

(10) Patent No.: US 12,612,531 B2
(45) Date of Patent: Apr. 28, 2026

(54) POLYMERIC BINDER AND HIGH MOLECULAR WEIGHT POLYMER ANTIFOULING COMPOSITIONS

(71) Applicant: The University of British Columbia, Vancouver (CA)

(72) Inventors: Hossein Yazdani-Ahmadabadi, Vancouver (CA); Kai Yu, Vancouver (CA); Dirk Lange, Vancouver (CA); Jayachandran Kizhakkedathu, New Westminster (CA)

(73) Assignee: The University of British Columbia, Vancouver (CA)

( * ) Notice: Subject to any disclaimer, the term of this patent is extended or adjusted under 35 U.S.C. 154(b) by 814 days.

(21) Appl. No.: 17/793,907

(22) PCT Filed: Feb. 19, 2021

(86) PCT No.: PCT/CA2021/050195
§ 371 (c)(1),
(2) Date: Jul. 19, 2022

(87) PCT Pub. No.: WO2021/163811
PCT Pub. Date: Aug. 26, 2021

(65) Prior Publication Data

US 2023/0132202 A1 Apr. 27, 2023

Related U.S. Application Data

(60) Provisional application No. 62/979,558, filed on Feb. 21, 2020.

(51) Int. Cl.
*C09D 133/26* (2006.01)
*C08K 3/28* (2006.01)
*C08L 33/26* (2006.01)
*C09D 5/14* (2006.01)
*C09D 5/16* (2006.01)
*C09D 179/02* (2006.01)

(52) U.S. Cl.
CPC .............. *C09D 133/26* (2013.01); *C08K 3/28* (2013.01); *C08L 33/26* (2013.01); *C09D 5/14* (2013.01); *C09D 5/16* (2013.01); *C09D 179/02* (2013.01)

(58) Field of Classification Search
CPC .......... C08L 33/24; C08L 33/26; C08L 79/02; C09D 133/24; C09D 133/26; C09D 179/02; C09D 5/14; C09D 5/1625; C09D 5/1637; C09D 5/1668
See application file for complete search history.

(56) References Cited

U.S. PATENT DOCUMENTS

2009/0036611 A1* 2/2009 Wilker .................. C08F 212/26 525/328.5

FOREIGN PATENT DOCUMENTS

| | | |
|---|---|---|
| CN | 110693851 | 1/2022 |
| WO | WO2011005258 | 1/2011 |
| WO | WO2016187698 | 12/2016 |

OTHER PUBLICATIONS

Asha et al; (2019) "Rapid Mussel-Inspired Surface Zwitteration for Enhanced Antifouling and Antibacterial Properties," Langmuir 35: 1621-1630.

Gao et al; (2019) "pH-Responsive Dual Drug-Loaded Nanocarriers Based on Poly (2-Ethyl-2-Oxazoline) Modified Black Phosphorus Nanosheets for Cancer Chemo/Photothermal Therapy," Frontiers in Pharmacology, 10(270): 1-14.

Mei et al; (2018) "Polymer-Nanopartocle Interaction as a Design Principle in the Development of a Durable Ultrathin Universal Binary Antibiofilm Coating with Long-Term Activity," ACS Nano, 12: 11881-11891.

Svoboda et al; (2019) "Poly(2-ozazoline)s One-Pot Ploymerization and Surface Coating: From Synthesis to Antifouling Properties Out-Performing Poly(ethylene oxide)," Biomacromolecules, 20: 3453-3463.

Albright et al; (2017) "Self-Defensive Antibiotic-Loaded Layer-by-Layer Coatings: Imaging of Localized Bacterial Acidification and pH-Ttriggering of Antibiotic Release," Acta Biomaterialia, 61: 66-74.

Atefyekta et al; (2019) "Antibiofilm Elastin-Like Polypeptide Coatings: Functionality, Stability, and Selectivity," Acta Biomaterialia, 83: 245-256.

Blanco et al; (2014) "Building an Antifouling Zwitterionic Coating on Urinary Catheters Using an Enzymatically Triggered Bottom-Up Approach," ACS Applied Materials & Interfaces, 6(14): 11385-11393.

Cheng et al; (2009) "Zwitterionic Carboxybetaine Polymer Surfaces and their Resistance to Long-Term Biofilm Formation," Biomaterials, 30(28): 5234-5240.

Chen et al; (2015) "Antibacterial Surgical Silk Sutures Using a High-Performance Slow-Release Carrier Coating System," ACS Applied Materials & Interfaces, 7(40): 22394-22403.

Cheng et al; (2017) "Mussel-Inspired Multifunctional Hydrogel Coating for Prevention of Infections and Enhanced Osteogenesis," ACS Applied Materials & Interfaces, 9(13): 11428-11439.

Choudhary et al; (2019) "Bio-Reduced Graphene Oxide as a Nanoscale Antimicrobial Coating for Medical Devices," Acs Omega, 4(1): 387-397.

(Continued)

*Primary Examiner* — Kregg T Brooks

(74) *Attorney, Agent, or Firm* — Rudy J. Ng; Bozicevic, Field & Francis LLP

(57) ABSTRACT

Provided herein are compositions including polymeric binder or a salt thereof, high molecular weight polymer, pharmaceutically active agent and a low molecular weight cross-linking agent, methods for using the compositions to coat a substrate, and methods for making the compositions. Alternatively, the composition may include a polymeric binder or a salt thereof, high molecular weight polymer and a pharmaceutically active agent. In particular, the substrate may form part of an apparatus on which it would be beneficial to limit biofouling and/or protein binding.

21 Claims, 34 Drawing Sheets

(56) References Cited

OTHER PUBLICATIONS

Diefenbeck et al; (2016) "Gentamicin Coating of Plasma Chemical Oxidized Titanium Alloy Prevents Implant-Related Osteomyelitis in Rats," Biomaterials, 101: 156-164.
Dreyer et al; (2012) "Elucidating the structure of Poly (Dopamine)," Langmuir, 28(15): 6428-6435.
Escobar et al; (2019) "Antibacterial Mesoporous Titania Films with Embedded Gentamicin and Surface Modified with Bone Morphogenetic Protein 2 to Promote Osseointegration in Bone Implants," Advanced Materials Interfaces, 6(9): 1801648, 12 pages.
Escobar et al; (2019) "Antibacterial Layer-by-Layer Films of Poly (Acrylic Acid)—Gentamicin Complexes with a Combined Burst and Sustainable Release of Gentamicin," Advanced Materials Interfaces, 6(22): 1901373, 9 pages.
Franco et al; (2019) "Antimicrobial Coating of Spider Silk to Prevent Bacterial Attachment on Silk Surgical Sutures," Acta Biomaterialia, 99: 236-246.
Gomez-Carretero et al; (2017) "Electroenhanced Antimicrobial Coating Based on Conjugated Polymers with Covalently Coupled Silver Nanoparticles Prevents *Staphylococcus aureus* Biofilm Formation" Advanced Healthcare Materials, 6(20): 1700435, 10 pages.
Han et al; (2017) "Electrophoretic Deposition of Gentamicin-Loaded Silk Fibroin Coatings on 3D-Printed Porous Cobalt-Chromium-Molybdenum Bone Substitutes to Prevent Orthopedic Implant Infections," Biomacromolecules, 18(11): 3776-3787.
He et al; "Design of Antibacterial Poly (Ether Sulfone) Membranes via Covalently Attaching Hydrogel Thin Layers Loaded with Ag Nanoparticles" ACS Applied Materials & Interfaces 9.19 (2017): 15962-15974.
Hong et al; (2012) "Non-Covalent Self-Assembly and Covalent Polymerization Co-Contribute to Polydopamine Formation," Advanced Functional Materials, 22(22): 4711-4717.
Huang et al; (2015) "Conjugation of Hyaluronic Acid onto Surfaces via the Interfacial Polymerization of Dopamine to Prevent Protein Adsorption," Langmuir, 31(44): 12061-12070.
Ivanova et al; (2015) "Quorum-Quenching and Matrix-Degrading Enzymes in Multilayer Coatings Synergistically Prevent Bacterial Biofilm Formation on Urinary Catheters," ACS Applied Materials & Interfaces, 7(49): 27066-27077.
Keum et al; (2017) "Prevention of Bacterial Colonization on Catheters by a One-Step Coating Process Involving an Antibiofouling Polymer in Water," ACS Applied Materials & Interfaces, 9(23): 19736-19745.
Kurowska et al; (2017) "A Simultaneously Antimicrobial, Protein-Repellent, and Cell-Compatible Polyzwitterion Network," Biomacromolecules, 18(4): 1373-1386.
Kwon et al; (2017) "Zwitterionic Sulfobetaine Polymer-Immobilized Surface by Simple Tyrosinase-Mediated Grafting for Enhanced Antifouling Property," Acta Biomaterialia, 61: 169-179.
Lim et al; (2015) "Development of a Catheter Functionalized by a Polydopamine Peptide Coating with Antimicrobial and Antibiofilm Properties" Acta Biomaterialia, 15: 127-138.
Liu et al; (2014) "Dopamine-Assisted Deposition of Dextran for Nonfouling Applications," Langmuir, 30(11): 3118-3126.
López et al; (2019) "Preventing *S. aureus* Biofilm Formation on Titanium Surfaces by the Release of Antimicrobial B-Peptides from Polyelectrolyte Multilayers," Acta Biomaterialia, 93: 50-62.
Mishra et al; (2017) "Design and Surface Immobilization of Short Anti-Biofilm Peptides," Acta Biomaterialia, 49: 316-328.
Mohan et al; (2019) "Highly Protein Repellent and Antiadhesive Polysaccharide Biomaterial Coating for Urinary Catheter Applications," ACS Biomaterials Science & Engineering, 5(11): 5825-5832.
Pandit et al; (2018) "Vertically Aligned Graphene Coating is Bactericidal and Prevents the Formation of Bacterial Biofilms," Advanced Materials Interfaces, 5(7): 1701331, 9 pages.
Pant et al; (2017) "A multi-defense strategy: Enhancing bactericidal activity of a medical grade polymer with a nitric oxide donor and surface-immobilized quaternary ammonium compound," Acta Biomaterialia, 58: 421-431.
Peng et al; (2019) "Structure-Activity Study of Antibacterial Poly (Ester Urethane)s With Uniform Distribution of Hydrophobic and Cationic Groups," Biomacromolecules, 20(4): 1675-1682.
Sadrearhami et al; (2019) "Antibiofilm Nitric Oxide-Releasing Polydopamine Coatings," ACS Applied Materials & Interfaces, 11(7): 7320-7329.
Sundaram et al; (2014) "Achieving One-Step Surface Coating of Highly Hydrophilic Poly (Carboxybetaine Methacrylate) Polymers on Hydrophobic and Hydrophilic Surfaces," Advanced Materials Interfaces, 1(6): 1400071, 20 pages.
Vaterrodt et al; (2016) "Antifouling and antibacterial multifunctional polyzwitterion/enzyme coating on silicone catheter material prepared by electrostatic layer-by-layer assembly," Langmuir, 32(5): 1347-1359.
Wang et al; (2015) "Antifouling coating with controllable and sustained silver release for long-term inhibition of infection and encrustation in urinary catheters," Journal of Biomedical Materials Research Part B: Applied Biomaterials, 103(3): 519-528.
Wang et al; (2016) "A Zwitterionic Macro-Crosslinker for Durable Non-Fouling Coatings," Chemical Communications 52(25): 4671-4674.
Wang et al; (2018) "Construction of High Drug Loading and Enzymatic Degradable Multilayer Films for Self-Defense Drug Release and Long-Term Biofilm Inhibition," Biomacromolecules, 19(1): 85-93.
Watson et al; (2019) "A simple model for binding and rupture of bacterial cells on nanopillar surfaces," Advanced Materials Interfaces, 6(10): 1801646, 8 pages.
Wei et al; (2016) "A Smart Antibacterial Surface for the On-Demand Killing and Releasing of Bacteria," Advanced Healthcare Materials, 5(4): 449-456.
Wu et al; (2017) "Active Antibacterial and Antifouling Surface Coating via a Facile One-Step Enzymatic Cross-Linking," Biomacromolecules, 18(1): 210-216.
Xu et al; (2017) "Inhibition of Bacterial Adhesion and Biofilm Formation by Dual Functional Textured and Nitric Oxide Releasing Surfaces," Acta Biomaterialia, 51: 53-65.
Xu et al; (2019) "Blood Coagulation Response and Bacterial Adhesion to Biomimetic Polyurethane Biomaterials Prepared with Surface Texturing and Nitric Oxide Release," Acta Biomaterialia, 84: 77-87.
Xue et al; (2018) "Anti-Infective Biomaterials with Surface-Decorated Tachyplesin I," Biomaterials 178: 351-362.
Yan et al; (2016) "Hierarchical Polymer Brushes with Dominant Antibacterial Mechanisms Switching from Bactericidal to Bacteria Repellent," Biomacromolecules, 17(5): 1696-1704.
Yan et al; (2016) "Nonleaching Bacteria-Responsive Antibacterial Surface Based on a Unique Hierarchical Architecture," ACS Applied Materials & Interfaces, 8(37): 24471-24481.
Yong et al; (2018) "Conformal Hydrogel Coatings on Catheters to Reduce Biofouling," Langmuir, 35(5): 1927-1934.
Yu et al; (2017) "Anti-Adhesive Antimicrobial Peptide Coating Prevents Catheter Associated Infection in a Mouse Urinary Infection Model," Biomaterials, 116: 69-81.
Yu et al; (2018) "Water-Insoluble Polymeric Guanidine Derivative and Application in the Preparation of Antibacterial Coating of Catheter," ACS Applied Materials & Interfaces, 10(45): 39257-39267.
Yu et al; (2019) "Facile Surface Multi-Functionalization of Biomedical Catheters with Dual-Microcrystalline Broad-Spectrum Antibacterial Drugs and Antifouling Poly (Ethylene Glycol) or Effective Inhibition of Bacterial Infections," ACS Applied Bio Materials, 2(3): 1348-1356.
Yuan et al; (2019) "Substrate-Independent Coating with Persistent and Stable Antifouling and Antibacterial Activities to Reduce Bacterial Infection for Various Implants," Advanced Healthcare Materials, 8(8): 1801423, 9 pages.
Zhang et al; (2012) "Assembly of Poly (Dopamine) Films Mixed with a Nonionic Polymer," Langmuir, 28(51): 17585-17592.
Zhang et al; (2017) "Biofilm Inhibition and Elimination Regulated by Cationic Conjugated Polymers," ACS Applied Materials & Interfaces, 9(20): 16933-16938.

(56) References Cited

OTHER PUBLICATIONS

Zhang et al; (2019) "Antimicrobial Peptide-Conjugated Hierarchical Antifouling Polymer Brushes for Functionalized Catheter Surfaces," Biomacromolecules, 20(11): 4171-4179.
Zhao et al; (2011) "Synthesis and Characterization of Poly (N-Hydroxyethylacrylamide) for Long-Term Antifouling Ability," Biomacromolecules, 12(11): 4071-4079.
Zhou et al; (2017) "In Vivo Anti-Biofilm and Anti-Bacterial Non-Leachable Coating Thermally Polymerized on Cylindrical Catheter," ACS Applied Materials & Interfaces, 9(41): 36269-36280.
Zhuk et al; (2014) "Self-Defensive Layer-by-Layer Films with Bacteria-Triggered Antibiotic Release." ACS Nano, 8(8): 7733-7745.
Barclay et al., (2017) "Versatile Surface Modification Using Polydopamine and Related Polycatecholamines: Chemisyrt, Structure, and Applications," Adv. Mater Interfaces, 4(19): 1-38.
Jiang et al., (2013) "Antifouling and Antimicrobial Polymer Membranes Based on Bioinspired Polydopamine and Strong Hydrogen-Bonded Poly ( N -Vinyl pyrrolidone)," ACS Applied Materials and Interfaces, 5(24): 12895-12904.
Ryu et al., (2018) "Polydopamine Surface Chemistry: a Decade of Discovery," ACS Appl. Mater Interfaces, 10: 7523-7540.

* cited by examiner (c)

(d)

(e)

(d)

(e)

(g)

(h)

(a)

(b)

(c)

(d)

(e)

(c)

(d)

(a)

(b)

POLYMERIC BINDER AND HIGH MOLECULAR WEIGHT POLYMER ANTIFOULING COMPOSITIONS

CROSS REFERENCE TO RELATED APPLICATION

This application claims the benefit of U.S. Provisional Patent Application Ser. No. 62/979,558 filed on 21 Feb. 2020, entitled "POLYMERIC BINDER AND HIGH MOLECULAR WEIGHT POLYMER ANTIFOULING COMPOSITIONS".

TECHNICAL FIELD

The present invention relates to catechol polymer and catechol derivative polymer coating field. In particular, the invention relates to catechol polymers or catechol derivative polymers in combination with certain high molecular weight polymers, pharmaceutically active agent and a cross-linking agent to form compositions, to provide methods for making the compositions and to provide uses for the compositions.

BACKGROUND

In an aging society, medical devices are increasingly used to improve a patients' quality of life and to extend their life expectancy. For example, intravascular catheters are used to deliver fluids or drugs into bloodstream, and urinary catheters are used to drain waste fluids from the body. In spite of their extensive use, medical devices, such as catheters, are associated with two major challenges: thrombus formation and biofouling or biofilm formation. When such a medical device is inserted into the body of a living organism, a cascade of events is initiated, including protein adsorption, platelet adhesion and activation, complement protein binding and activation, cellular activation, and cellular attachment on the device surface. These events may initiate host response to the device including the initiation of the coagulation cascade and an inflammatory response leading the formation thrombus and cell attachment on the device surface. In addition, devices having a hydrophobic surface may provide an initial attachment site for microorganisms, which may attach and grow on the device surface and form microbial biofilms. When such microbial growth and/or thrombus formation occurs in an already immune-compromised patient, this may lead to elongated treatment times or even death.

Although various polymer coatings have shown significant advantages as antifouling coatings, it has proven challenging to translate the techniques that have been developed on model surfaces to real world biomedical plastics. For example, many commercially available biomedical devices consist of undefined polymeric components, and it is challenging to apply one coating method to all the polymeric devices. Many of the current coating technologies do not meet all the criteria needed for the translation to medical devices, including the prevention of thrombus and biofilm formation, adaptation to multiple materials and surfaces, easy application of the coating to devices of various sizes and shapes and materials, stability of the coating, and economic feasibility.

Mussel-inspired catechol surface chemistry provides numerous strategies that have been used to develop and generate bio-inert coatings on device surfaces. Dopamine and its derivatives mimic the composition of mussel foot proteins, forming surface-adherent coatings on a wide array of materials. One strategy endowed different substrates with antifouling functions via post-modification of polydopamine (PDA) by attaching a reactive PDA layer on the surface and then reacting the functionalized hydrophilic polymers with the PDA layer via the thiol or amino groups on the hydrophilic polymers. Using this method, PDA coatings have been post-modified with functionalized polyethylene glycol, hyperbranched polyglycerol, zwitterionic polymers, and zwitterionic peptide, leading to a significant reduction of protein adsorption and cell adhesion. However, one limitation of these types of coatings is that they are very thin and lack long-term antifouling properties. Another strategy utilizes the anchoring and crosslinking properties of the catechol modality to develop antifouling coatings. In this case, polymer-catechol conjugates were utilized for the generation of an antifouling layer on a surface. Various non-fouling polymers were conjugated with catechol groups, and these conjugates were successful for developing coating surfaces[1]. However, the majority of these systems were only able to introduce a low density of catechol groups in the structure due to solubility issues. Such conjugates showed poor coating ability on polymeric materials due to lack of intermolecular crosslinking. Hence, it is challenging to coat hydrophilic polymers onto different surfaces with optimized thickness via a simple dipping process.

The exact mechanism of dopamine polymerization has not yet been clearly demonstrated. Some groups have suggested that PDA results from covalent bonding[2], while others suggest a supramolecular aggregate of monomer that are held together through a combination of charge transfer, a-stacking and hydrogen bonding interactions[3].

Current antifouling polymeric coatings including polymer brushes grown from the surface, adsorbed polymer layers, cross-linked networks/hydrogels and multi-layer assemblies on the surface have not provided long-term protection from biofilm formation on devices (i.e. ~4 weeks) due to alteration of coating stability, limited surface coverage and bacterial adaptation to biologically non-active polymer structures[4-16]. Coating surfaces with antibiotics, antimicrobial peptides, quaternary ammonium containing molecules/polymers or nanopillar surfaces, which kill bacteria upon contact have also been tested, however, fouling of contact-killing surfaces with deposition of proteins and dead bacteria reduces their long-term activity. In addition, the conjugation of antibiotics or antimicrobial peptides to the surfaces is shown to decrease their activity[17-36].

Sustained release coatings or on demand coatings containing antimicrobial agents is another approach which have been extensively investigated. These include the controlled release of antibiotics, nitrous oxide and antimicrobial peptides[37-52]. Given the fact that these coatings release antimicrobial agents in their native form, the activity of such coatings is more than that of the covalently attached coatings. However, due to diverse chemical functionalities of antimicrobial agents, their sophisticated interactions with the coating, difficulty in incorporation of such agents in the coating and the specificity of such coatings to a very narrow range of biomedical materials (often only a single one), the generation of a sustainable antimicrobial agent containing coating with a well-controlled release profile and long-term activity remains a challenge.

Additionally, U.S. Pat. No. 8,541,060[53] discloses the use of a surface-modifying agent (SMA), such as dopamine and other catechols, to form a polymeric coat on a substrate, WO2011/005258[54] describes the combination of PDA and amine functionalized PEG and U.S. Pat. No. 8,962,772[55] discloses a catechol layer covalently linked to a antimicrobial cationic polycarbonate. Some groups have successfully incorporated low molecular weight polyvinyl alcohol[56], biomacomolecules including Dextran[57] and, and heparin hyaluronic acid[58] onto the surface during dopamine polymerization via supramolecular interaction. Others have used catechol containing adhesive monomer dopamine methacrylamide (DMA) was copolymerized with bioinspired zwitterionic 2-methacryloyloxyethyl phosphorylcholine (MPC) monomer, and the synthesized copolymers were covalently grafted onto the amino (—$NH_2$) rich polyethylenimin (PEI)/polydopamine (PDA) codeposited surface to obtain a stable antifouling surface[11]. Also, others have produced anti-biofilm and anti-encrustation coatings using silver nanoparticle (AgNP) and polydopamine (PDA) bilayers with grafted poly(sulfobetaine methacrylate-co-acrylamide) [poly (SBMA-co-AAm)] to coat silicone urinary catheters, whereby the silver release was dependent on the number of AgNP-PDA bilayers[59]. However, the obtained surface coatings exhibited limited antifouling performance.

SUMMARY

The present invention is based, in part, on the surprising discovery that the combination of a polymeric binder as described herein with a high molecular weight polymer as described herein, an antimicrobial agent and a cross-linking agent produced a composition useful for coating a substrate. Furthermore, it was found that the particularly good results were obtained with a polyethylenimine (PEI) cross-linking agent and antimicrobial silver salts. Furthermore, those substrates, when coated showed further useful properties. In some embodiments, the polymeric binder polymeric binder is selected from: dopamine (DA); dopamine hydrochloride; and norepinephrine. In other embodiments, the high molecular weight polymer is poly (N,N-dimethylacrylamide) (PDMA) polymer. Similarly, it was surprisingly discovered that the ratio of polymeric binder to high molecular weight polymer is between 2:2 and 2:20 provides particularly good anti-fouling properties. In addition, in the compositions tested it was surprisingly discovered that using silver nitrate ($AgNO_3$) as the antimicrobial agent provided particularly good antibacterial activity in the compositions described herein. Similarly, it was surprisingly discovered that the best ranges for the high molecular weight polymer was a number average molecular weight of between ≥200 kDa and ≥1,000 kDa.

Furthermore, a particularly useful composition was a "self-limiting long-acting anti-biofilm colloidal-gel composite (SLAB-C) coating" as described herein, is applicable to diverse materials/biomedical devices via a simple one-step dip coating process and shows sustained release of silver ions at therapeutic doses over the long-term. This coating also shows excellent antibacterial efficacy and anti-biofilm activity against diverse bacterial strains, including difficult to treat multi-drug resistant bacteria over the long-term (>4 weeks) in vitro and in two separate in vivo infection models.

In accordance with one embodiment, there is provided a composition, the composition including: (a) a polymeric binder or a salt thereof, wherein a monomer of the polymeric binder has the following structure:

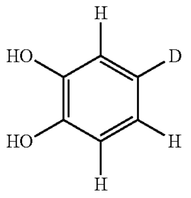

I wherein, D is selected from

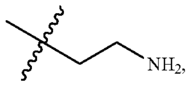,

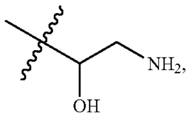,

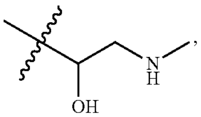,

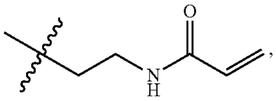,

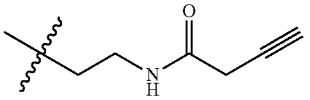 and

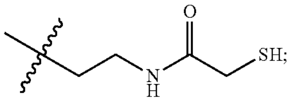;

(b) a high molecular weight polymer selected from a poly (N,N-dimethylacrylamide) (PDMA) polymer having a number average molecular weight of ≥200 kDa and a (2-ethyl-2-oxazoline) (PDXZ) polymer having a number average molecular weight of ≥200 kDa; (c) an antimicrobial agent; and (d) a low molecular weight cross-linking agent, wherein the cross linking agent that may be selected from polyethylenimine (PEI) and polyvinyl pyrrolidone (PVP), wherein the low molecular weight cross-linking agent may have a number average molecular weight of between about 0.7 kDa and about 4.0 kDa. This four component (i.e. (a)-(d)) system is used where a thicker coating would be of benefit and where longer action would be beneficial, since it allows for more pharmaceutically active agent to be incorporated when compared to the three component system described below.

In accordance with another embodiment, there is provided a composition, the composition including: (a) a polymeric binder or a salt thereof, wherein a monomer of the polymeric binder has the following structure:

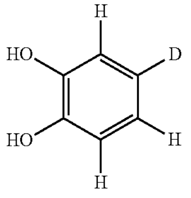

I wherein, D is selected from

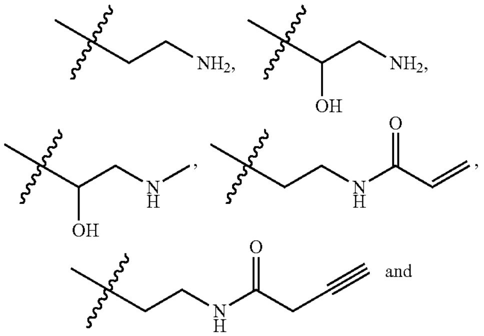

and

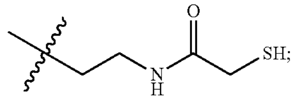

(b) a high molecular weight polymer selected from a poly (N,N-dimethylacrylamide) (PDMA) polymer having a number average molecular weight of ≥200 kDa and a (2-ethyl-2-oxazoline) (PDXZ) polymer having a number average molecular weight of ≥200 kDa; (c) a pharmaceutically active agent; and (d) a low molecular weight cross-linking agent, wherein the cross linking agent that may be selected from polyethylenimine (PEI) and polyvinyl pyrrolidone (PVP), wherein the low molecular weight cross-linking agent may have a number average molecular weight of between about 0.7 kDa and about 4.0 kDa. This four component (i.e. (a)-(d)) system is used where a thicker coating would be of benefit and where longer action would be beneficial, since it allows for more pharmaceutically active agent to be incorporated when compared to the three component system described below. The pharmaceutically active agent may be selected from one or more of: an anti-microbial agent; an anti-viral agent; an anti-fungal agent; an anti-cancer agent; an anti-inflammatory agent; an anti-fibrotic agent; and an analgesic agent. The pharmaceutically active agent may be an anti-microbial agent. The pharmaceutically active agent may be an anti-viral agent. The pharmaceutically active agent may be an anti-fungal agent. The pharmaceutically active agent may be an anti-cancer agent. The pharmaceutically active agent may be an anti-inflammatory agent. The pharmaceutically active agent may be an anti-fibrotic agent. The pharmaceutically active agent may be an analgesic agent.

In accordance with another embodiment, there is provided a composition, the composition including: (a) dopamine; (b) PDMA that may have a number average molecular weight of 800 kDa; (c) $AgNO_3$; and (d) a PEI that may have a number average molecular weight of between about 0.7 kDa and about 4.0 kDa.

In accordance with another embodiment, there is provided a composition, the composition including: (a) dopamine; (b) PDMA that may have a number average molecular weight of 925 kDa; (c) $AgNO_3$; and (d) a PEI that may have a number average molecular weight of between about 0.7 kDa and about 4.0 kDa.

In accordance with another embodiment, there is provided a composition, the composition including: (a) dopamine; (b) PDMA that may have a number average molecular weight of 800 kDa; (c) docetaxel; and (d) a PEI that may have a number average molecular weight of between about 0.7 kDa and about 4.0 kDa.

In accordance with another embodiment, there is provided a composition, the composition including: (a) dopamine; (b) PDMA that may have a number average molecular weight of 800 kDa; (c) paclitaxel; and (d) a PEI that may have a number average molecular weight of between about 0.7 kDa and about 4.0 kDa.

In accordance with another embodiment, there is provided a composition, the composition including: (a) dopamine; (b) PDMA that may have a number average molecular weight of 925 kDa; (c) docetaxel; and (d) a PEI that may have a number average molecular weight of between about 0.7 kDa and about 4.0 kDa.

In accordance with another embodiment, there is provided a composition, the composition including: (a) dopamine; (b) PDMA that may have a number average molecular weight of 925 kDa; (c) paclitaxel; and (d) a PEI that may have a number average molecular weight of between about 0.7 kDa and about 4.0 kDa.

In accordance with another embodiment, there is provided a composition, the composition including: (a) dopamine; (b) PDMA that may have a number average molecular weight of between about 800 kDa and about 925 kDa; (c) a pharmaceutically active agent; and (d) a PEI that may have a number average molecular weight of between about 0.7 kDa and about 4.0 kDa.

In accordance with another embodiment, there is provided a composition, the composition including: (a) a polymeric binder or a salt thereof, wherein a monomer of the polymeric binder has the following structure:

I

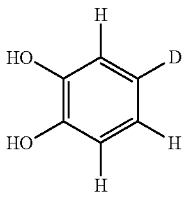

wherein, D is selected from

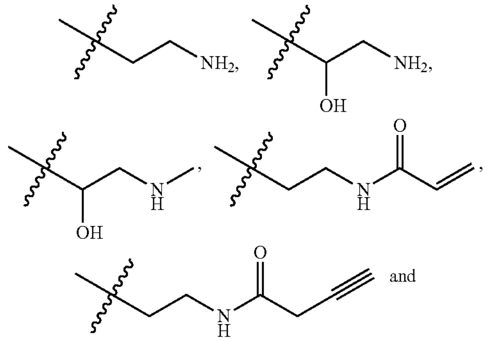

and

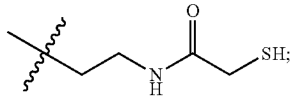

(b) a high molecular weight polymer selected from a poly (N,N-dimethylacrylamide) (PDMA) polymer having a number average molecular weight of ≥200 kDa and a (2-ethyl-2-oxazoline) (PDXZ) polymer having a number average molecular weight of ≥200 kDa; and (c) a pharmaceutically active agent. This three component (i.e. (a)-(c)) system may be used in circumstances where fast action (i.e. where faster silver or antimicrobial release would be a benefit) such as face masks. The three component system is limited by the amount of silver or other pharmaceutically active agent that can be incorporated, and the thickness of the coating that may be applied is thinner than the four component system.

Furthermore, the three component system may also be applied to a substrate, wherein the substrate may be poly (propylene) (PP); poly(urethane) (PU); poly(ethylene) (PE); unplasticized polyvinyl chloride (uPVC); plasticized polyvinyl chloride (pPVC); poly(imide) (PI); ethylene vinyl acetate (EVA); poly(tetrafluoroethylene) (PTFE); titanium dioxide ($TiO_2$), or silicon dioxide ($SiO_2$). The substrate may be selected from PP, PU, PE, uPVC, pPVC, PI, EVA, or PTFE. The substrate may be $TiO_2$ or $SiO_2$. The substrate may form part of an apparatus. The apparatus may be selected from: a urinary device; a dental fixture; an artificial joint; a vascular device; a storage device; a microfluidic device; a filtration membrane; a feed tube; or a diagnostic device. The vascular device may be a catheter, a lead, or a stent. The urinary device may be a urine storage device, catheter, or a stent. The filtration membrane may be a blood filtration membrane, a water purification membrane, or an air purification membrane.

In accordance with another embodiment, there is provided a coated substrate, the coated substrate including: a substrate coated with a composition described herein.

In accordance with another embodiment, there is provided a method of coating a substrate, wherein the substrate is immersed in a solution comprising the composition described herein.

In accordance with another embodiment, there is provided a method of coating a substrate, wherein the substrate is sprayed with a solution comprising the composition described herein.

The high molecular weight polymer may be poly(N,N-dimethylacrylamide) (PDMA) polymer. The polymeric binder may be selected from: dopamine (DA); dopamine hydrochloride; and norepinephrine. The ratio of polymeric binder to high molecular weight polymer may be between 2:2 to 2:100. The ratio of polymeric binder to high molecular weight polymer may be between 2:2 to 2:200. The ratio of polymeric binder to high molecular weight polymer may be between 1:2 and 2:30. The ratio of polymeric binder to high molecular weight polymer may be between 2:2 and 2:20. The ratio of polymeric binder to high molecular weight polymer may be between 2:2 and 2:15. The ratio of polymeric binder to high molecular weight polymer may be between 2:2 and 2:10. The ratio of polymeric binder to high molecular weight polymer may be 2:5. The ratio of polymeric binder to high molecular weight polymer may be 2:4. The ratio of polymeric binder to high molecular weight polymer may be 2:3. The ratio of polymeric binder to high molecular weight polymer may be 2:2. The ratio of polymeric binder to high molecular weight polymer may be 2:6. The ratio of polymeric binder to high molecular weight polymer may be 2:7. The ratio of polymeric binder to high molecular weight polymer may be 2:8. The ratio of polymeric binder to high molecular weight polymer may be 2:9. The ratio of polymeric binder to high molecular weight polymer may be 2:10. The ratio may be in mg/mL of polymeric binder to mg/mL of high molecular weight polymer. Alternatively, the ratio may be an average mass ratio.

The high molecular weight polymer may be between 1 mg/ml and 10 mg/ml. The high molecular weight polymer may be between 2 mg/ml and 8 mg/ml. The high molecular weight polymer may be between 3 mg/ml and 7 mg/ml. The high molecular weight polymer may be between 4 mg/ml and 6 mg/ml. The high molecular weight polymer may be 5 mg/ml. The high molecular weight polymer may be 4 mg/ml. The high molecular weight polymer may be 3 mg/ml. The high molecular weight polymer may be 2 mg/ml. The high molecular weight polymer may be 1 mg/ml. The high molecular weight polymer may be 6 mg/ml. The high molecular weight polymer may be 7 mg/ml. The high molecular weight polymer may be 8 mg/ml. The high molecular weight polymer may be 9 mg/ml. The high molecular weight polymer may be 10 mg/ml. The high molecular weight polymer may be between 50 mg/ml and 100 mg/ml.

The high molecular weight polymer may have a number average molecular weight of between ≥200 kDa and ≥1,000 kDa. The high molecular weight polymer may have a number average molecular weight of between ≥200 kDa and ≥800 kDa. The high molecular weight polymer may have a number average molecular weight of 800 kDa. The high molecular weight polymer may have a number average molecular weight of between ≥200 kDa and ≥10 MDa. The high molecular weight polymer may have a number average molecular weight of between ≥200 kDa and ≥100 MDa.

The antimicrobial agent may be tobramycin. The antimicrobial agent may be silver nitrate ($AgNO_3$). The $AgNO_3$ is at a concentration between 0.2 mg/ml and 3 mg/ml. The $AgNO_3$ may be at a concentration between 0.25 mg/ml and 2 mg/ml. The $AgNO_3$ may be at a concentration between 0.3 mg/ml and 1 mg/ml. The $AgNO_3$ may be at a concentration of 0.5 mg/ml. The $AgNO_3$ may be at a concentration of up to 50 mg/ml. The antimicrobial agent may be silver nitrate ($AgNO_3$). Alternatively, the antimicrobial agent may be copper nitrate or zinc nitrate. Alternatively, the antimicrobial agent may be silver nitrate, copper nitrate, zinc nitrate or combinations thereof. Alternatively, the antimicrobial agent may be another salt of silver, copper, zinc or combinations thereof. Alternatively, metal ions of silver, copper, zinc or combinations thereof having antimicrobial activity may be used.

The low molecular weight cross-linking agent may be selected from polyethylenimine (PEI) and polyvinyl pyrrolidone (PVP). The low molecular weight cross-linking agent may have a number average molecular weight of between about 0.7 kDa and about 4.0 kDa. The low molecular weight cross-linking agent may have a number average molecular weight of between about 0.8 kDa and about 4.0 kDa. The low molecular weight cross-linking agent may have a number average molecular weight of between about 0.9 kDa and about 4.0 kDa. The low molecular weight cross-linking agent may have a number average molecular weight of between about 1.0 kDa and about 4.0 kDa. The low molecular weight cross-linking agent may have a number average molecular weight of between about 0.7 kDa and about 3.5 kDa. The low molecular weight cross-linking agent may have a number average molecular weight of between about 0.7 kDa and about 3.0 kDa. The low molecular weight cross-linking agent may have a number average molecular weight of between about 0.7 kDa and about 2.5 kDa. The low molecular weight cross-linking agent may have a number average molecular weight of between about 0.7 kDa and about 2.0 kDa. The low molecular weight cross-linking agent may have a number average molecular weight of between about 0.7 kDa and about 1.5 kDa. The low molecular weight cross-linking agent may have a number average molecular weight of between about 0.7 kDa and about 1.0 kDa. The cross-linking agent may be PEI. The PEI may have a number average molecular weight of between about 0.7 kDa and about 4.0 kDa.

The dopamine may have a concentration of 2 mg/mL, the PDMA having a number average molecular weight of 800 kDa is at a concentration of 5 mg/mL, the $AgNO_3$ is at a concentration of 0.5 mg/mL and the PEI having a number average molecular weight of 0.7 kDa is at a concentration of 1.5 mg/mL.

The composition may further include an aqueous solution. The aqueous solution may lack a salt. The composition may further include a water soluble organic solvent. The composition may further include a buffer. The buffer may have a pH of between 4 and 12. Alternatively, the buffer may have a pH of between 7 and 12. The buffer may include a salt. The buffer may include a salt or an oxidizing agent (e.g. sodium periodate). The substrate may be a plastic, a metal, a ceramic, a carbon-based material, a metal oxide, a hydrogels, a biological tissue, a wood or a cement. The substrate may be poly(propylene) (PP); poly(urethane) (PU); poly (ethylene) (PE); unplasticized polyvinyl chloride (uPVC); plasticized polyvinyl chloride (pPVC); poly(imide) (PI); ethylene vinyl acetate (EVA); poly(tetrafluoroethylene) (PTFE); titanium dioxide ($TiO_2$), or silicon dioxide ($SiO_2$). The substrate may be selected from PP, PU, PE, uPVC, pPVC, PI, EVA, or PTFE. The substrate may be $TiO_2$ or $SiO_2$. The substrate may form part of an apparatus. The apparatus may be selected from: a urinary device; a dental fixture; an artificial joint; a vascular device; a storage device; a microfluidic device; a filtration membrane; a feed tube; or a diagnostic device. The vascular device may be a catheter, a lead, guide wire, sheath or a stent. The urinary device may be a urine storage device, catheter or a stent. The vascular device may be a catheter, a lead, or a stent. The urinary device may be a urine storage device, catheter, mesh or a stent. The urinary device may be a urine storage device, catheter or a stent. The filtration membrane may be a blood filtration membrane, a water purification membrane, or an air purification membrane.

The method may further include drying the substrate. The method may further include applying a further coat of the solution following the drying of the substrate. The method may further include a second drying of the substrate. The method may further include one or more repetitions of the applying a further coat of the solution followed by one or more subsequent drying steps. The method may further include mechanical agitation following immersion in the solution. The method may further include the application of a primer, prior to immersion in or spraying of a solution comprising the composition described herein. The drying may be in flow of argon gas, air or a flow of nitrogen gas. The drying may be in flow of argon gas or a flow of nitrogen gas.

The composition described herein may be for use as an anti-fouling agent. The composition described herein may be for use as an anti-adhesion agent.

The coated substrate may reduce biofouling. The coated substrate may reduce adhesion. The coated substrate may reduce thrombus formation.

The composition may have a zeta potential (SZP) is between −10 mV and 10 mV as measured using a Zetasizer Nano ZS™ instrument from Malvern Pananalytical™. The coated substrate may have a surface zeta potential (SZP) between −10 mV and 10 mV as measured using a Zetasizer Nano ZS™ instrument from Malvern Pananalytical™. The SZP of the SLAB-C coating may be close to zero demonstrating its neutral or near neutral surface charge.

In accordance with another embodiment, there is provided a method of coating a substrate, wherein the substrate is immersed in a solution comprising the composition described herein.

In accordance with another embodiment, there is provided a method of coating a substrate, wherein the substrate is sprayed with a solution comprising the composition described herein.

In accordance with another embodiment, there is provided a use of a composition described herein for coating a substrate.

In accordance with another embodiment, there is provided a coated substrate described herein for preventing biofouling of the substrate.

In accordance with another embodiment, there is provided a coated a substrate as described herein for use in preventing adhesion to the substrate.

In accordance with another embodiment, there is provided a coated a substrate as described herein for use in preventing thrombus formation.

In accordance with another embodiment, there is provided a coated substrate described herein for preventing infection.

In accordance with another embodiment, there is provided a coated substrate described herein for preventing microbial adhesion.

The substrate may be a plastic, a metal, a ceramic, a carbon based material, a metal oxide, a hydrogels, a biological tissue, a wood or a cement. The substrate may be poly(propylene) (PP); poly(urethane) (PU); poly(ethylene) (PE); unplasticized polyvinyl chloride (uPVC); plasticized polyvinyl chloride (pPVC); poly(imide) (PI); ethylene vinyl acetate (EVA); poly(tetrafluoroethylene) (PTFE); titanium dioxide ($TiO_2$), titanium or silicon dioxide ($SiO_2$). The substrate may be poly(propylene) (PP); poly(urethane) (PU); poly(ethylene) (PE); unplasticized polyvinyl chloride (uPVC); plasticized polyvinyl chloride (pPVC); poly(imide) (PI); ethylene vinyl acetate (EVA); poly(tetrafluoroethylene) (PTFE); titanium dioxide ($TiO_2$) or silicon dioxide ($SiO_2$). The substrate may be PP, PU, PE, uPVC, pPVC, PI, EVA, or PTFE. The substrate may be $TiO_2$ or $SiO_2$. The substrate may form part of an apparatus. The apparatus may be selected from: a urinary device; a dental fixture; an artificial joint; a vascular device; a storage device; a microfluidic device; a filtration membrane; a feed tube; or a diagnostic device. The vascular device may a catheter, a lead, guide wire, sheath or a stent. The vascular device may a catheter, a lead or a stent. The urinary device maybe a urine storage device, catheter, or a stent. The filtration membrane may be a blood filtration membrane, a water purification membrane, or an air purification membrane.

The method may further comprise drying the substrate. The method may further comprise applying a further coat of the solution following the drying of the substrate. The method may further comprise a second drying of the substrate. The method may further comprise one or more repetitions of the applying a further coat of the solution followed by one or more subsequent drying steps. The method may further comprise mechanical agitation following immersion in the solution. The method may further comprise the application of a primer, prior to immersion in or spraying of a solution comprising a composition described herein. The drying may be in flow of argon gas, air or a flow of nitrogen gas. The drying may be in flow of argon gas or a flow of nitrogen gas.

The composition described herein may be for use as an anti-fouling agent. The composition described herein may be for use as an anti-adhesion agent. The coated substrate described herein may be for reducing biofouling. The coated substrate described herein may be for reducing adhesion. The coated substrate described here that may prevent infection by release of antimicrobials. The coated substrate described release anti-cancer agents that may prevent cancer cell growth. The coated substrate described release anti-inflammatory agents that may prevent inflammation. The coated substrate described release anti-viral agents that may prevent virus infection. The coated substrate described release analgesic agents that may prevent pain. The coated substrate described release anti-fibrotic agents that may prevent fibrosis. The coated substrate described release anti-fungal agents that may prevent fungal infection. The coated substrate described herein may be for reducing thrombus formation.

The coating may be of uniform thickness. The coating may be applied in 2 coats. The coating may be applied in 3 coats. The coating may be applied in 4 coats. The coating may be applied in 5 coats. The coating may be applied in 6 coats. The coating may be applied in 7 coats. The coating may be applied in 8 coats. The coating may be applied in 9 coats. The coating may be applied in 10 coats. The coating may be applied in 1 coat.

The methods described herein may be for preventing thrombus formation; biofouling; biofilm formation; protein adsorption; protein binding; cell adhesion; cell growth; pain; platelet adhesion; microorganism adhesion; and microorganism adhesion and growth. The methods described herein may be for preventing thrombus formation; biofouling; biofilm formation; protein adsorption; protein binding; cell adhesion; platelet adhesion; microorganism adhesion; and microorganism adhesion and growth. The microorganism may be bacteria. The bacteria may be Gram-positive or Gram-negative bacteria. The gram-positive bacteria may be *Staphyloccous aureus* (*S. aureus*). The gram-negative bacteria may be *Escherichia coli* (*E. coli*). The cell may be a cancer cell.

The method of coating a surface, may include providing a solution comprising PDA and hydrophilic polymer and contacting said solution with the surface of a substrate. Wherein the method is substrate independent, and wherein the method of contacting the solution and surface of the substrate may be as a dip-coating or may spray coating or may be flow coating. Alternatively, the coating may be dip-coating, spray-coating, flow-coating and interfacial-coating. The method of contacting the solution and surface of the substrate may be via dip-coating. Wherein the substrate may be a plastic, a metal, a ceramic, a carbon based material, a metal oxide, a hydrogels, a biological tissue, a wood or a cement.

The method may be substrate independent, and wherein the method of application may be as a dip-coating. The substrate may be plastic, metal, or metal oxide. The substrate may be one or more of PP, PU, PE, uPVC, pPVC, PI, EVA, Teflon, titanium dioxide ($TiO_2$), or silicon dioxide ($SiO_2$). The substrate may be PP, PU, PE, uPVC, pPVC, PI, EVA, or Teflon. The substrate may be $TiO_2$ or $SiO_2$.

The coating may be of high lubricity. The coating may prevent biofilm formation. The coating may be for the prevention of protein adsorption, protein binding, cell adhesion, platelet adhesion, or microorganism adhesion. The coating may prevent microorganism adhesion and growth. The substrate may be a medical implant or device.

The coating may be applied to urinary implants and devices, dental fixtures, artificial joints, vascular stents, or other type of vascular implant and devices, as well as blood filtration systems, blood storage devices, microfluidic devices, treatment devices and diagnostic devices. The coating described herein may also be used ex vivo.

Alternatively, a monomer of the polymeric binder may have the following structure:

I

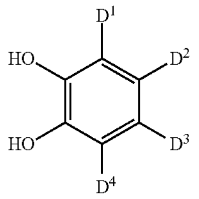

wherein, $D^1$ may be selected from H, OH,

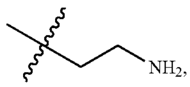,
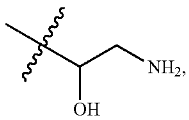,
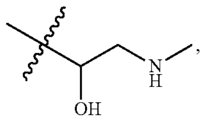,
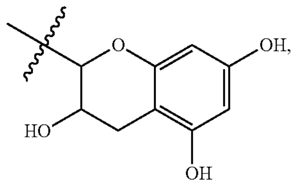,
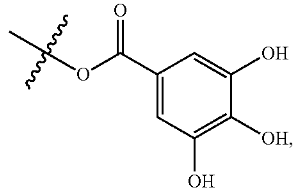,
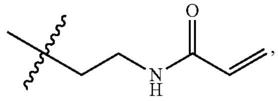,
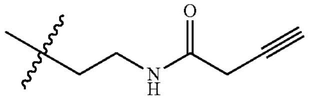 and
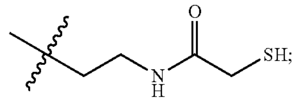;

$D^2$ may be selected from H, OH,

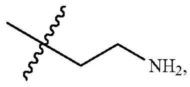,
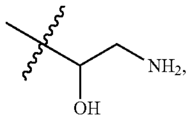,
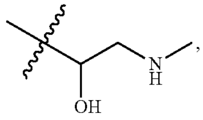,
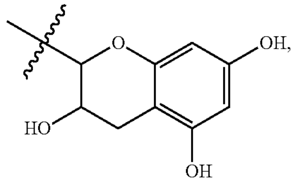,

-continued

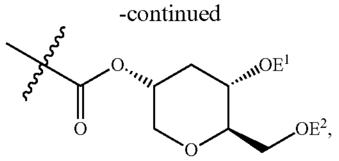

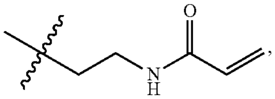

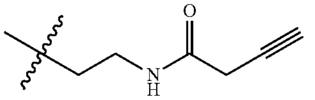 and

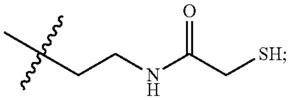

$D^3$ may be selected from H, OH,

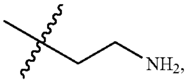 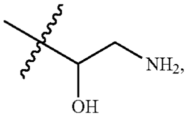

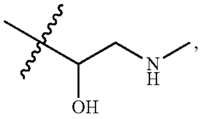 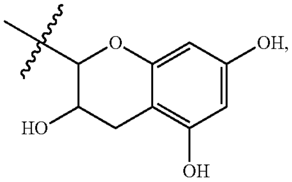

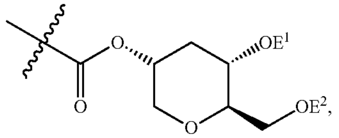

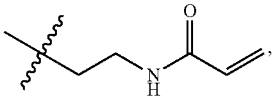

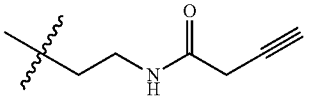 and

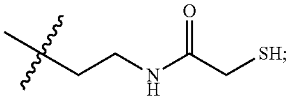

$D^4$ may be selected from H, OH,

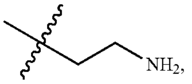 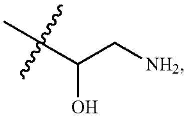

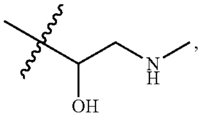 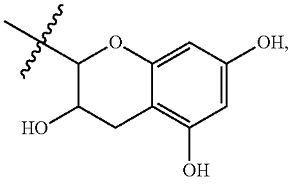

-continued

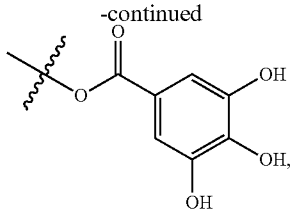

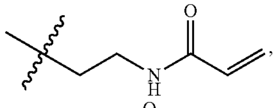

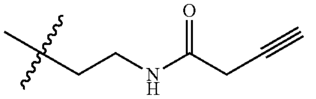 and

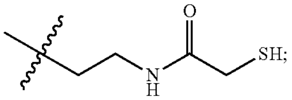

wherein $E^1$ may be H or

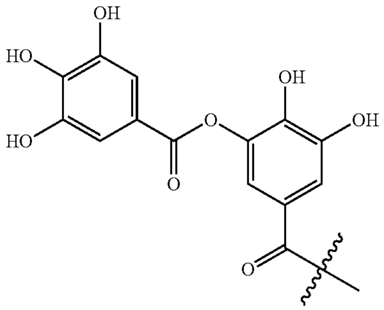 [SMILES: *C(=O)c1cc(O)c(O)c(OC(=O)c2cc(O)c(O)c(O)c2)c1]

wherein $E^2$ may be H or

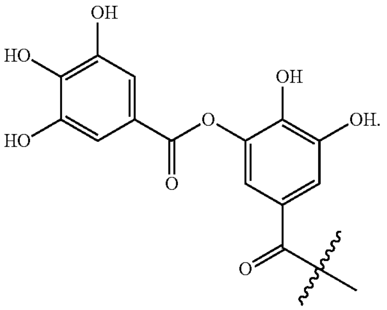 [SMILES: *C(=O)c1cc(O)c(O)c(OC(=O)c2cc(O)c(O)c(O)c2)c1]

DETAILED DESCRIPTION

Figure 1:
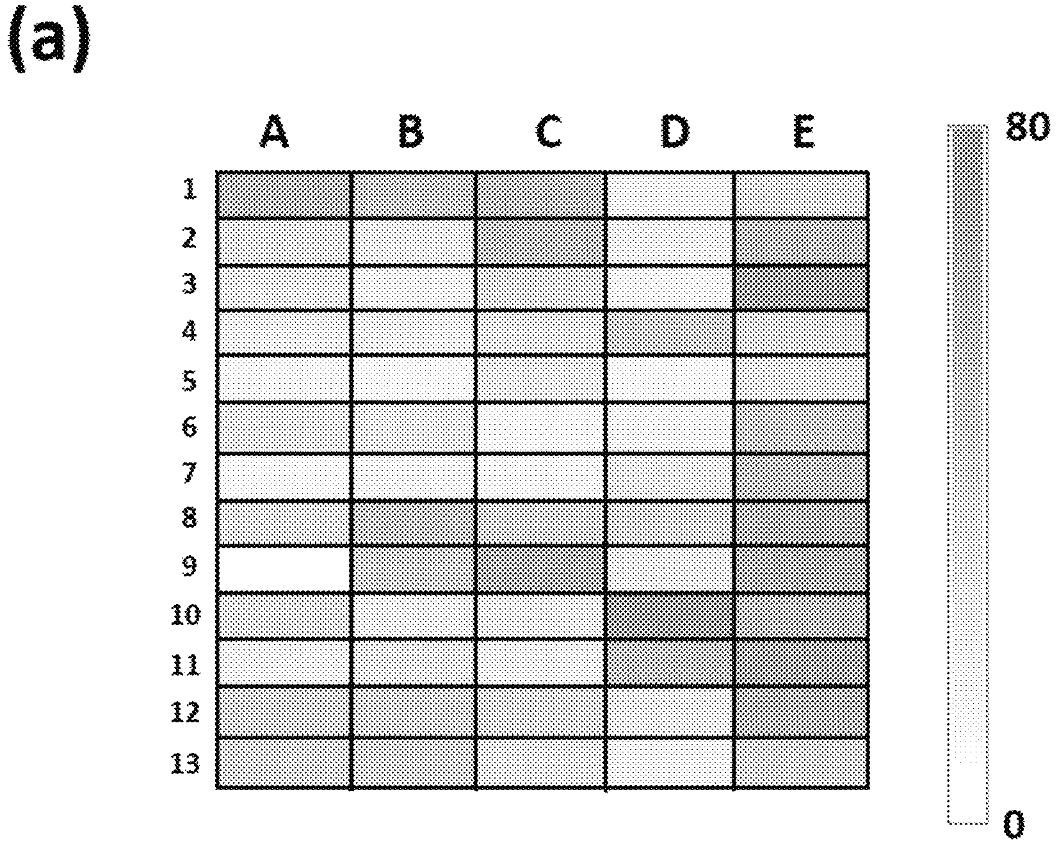
FIG. 1 shows high-throughput screening to identify optimum coating, (a) the color-map of the high-throughput screening results from the bacterial adhesion assay (*E. coli,* initial concentration of $1\times10^6$ CFU/mL in LB, 24 h); (b) a cartoon scheme representing the SLAB-C coating process; (c) the relative bacterial attachment to the surface of coatings based on different uh-MW hydrophilic polymers incubated with *E. coli* (initial concentration of $1\times10^6$ CFU/mL in LB) for 7 days; (d) the fluorescence images of biofilm formation by *E. coli* (initial concentration of $1\times10^6$ CFU/mL in LB, 7 days) on the surface of coatings formed based on different uh-MW hydrophilic polymers (5 mg/mL); (e) the amount of silver release from coatings based on different uh-MW hydrophilic polymers after 4 weeks incubation with deionized water (DIW); (f) the fluorescence images of biofilm formation by *E. coli* (initial concentration of $1\times10^6$ CFU/mL in LB, 7 days) on the surface of coatings formed based on DA:PDMA ratios; (g) the fluorescence images of biofilm formation by *E. coli* (initial concentration of $1\times10^6$ CFU/mL in LB, 7 days) on the surface of coatings formed based on molecular weights of PDMA; and (h) the fluorescence images of biofilm formation on the surface of the optimum SLAB-C coating incubated with *E. coli* in LB ($1\times10^6$ CFU/mL) for 4 weeks.
Figure 1:
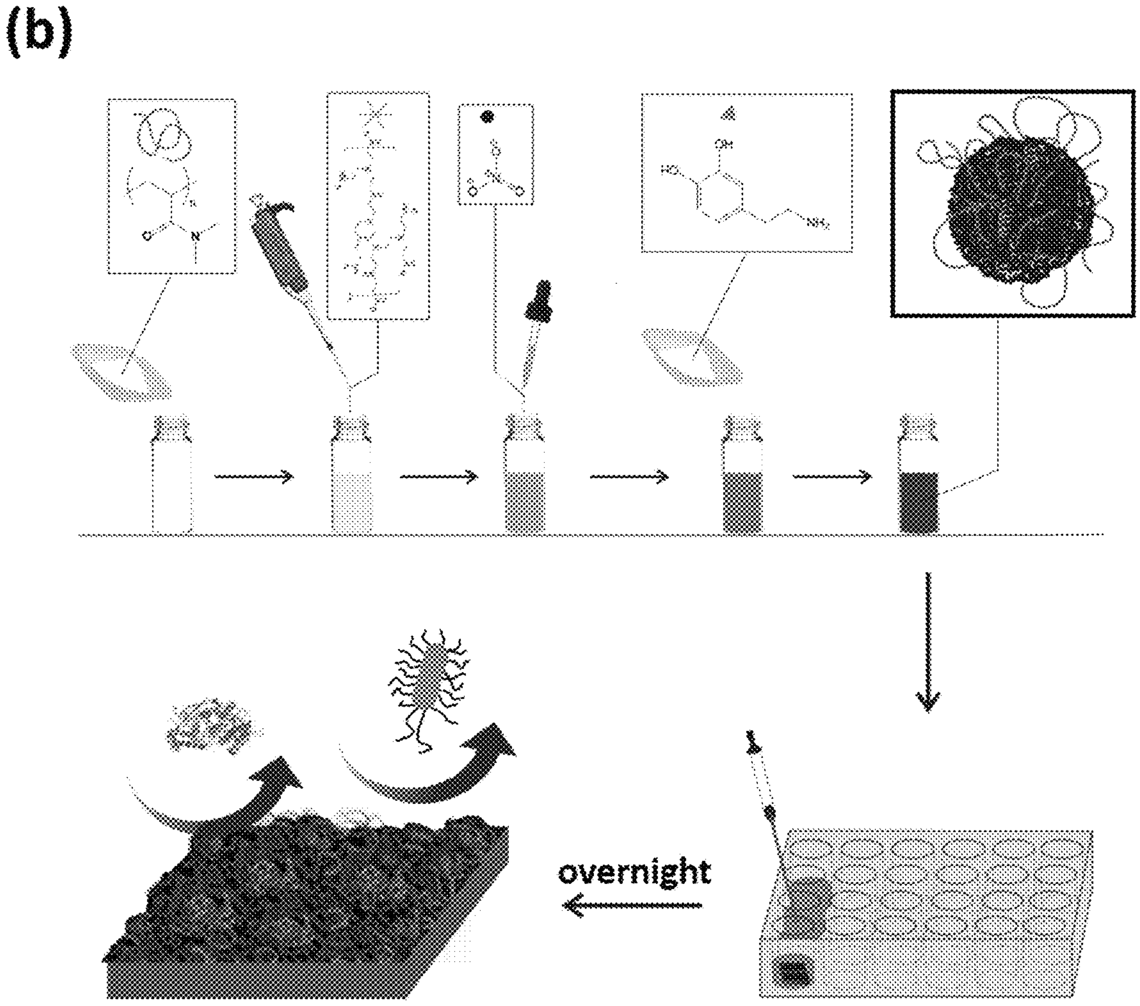
Figure 1:
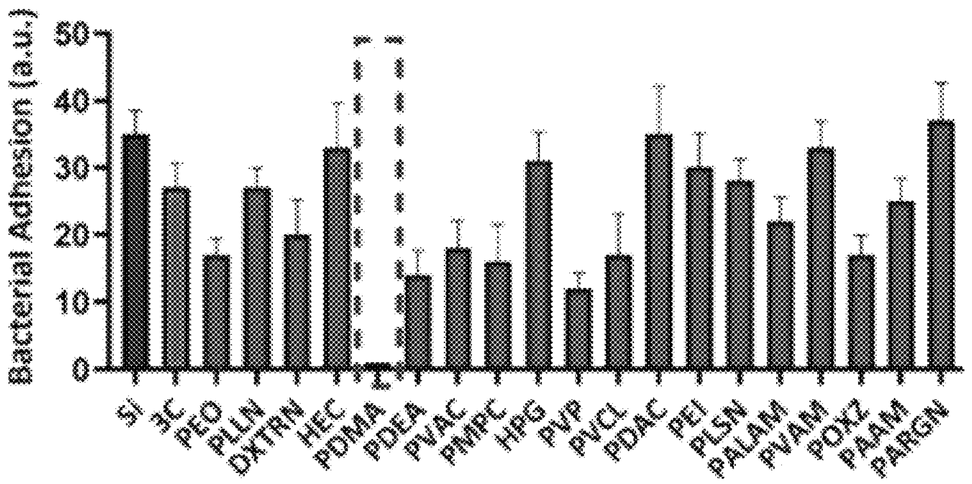
Figure 1:
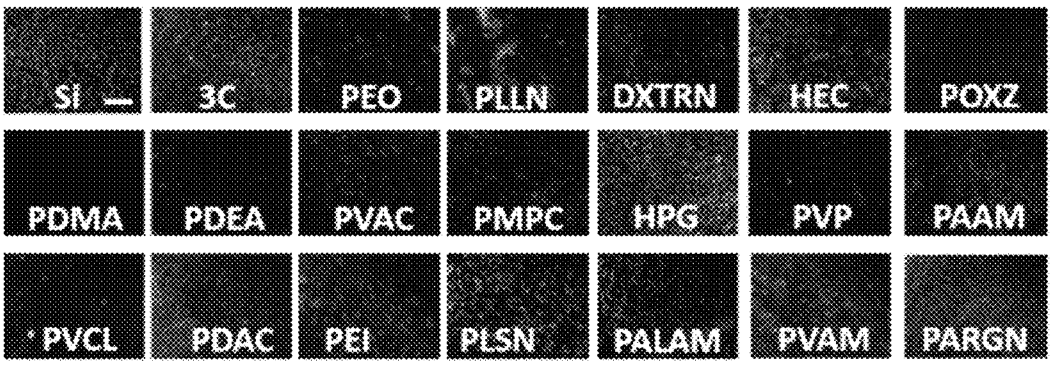
Figure 1:
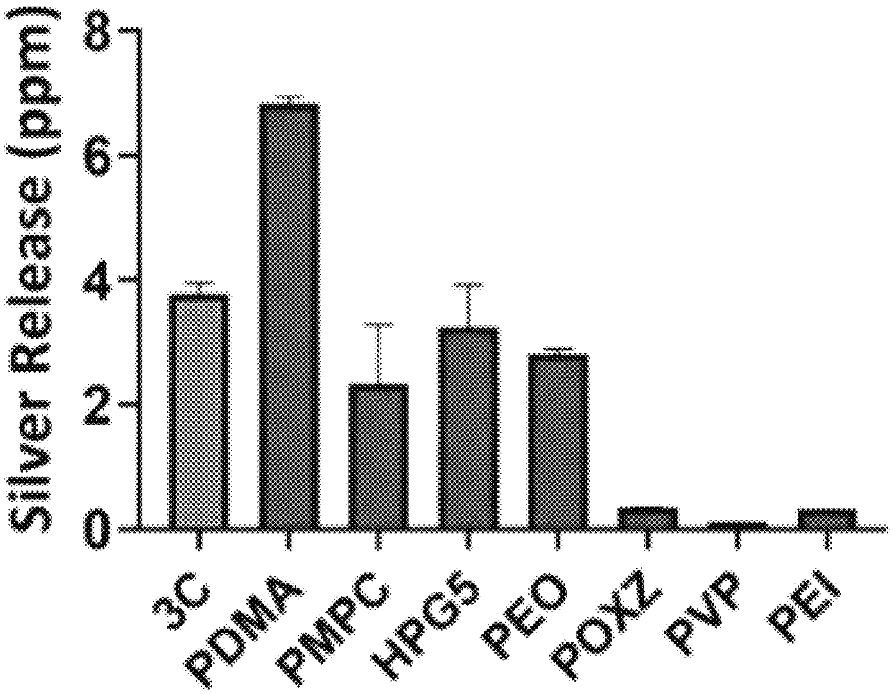
Figure 1:
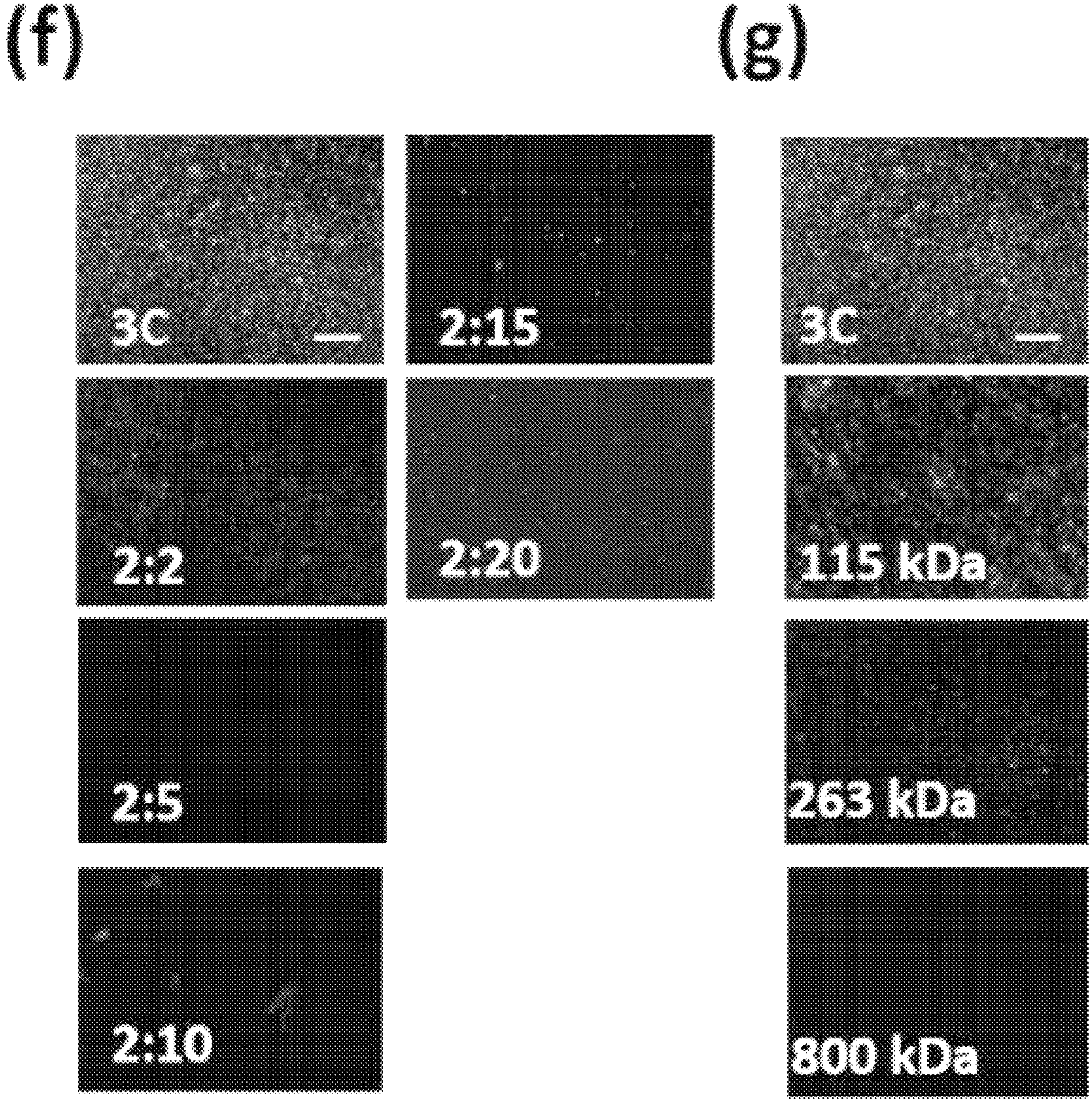
Figure 1:
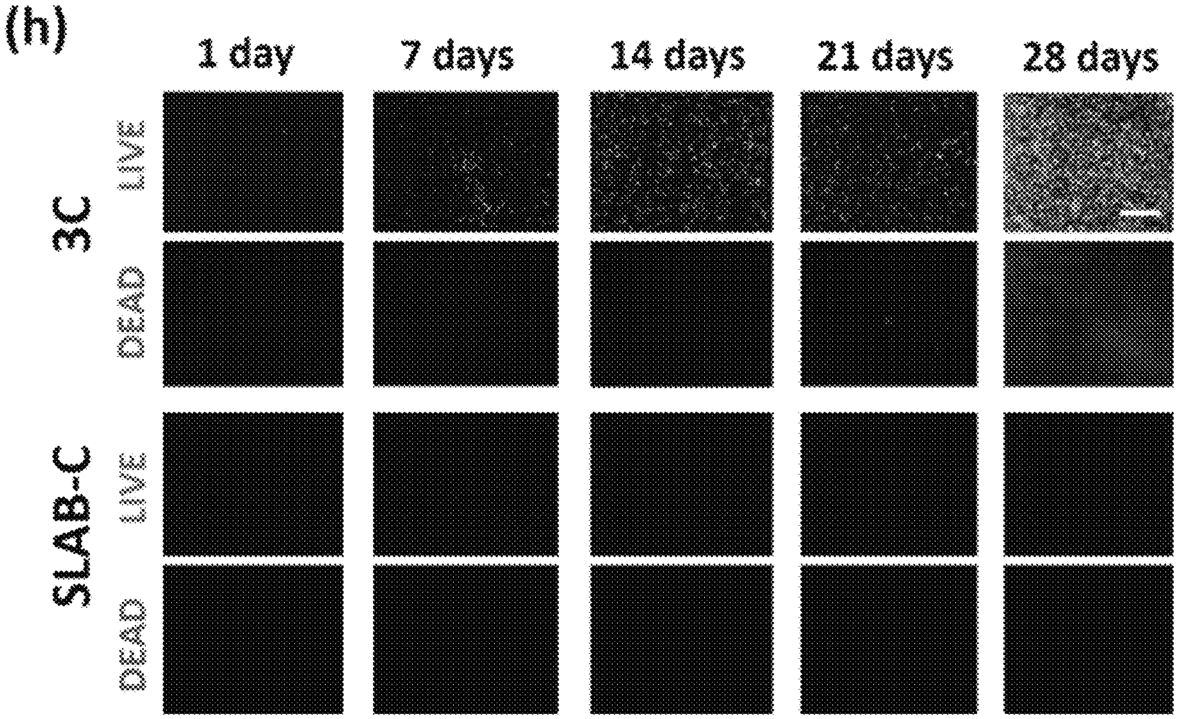

The following detailed description will be better understood when read in conjunction with the appended figures. For the purpose of illustrating the invention, the figures demonstrate embodiments of the present invention. However, the invention is not limited to the precise arrangements, examples, and instrumentalities shown.

Any terms not directly defined herein shall be understood to have the meanings commonly associated with them as understood within the art of the invention.

The term "high molecular weight polymer" or HMW polymer as used herein refers to any polymer having a molecular weight between about 100 kDa and about ≤200 kDa and in particular refers to the hydrophilic polymers described herein. Alternatively, the HMW polymer may be selected on the basis of having a polydispersity index (PDI) of between 1 to 3.

The term "ultra-high molecular weight polymer" or HMW polymer as used herein refers to any polymer having a molecular weight >200 kDa and in particular refers to the hydrophilic polymers described herein.

As used herein "uniformity" refers to the thickness of the coating formed over the entire surface of the substrate to which the coating compositions described herein were applied. The term implies that there is a consistency over the entirety of the substrate surface in terms of composition (i.e. polymeric binder and hydrophilic polymer) and the overall thickness of the coating and thus has implications for the smoothness of the coating.

The term "polymeric binder" as used herein is meant to encompass catechol and catechol derivative polymers encompassed by Structure IA, wherein the polymeric binder or a salt thereof has a monomer of the following structure:

I

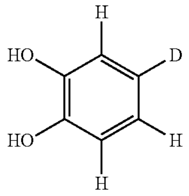

wherein,

D is selected from

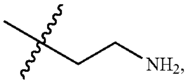,

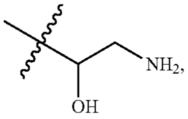,

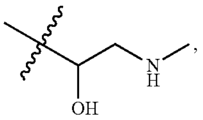,

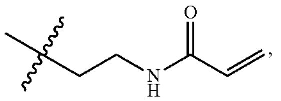,

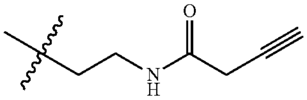

and

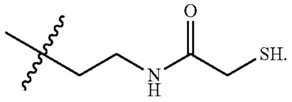.

For example, a polymeric binder may be a polymeric dopamine (PDA), a polymeric norepinephrine (PNE), a polymeric epinephrine (PEPI), a polymeric pyrogallol (PPG), a polymeric tannic acid (PTA), a polymeric hydroxy-hydroquinone (PHHQ), a polymeric catechin, or a polymeric epigallocatechin.

The term "biofilm" or "bio-film" is used herein as it is normally understood to a person of ordinary skill in the art refers to any syntrophic consortium of microorganisms in which cells stick to each other and often also to a surface. These adherent microorganism cells often become embedded in an extracellular matrix of "slime" that is composed of extracellular polymeric substances (EPS).

The term "biofouling" or "bio-fouling" is used herein as it is normally understood to a person of ordinary skill in the art and often refers to the colonization of a surface by organisms, which often leads to deterioration of the surface.

The term "antifouling" or "anti-fouling" is used herein as it is normally understood to a person of ordinary skill in the art and as used herein refers to the reduction of formation of biofilms and biofouling.

The term "anti-microbial agent" or "anti-bacterial agent" is used herein as it is normally understood to a person of ordinary skill in the art and as used herein refers to any agent that may be used to that kill a microorganism, slow the growth of the microorganism or stop the growth of the microorganism. As demonstrated herein the anti-microbial agent may for example include, $AgNO_3$ or tobramyicin or a pharmaceutically acceptable salt, solvate or solvate of the salt thereof. Alternatively, the one or more pharmaceutically active agents or pharmaceutically acceptable salt, solvate or solvate of the salt thereof may be an antibiotic medication, which may include penicillins, cephalosporins, polymyxins, rifamycins, lipiarmycins, quinolones, sulfonamides, macrolides, lincosamides, tetracyclines, aminoglycosides, lipopeptides, glycylcyclines, oxazolidinones, and lipiarmycins, cephalexin, cefazolin, gentamicin, ciprofloxacin, clindamycin, macrodantin, tobramycin, rifampicin, daptomycin, linezolid, vancomycin, fusidic acid, silver compounds, cannabinoids and others. An antibiotic drug may also include silver and a cannabinoid.

The one or more pharmaceutically active agent or pharmaceutically acceptable salt, solvate or solvate of the salt thereof may be an anti-cancer agent selected from one or more of the following: actinomycin; all-trans retinoic acid; azacitidine; azathioprine; bleomycin; bortezomib; carboplatin; capecitabine; cisplatin; chlorambucil; cyclophosphamide; cytarabine; daunorubicin; docetaxel; doxifluridine; doxorubicin; epirubicin; epothilone; etoposide; fluorouracil; gemcitabine; hydroxyurea; idarubicin; imatinib; irinotecan; mechlorethamine; mercaptopurine; methotrexate; mitoxantrone; oxaliplatin; paclitaxel; pemetrexed; teniposide; tioguanine; topotecan; valrubicin; vemurafenib; vinblastine; vincristine; vindesine; and vinorelbine. The s pharmaceutically active agent may be selected from one or more of: gemcitabine HCl, gemcitabine, mitomycin, docetaxel, and paclitaxel. The one or more pharmaceutically active agents or pharmaceutically acceptable salt, solvate or solvate of the salt thereof may be an anesthetic agent and the anesthetic agent may be a local anesthetic selected from one or more of the following: procaine; benzocaine; chloroprocaine; cocaine; cyclomethycaine; dimethocaine/larocaine; piperocaine; propoxycaine; Procaine/Novocaine; Proparacaine; Tetracaine/Amethocaine; Articaine; Bupivacaine; Cinchocaine/Dibucaine; Etidocaine; Levobupivacaine; Lidocaine/Lignocaine/Xylocaine; Mepivacaine; Prilocaine; Ropivacaine; and Trimecaine.

The one or more pharmaceutically active agents or pharmaceutically acceptable salt, solvate or solvate of the salt thereof may be an anti-fungal agent, such as polyenes, azoles, triazoles, antimetabolites, allylamines, echinocandins. Anti-fungal agent may include, for example, but are not limited to amphotericin B, nystatin, clotrimazole, econazole, miconazole, fluconazole, terbinafine, fluconazole, ketoconazole, caspofungin, tolnaftate, ivermectin, flucytosine, griseofulvin.

Anti-inflammatory agents may include acetaminophen and non-steroidal drugs like ibuprofen, acetylsalicylic acid, naproxen, diclofenac, meloxicam, as well as steroids like prednisone and others.

The pharmaceutically active agent may be hydrophobic or may be hydrophilic. Specific pharmaceutically active agents may be selected from one of more of the following: $AgNO_3$; tobramycin; gentamicin; penicillin; rifampicin; antimicrobial peptide E5; docetaxel, paclitaxel, dexamethasone phosphate and estradiol.

The term "thrombus" is used herein as it is normally understood to a person of ordinary skill in the art and often referred to as blood clot, as the product of blood coagulation steps in hemostasis.

The term "primer" as used herein is meant to encompass any coating applied to a substrate before a subsequent composition is applied. The primer may act to prepare the surface of the substrate or facilitate the application of a subsequent composition to the substrate.

The term "plastic" as used herein is meant to encompass a vast number of synthetic or semi-synthetic organic polymers that are malleable and may be molded into solid forms. Exemplary plastics are: Polyester (PES); Polyethylene terephthalate (PET); Polyethylene (PE); High-density polyethylene (HDPE); Polyvinyl chloride (PVC); Polyvinylidene chloride (PVDC); Low-density polyethylene (LDPE); Polypropylene (PP); Polystyrene (PS); High impact polystyrene (HIPS); Polyamides (PA) (Nylons); Acrylonitrile butadiene styrene (ABS); Polyethylene/Acrylonitrile Butadiene Styrene (PE/ABS a blend of PE and ABS); Polycarbonate (PC); Polycarbonate/Acrylonitrile Butadiene Styrene (PC/ABS a blend of PC and ABS); Polyurethane (PU); Polylactic acid (PLA); Polyimide; Polyetherimide (PEI); Polyetheretherketone (PEEK); phenol formaldehydes (PF); and Polymethyl methacrylate (PMMA).

The term "polydopamine", abbreviated as PDA, is used herein as understood by a person of ordinary skill in the art to be any polymerisation of dopamine monomers and includes pH-dependent self-polymerization of dopamine. It should be noted that the mechanism of PDA formation is currently not understood[60,61]. Furthermore, it should be noted that the structure of the polymer product has not been elucidated yet[60].

The term "low molecular weight cross-linking agent" is used herein as understood by a person of ordinary skill in the art to be a polymer having a number average molecular weight of between about 0.7 kDa and about 4.0 kDa. The low molecular weight cross-linking agent may be selected from polyethylenimine (PEI) and polyvinyl pyrrolidone (PVP). Alternatively, the low molecular weight cross-linking agent may be between about 0.6 kDa and about 4.5 kDa.

The term "polyethylenimine", abbreviated as PEI, and also known as polyaziridine, is used herein as understood by a person of ordinary skill in the art as a polymer with a repeating unit composed of an amine group and two carbon aliphatic $CH_2CH_2$ spacer

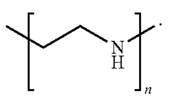

Linear polyethyleneimines contain all secondary amines, while branched PEIs which contain primary, secondary and tertiary amino groups. The PEI as used herein preferably has a number average molecular weight of between about 0.30 kDa and about 25 kDa. Alternatively, the PEI would have a number average molecular weight of <5 kDa.

The term "poly(vinyl pyrrolidone)" abbreviated as "PVP", is also called polyvidone or povidone, is a water-soluble polymer made from the monomer N-vinylpyrrolidone

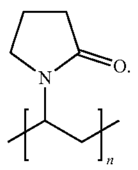

The PVP as used herein is low molecular weight and preferably has a number average molecular weight of between about 0.30 kDa and about 25 kDa. Alternatively, the PEI would have a number average molecular weight of <5 kDa.

The term "silver nitrate" is $AgNO_3$, and as used herein includes nanoparticles.

The term "PDMA" is used herein as it is normally understood to a person of ordinary skill in the art and often refers to poly(N,N-dimethyl acrylamide). The PDMA as used herein preferably has a number average molecular weight of ≥200 kDa.

The term "PDXZ" is used herein as it is normally understood to a person of ordinary skill in the art and often refers to poly(2-ethyl-2-oxazoline). The PDXZ as used herein preferably has a number average molecular weight of ≥200 kDa.

The term "PAM" is used herein as it is normally understood to a person of ordinary skill in the art and often refers to poly(acrylamide).

The term "PHMA" is used herein as it is normally understood to a person of ordinary skill in the art and often refers to "poly(N-hydroxymethyl acrylamide)".

The term "PHEA" is used herein as it is normally understood to a person of ordinary skill in the art and often refers to "poly(N-hydroxyethyl acrylamide)".

The term "PTHMAM" is used herein as it is normally understood to a person of ordinary skill in the art and often refers to "poly{N-[tris(hydroxymethyl) methyl]acrylamide}".

The term "PMA" is used herein as it is normally understood to a person of ordinary skill in the art and often refers to "poly(methacrylamide)".

The term "PHPMA" is used herein as it is normally understood to a person of ordinary skill in the art and often refers to "poly(N-(2-hydroxypropyl)methacrylamide)".

The term "PMPDSAH" is used herein as it is normally understood to a person of ordinary skill in the art and often refers to "poly(N-(3-(methacryloylamino)propyl)-N,N-dimethyl-N-(3-sulfopropyl) ammonium hydroxide)".

The term "PMPC" is used herein as it is normally understood to a person of ordinary skill in the art and often refers to "poly(2-methacryloyloxyethyl phosphorylcholine)".

The term "PVP" is used herein as it is normally understood to a person of ordinary skill in the art and often refers to "poly(vinyl pyrrolidone)".

The term "PEO" is used herein as it is normally understood to a person of ordinary skill in the art and often refers to "poly(ethylene oxide)".

The term "HPG" is used herein as it is normally understood to a person of ordinary skill in the art and often refers to "hyperbranched polyglycerol".

The term "Dextran" is used herein as it is normally understood to a person of ordinary skill in the art and often refers to "branched glucan composed if chains of varying length".

The term "PP" is used herein as it is normally understood to a person of ordinary skill in the art and often refers to "poly(propylene)".

The term "PU" is used herein as it is normally understood to a person of ordinary skill in the art and often refers to "poly(urethane)".

The term "PE" is used herein as it is normally understood to a person of ordinary skill in the art and often refers to "poly(ethylene)".

The term "uPVC" is used herein as it is normally understood to a person of ordinary skill in the art and often refers to "unplasticized polyvinyl chloride".

The term "pPVC" is used herein as it is normally understood to a person of ordinary skill in the aft and often refers to "plasticized polyvinyl chloride".

The term "PI" is used herein as it is normally understood to a person of ordinary skill in the art and often refers to "poly(imide)".

The term "EVA" is used herein as it is normally understood to a person of ordinary skill in the aft and often refers to "ethylene vinyl acetate".

The term "Teflon" is used herein as it is normally understood to a person of ordinary skill in the art and often refers to "poly(tetrafluoroethylene) or PTFE".

The term "coating" is used herein as it is normally understood to a person of ordinary skill in the art to be a covering that is applied to the surface of an object and is to be broadly constructed to include adhesive coating, resistive coating (e.g., resistive to cellular adhesion), and protective coating. The present invention offers adhesion in "highly humid" environments (50% to 80% humidity) and "wet", "saturated", or "super-saturated" environments (at least 80% humidity and higher). Adhesion under dry environment is also contemplated herein. Coatings may be applied using dip-coating, spray-coating, flow-coating and interfacial-coating as described herein.

The term "dip-coating" is used herein as it is normally understood to a person of ordinary skill in the art and often refers to the immersion of the substrate into the solution of the coating material.

The term "lubricity" is used herein as it is normally understood to a person of ordinary skill in the art and often refers to the property of "slipperiness" or "smoothness", or "a surface with low friction".

The coating described herein has high lubricity. These coatings are useful for medical devices where their lubrication results in reduced frictional forces when the device is introduced and moved within the body, reducing inflammation and tissue trauma as well as supporting patient comfort.

Various alternative embodiments and examples are described herein. These embodiments and examples are illustrative and should not be construed as limiting the scope of the invention.

Materials and Methods

All catechol-containing materials including dopamine (DA) hydrochloride, serotonin (Ser) hydrochloride, pyrogallol (PG), 2,3,5-benzenetriol (BTO), tannic acid (TA), pyrocatechol (PC) and all metal salts including silver nitrate, gallium nitrate, zinc nitrate, copper (II) nitrate, nickel (II) nitrate and gold (III) chloride were purchased from Sigma-Aldrich™ and used as received. Low molecular weight polyethylenimine (700 Da), gentamicin and amikacin were also purchased from Sigma-Aldrich™. Amine-modified polyethylene glycol (2 kDa) was purchased from Advanced BioChemicals™. A number of hydrophilic polymers used in this work including polyethylene oxide (PEO) (1000 kDa), polyacrylamide (PAAM) (400 kDa), dextran (DXTRN) (500 kDa), poly(2-ethyl-2-oxazoline) (PDXZ) (500 kDa), polyvinyl pyrrolidone (PVP) (1300 kDa), poly diallyl ammonium chloride (PDAC) (400 kDa), high molecular weight polyethylenimine (PEI) (700 kDa), poly(L-lysine) (PLSN) (150 kDa) and polyarginine (PARGN) (70 kDa) were supplied by Sigma-Aldrich™. Poly (N,N-diethylacrylamide) (PDEA), poly (N-vinyl caprolactam) (PVCL) and poly(N-vinylamine) (PVAM) (120 kDa) were purchased from Polymer Source™ and polyallylamine (PALAM) hydrochloride (150 kDa), pullulan (PLLN) and 2-hydroxyethyl cellulose (HEC) (1000 kDa) were purchased from Polysciences Inc.™ Poly (N,N-dimethyl acrylamide) was synthesized in the lab based on a previously reported procedure from our group[62]. Diverse biomedical plastic materials including polyethylene (PE), polypropylene (PP), polystyrene (PS), polydimethyl siloxane (PDMS), polyvinyl chloride (PVC), polycarbonate (PC), polyacrylic (PA), polyethylene terphtalate glycol (PTEG) and polyurethane (PU)), metals (Si, Ti and stainless steel (SS) were obtained from Professional Plastics (USA)™. The catheters (Bardex, 24 G PU IV, 10 Fr silicon, and 16 Fr PVC) and PP surgical mesh were supplied by BD Company™).

Coating Synthesis

To prepare the silver control coating, 30 μL of the PEI (700 Da) stock solution (100 mg/mL in PBS) and 10 μL of the silver nitrate stock solution (100 mg/mL in DIW) was added to 2 mL tris buffer solution (10 mM, pH=8.5). Then, 4 mg dopamine hydrochloride was dissolved in the resulting PEI/Ag solution. The 3-component solution was vortexed for 30 s to prepare the PDA suspension. Then, 500 μL of the PDA suspension was transferred to the well (48-well plate) containing the working substrate. The well plate was covered with parafilm to prevent the water loss upon coating process. After 24 h, the sample was removed, washed gently with DIW and dried in air.

To prepare the SLAB-C coating, 10 mg uhPDMA (800 kDa) was dissolved in 2 mL tris buffer solution (10 mM, pH=8.5)). Then, 30 μL of the PEI (700 Da) stock solution, 10 μL of the silver nitrate stock solution and 4 mg dopamine hydrochloride were added to the uhPDMA solution and mixed on the vortexer for 30 s. Then, the resulting PDA suspension was transferred to the well and kept for 24 h at room temperature with parafilm cover on top. Finally, the sample was taken off, washed gently with DIW and dried in air.

To prepare DOPASIL coating uhPDMA (35 mg) was dissolved in the mixture of solvent (i.e. methanol; 6.3 mL) and tris (10 mM, pH 8.5; 0.7 mL). Afterwards, LMW-PEI (10.5 mg), silver nitrate (3.5 mg) and DA (14 mg) were added to the uhPDMA solution. The solution was vortexed for 10 s. The objects were vertically suspended in vials containing the coating solution at room temperature for 24 h. Then, the objects were taken off and sprayed thoroughly with deionized water and then stored for further analysis. To coat flat surfaces (silicon wafer and PU sheets), a piece of the sample (5×5 mm) was cut and placed in the well (48 well plate) containing the coating solution (500 μL) at room temperature for 24 h. Then, the samples were taken off and sprayed thoroughly with deionized water and then stored for further analysis. Alternatively, coating may be prepared using methanol and tris-buffer.

Water Contact Angle Measurements

We utilized water contact angle measurements to analyze the water wettability of the coated substrates. A water droplet of 4 microliters was placed on the working substrate followed by taking the image of the droplet by using a digital camera (Retiga 1300™, Q-imaging Co.™). The value of the contact angle was measured by using the Northern Eclipse™ software.

Electron Microscopy

A Helios™ scanning electron microscopy (SEM) (FIE, USA) with the accelerating voltage of 1 kV was used to analyze the coating morphology utilizing the secondary electron (SE) mode. To preserve the morphology of the wet coating, samples were dehydrated via ethanol dehydration method including serial incubation of the working sample with different ethanol aqueous solutions (50, 60, 70, 80, 90, 95 and 100 volume %) for 10 min within each solution. Ethanol dehydrated samples were placed in a critical point drying machine to dry samples in the presence of supercritical carbon dioxide. To prepare samples for SEM imaging, dried samples were attached on the SEM stub by a double-sided carbon tape followed by mounting with a silver paint to prevent drifting issues in the course of imaging. Then, all mounted samples were coated with a 10 nm iridium (Ir) layer by using a Leica™ sputter coater (working distance: 3 cm and current: 80 mA).

We further utilized the focused ion beam (FIB) of the SEM to create cross-sections to determine the thickness. The FIB created cross-section was imaged at the same time under SEM to measure the thickness of coating layer on silicon wafer. We also investigated the dispersion of silver nanoparticles and their size distribution inside the coating utilizing FIB-SEM measurements. We used a method recently reported[63]. Briefly, we initially treated samples with a 2-component epoxy formulation (epoxy precursor and curing agent) to fill up the pores of the coating. Then, the epoxy filled samples were cured at room temperature overnight. The ion beam was used to create cross-section for back-scattered electron (BSE) imaging (working distance: 4 mm, accelerating voltage: 2 kV, current density: 50 pA).

The transmission electron microscopy (TEM) (FEI™, USA) was employed to analyze the size of the silver nanoparticles incorporated into the coating. To prepare TEM samples, the coatings were scraped off by a sharp razor blade from the Si wafer surface and transferred into the Eppendorf tube containing 1 mL tris buffer. Afterwards the tube was placed in the bath sonicator to homogenize the particles. Then a droplet of the prepared suspension was placed on the TEM grids with ultrathin carbon film on a lacey carbon support film. The acceleration voltage used for the TEM analysis was adjusted to be 100 kV.

Atomic Force Microscopy Analysis

The surface topology of coatings was analyzed by using a multimode atomic force microscope with maximum scan size of 130×130 $\mu m^2$. The measurements were performed through a Nanoscope IIIa controller (Digital Instruments™, Santa Barbara, CA). A V-shaped Cantilever made of silicon nitride in front and gold layer at the back for the reflection of the laser beam was utilized. The force-distance data was acquired by conducting out the tip extension and the tip retraction in order. The rate of tip movement was set up to be 0.5 mm/s for both of the extension and the retraction periods. In addition, the topology of the surface was analyzed by using the same tip with a scan rate of 1 Hz.

X-Ray Photoelectron Spectroscopy Analysis

X-ray photoelectron microscopy (XPS) was utilized to assess the incorporation of silver into the coating. An Omicron™ XPS equipped with an EA125 energy analyzer and DAR400 Dual X-ray performing with an Mg Ka source was used. The XPS samples were prepared by coating silicon wafers with coating compositions.

Inductively Coupled Plasma-Optical Emission Spectroscopy (ICP-OES)

The coated PU samples (5×5 mm) were immersed in 1 mL deionized water (DIW) for a month. The whole 1 mL DIW was removed in various intervals and replaced with another 1 mL portion of fresh DIW. The collected supernatant portions were mixed with 2 mL of 2 wt % nitric acid solution and subsequently used to measure the amount of silver ions released from coatings by using an ICP instrument equipped with a Varian 725ES™ Optical Emission Spectrometer (OES). Also, in order to measure the total concentration of silver embedded in the coating, the coating was digested by using nitric acid/hydrogen peroxide (1/1.5) mixture at 100° C. for 2 hrs. The resulting supernatant was diluted with DIW to a total volume of 3 mL and used for ICP-OES analysis.

Surface Zeta Potential Measurements

We used a zeta sizer instrument (Zetasizer™, Malvern Pananalytical™) in order to measure the zeta potential. Surface zeta potential (SZP) extension of the instrument was used to analyze the zeta potential of the coating at the surface. The coated PU samples were mounted on the SZP probe and fitted into a cuvette containing 1 mL zeta potential transfer standard suspension (DTS1235). The zeta potential of the system was measured at different places to extrapolate the surface zeta potential at the surface.

Ellipsometry Analysis

A variable angle spectroscopic ellipsometer (VASE) (J.A. Woollam™, Lincoln, NE) was employed to determine the thickness of thin coatings on silicon wafer. The VASE spectra were obtained at different angles including 55, 65 and 75° in a range of 480-700 nm. The instrument was equipped with an M-2000 50 W quartz tungsten halogen light source to shine samples. A WVASEE32 analysis software was employed to fit the data for determination of the coating thickness.

Bacterial Culture

The bacteria-killing activity of diverse materials (5×5 mm squares)/devices (1 cm-long pieces) treated with different coatings was analyzed by a planktonic growth assay. The uncoated and silver coated materials/devices referred to the controls. We used bacteria stock stored in freezer (−80° C.) to grow and sub-culture different bacterial strains including *P. aeruginosa, E. coli, S. aureus, S. saprophyticus, E. faecalis, K. pneumoniae,* Methicillin-resistant *S. aureus* (MRSA) and *P. mirabilis* at 37° C. Then, the media was sub-cultured to get $1\times10^6$ and $1\times10^8$ CFU/mL in LB medium as the initial concentration for different measurements including challenging conditions and flow experiments. We utilized two different experimental setups for shaking and flow experiments for bacterial growth evaluation on different coatings.

Shaking Experiments (Non-Challenging and Challenging Conditions)

The samples were sterilized by incubating them in 48-well plate containing 1 mL of 70% ethanol solution for 5 min. Then samples were washed with LB three times. Once the last washing portion of LB is removed, 500 μL of the sub-cultured bacterial solution (initial concentration: $1\times10^5$ or $1\times10^6$ CFU/mL) was poured into the same well containing the coated materials/devices. The samples were placed on the shaker at 150 rpm at 37° C. Every 24 h, the half of the medium was replaced with the fresh LB. Samples were removed at specified time intervals and analyzed for biofilm formation.

Flow Experiments (Challenging Conditions)

The samples (5×5 mm PU pieces) were placed inside a rubber tubing. The tubing containing samples was sterilized using autoclave. The tubing was wrapped around with a peristatic pump and the flow rate was set up at 2 mL/min. The ends of tubing were placed in a it Erlenmeyer flask containing 400 mL bacterial solution (initial concentration: $1\times10^8$ CFU/mL). Every 24 h, the half of the media was replaced with fresh LB. Samples were removed at specified time intervals and analyzed for biofilm formation.

Planktonic Growth Analysis

A portion of media was removed and transferred to sterile tubes at different times in the case of 48-well plate study. Then they are serially diluted and used to count the number of planktonic colonies through the agar-plate method. Actually, a portion of diluted solutions (10 μL) was placed on pre-set agar plates and stored at 37° C. overnight. Then, the number of planktonic colonies appeared on the plate was counted.

Bacterial Adhesion Analysis

The samples were removed from the bacteria culture in at different times and rinsed with 1 mL sterile PBS for five times. Then, the samples were gently immersed in a volume of 500 μL fluorescent dye solution containing SYTO9 (3 μl/ml)/propidium iodide (3 μL/mL) dyes dissolved in DIW. After 20 min, the samples were removed and gently washed with 1 mL sterile DIW for three times followed by dehydration process through the same gradient ethanol method described earlier. Finally, the dehydrated samples were observed under a fluorescence microscope (Zeiss Axioskop 2 plus™, Carl Zeiss Microimaging Inc.™).

To count the number of colonies attached to the surface of the samples, we utilized agar plating method. The samples were removed and washed with sterile PBS for five times and then transferred to Eppendorf™ tubes containing 1 mL sterile PBC. The tubes were placed in sonication bath for 10 min. Afterwards, the supernatants were removed and serially diluted with sterile PBS. A portion of diluted solutions (10 μL) was placed on pre-set agar plates and stored at 37° C. overnight to appear colonies.

Stability Measurements

PU samples (5×5 mm) were coated with the SLAB-C composition. The coated samples were exposed to different storage and sterilization conditions. Afterwards, the exposed SLAB-C coated samples were tested in terms of anti-adhesive activity against *E. coli* in non-challenging conditions. For storage analysis, samples were left for two months on the benchtop in contact with air at room temperature. Another stability test was performed by exposure of the sample to ultrasound conditions. To do this, the sample in the Eppendorf™ tube containing 1 mL PBS was kept in the sonication bath for 10 min. In the case of sterilization test, the sample was placed in autoclave conditions used for sterilization of equipment/solids for 1 h.

To test the stability of the coating in exposure to sonication, the sample (SLAB-C coated PU) in an Eppendorf™ tube containing 1 mL PBS was placed in a sonication bath over 10 min. in the case of autoclave, the sample was placed in an autoclave in wet conditions.

In Vivo Studies

The animal experimental protocols were approved by the University Animal Ethics committee at The University of British Columbia.

Subcutaneous Model in Rats

To determine efficacy of our coating to prevent bacterial biofilm formation and subsequent infection in the in vivo setting, we utilized a subcutaneous implant infection model in rats. For this, an 8 mm incision was made on either side of the median line on the dorsal aspect of each animal. A subcutaneous pocket was formed by blunt dissection technique large enough to insert a 1 cm×0.5 cm titanium wire implant that was either coated or uncoated. Each animal received a SLAB-C coated sample as well as a control (bare titanium). Infection was induced by the introduction of $1\times10^8$ *P. aeruginosa* 01 into the pocket. Following implantation, the incisions were closed with absorbable sutures in a subcuticular fashion and the animals were recovered for 7-days. On day 7, animals were sacrificed, implants removed and adherent bacteria were quantified using spot plating and CFU counts of serially diluted samples.

Percutaneous Model in Mice.

We also utilized a percutaneous model previously reported in our groups to analyze the activity of the coating on 24 G PU IV catheters[31]. Briefly, the catheters were coated utilizing a syringe pump providing a slow flow of coating suspension (500 μL/h). The outside of the catheter was coated by dipping the internally coated catheter in the coating suspension. A 4 mm-long piece of the catheter was cut from the tip of the catheter and re-assembled again. The reassembled piece was pushed into the bladder and left inside while pulling the needle out under ultrasound guidance. One day after catheter implantation, the bladder of all anaesthetized mice was percutaneously treated with either *P. aeruginosa* or MRSA ($1\times10^8$ CFU/mL in 50 μL PBS). After 3 days, the mice were sacrificed by $CO_2$ asphyxiation. Urine present in the bladder was collected and the number of bacteria in urine was counted utilizing spot plating method. The indwelling catheters were removed and rinsed with sterile PBS and placed in Eppendorf™ tubes containing 1 mL sterile PBS under sonication for 10 min. The supernatants were serially diluted and spotted on the agar plate to count the number of bacterial colonies attached to the surface of catheter.

Toxicity Analysis of the Coating in Rats.

The coated and uncoated Ti wire implants were subcutaneously inserted at the back of rats. After 7 days, the rats were scarified using $CO_2$. The implanted samples were removed and fixed using 10% neutral buffered formalin. The fixed samples were mounted in paraffin and sectioned into ~4 μm followed by staining with Hematoxylin and eosin stain (H&E) kit. The sectioned samples were visualized by an optical microscope (Zeiss Axioskop 2 plus™, Carl Zeiss Microimaging Inc.™).

Antiviral and Antibacterial Activity of the Coating with Four Components (PDA/PEI/uhPDMA/Ag) on Polypropylene (PP) Masks Coating Preparation To prepare the Ag control coating, LMW-PEI (1.5 mg/mL) and silver nitrate (0.5 mg/mL) was dissolved in tris buffer solution (10 mM, pH 8.5). DA (2 mg/mL) was added to the resulting solution. The three-component solution was vortexed for 30 s to prepare the PDA suspension. Then, the PDA suspension (1 mL) was transferred to the well (24-well plate) containing the PP mask piece (1 cm×1 cm). The well plate was covered with parafilm to prevent the water loss upon coating process. After 24 h, the substrate was removed, washed gently with DIW and dried in air.

To prepare the PDMA lead coating, uhPDMA (5 mg/mL) (Mn-925 kDa, PDI-1.25) was dissolved in tris buffer solution (10 mM, pH 8.5). LMW-PEI (1.5 mg/mL), silver nitrate (0.5 mg/mL) and DA (2 mg/mL) were added to the uhPDMA solution and mixed on the vortexer vortexed for 30 s. Then, the resulting PDA suspension was transferred to the well containing the polypropylene (PP) mask piece (1 cm×1 cm) and kept for 24 h at room temperature with parafilm cover on top. Finally, the substrate was taken out, washed gently with DIW and dried in air.

Antibacterial Assay

The bacteria-killing activity of mask pieces (1×1 cm squares) treated with different coatings was analyzed by a planktonic growth assay. The uncoated and Ag control coated pieces referred to the controls. We used bacteria stock stored in freezer (−80° C.) to grow and sub-culture *E. coli* at 37° C. Then, the media was sub-cultured to get $1\times10^6$ CFU/mL in LB medium. The samples were sterilized by incubating them in 24-well plate containing 0.5 mL of 70% ethanol solution for 5 min. Then samples were washed with LB three times. Once the last washing portion of LB is removed, 0.5 mL of the sub-cultured bacterial solution was poured into the same well in which samples bound. The samples were placed on the shaker at 100 rpm at 37° C. Samples were removed at specified time intervals and analyzed for planktonic and bacterial adhesion assessments.

To count the number of planktonic bacteria, a portion of media was removed and transferred to sterile tubes at different times. Then they are serially diluted and used to count the number of planktonic colonies through the agar-plate method. A portion of diluted solutions (10 μL) was placed on pre-set agar plates and stored at 37° C. overnight. Then, the number of planktonic colonies appeared on the plate was counted.

To assess the surface of mask pieces incubated with bacteria, the samples were removed from the bacterial culture after 24 h and rinsed with 1 mL sterile PBS for three times. Then, the samples were gently immersed in a volume of 0.5 mL fluorescent dye solution containing SYTO9 (3 μL/mL)/propidium iodide (3 μL/mL) dyes dissolved in DIW. After 20 min, the samples were removed and gently washed with 1 mL sterile DIW for three times. Finally, the samples were observed under a fluorescence microscope (Zeiss Axioskop™ 2 plus, Carl Zeiss Microimaging Inc.™).

To count the number of colonies attached to the surface of the samples, we utilized agar plating method. The samples were removed and washed with sterile PBS for three times and then transferred to Eppendorf™ tubes containing 1 mL sterile PBC. The tubes were placed in sonication bath for 10 min. The supernatants were removed and serially diluted with sterile PBS. A portion of diluted solutions (10 μL) was placed on pre-set agar plates and stored at 37° C. overnight to appear colonies.

Antiviral Assay

Virus (HCoV-229E, 1×105 PFU/mL) was diluted in 100 uL of opti-mem which was then pipetted directly onto the material surface in a 24 well plate. The plate was moderately shaken and then allowed to incubate at room temperature for the amount of time shown. After the time, the virus was absorbed in 500 uL of opti-mem for 30 minutes. The virus was then collected, and flash frozen in dry ice. Following this, a plaque assay was performed.

Huh7 cells were seeded at 90% confluency. Serial dilutions of the virus were performed in 900 uL opti-mem media. The media was removed from the cells and washed once with warm PBS. Following this, 900 μL of the diluted virus was added to the cells and allowed to absorb for 2 hours. The virus was then taken off, the cells were washed with PBS and 1% methylcellulose:DMEM was added to the cells. The cells incubated at 33° C. for 5 days. After 5 days, the methylcellulose was removed, and the cells were stained with 1% crystal violet. The plaques were counted and recorded as PFU/mL.

Coating Component or Formulation Preparation for Initial Evaluation

Preparation of dopamine (DA) containing solutions for coating preparation.

The following formulations were used initially to investigate the coating preparation and to determine the incorporation and release of pharmaceutically active agents. Agents were purchased from Sigma Aldrich™. Different pharmaceutically active agents were used in the coating preparation (see Examples 120-134 as shown in TABLE 6). The following coating compositions and protocols were used to illustrate the strategy.

DA containing docetaxel solution without PDMA—Docetaxel (0.4, 1 and 1.6 mg) was dissolved in methanol (0.6 mL). Afterwards, PEI (700Da, 3 mg), tris buffer (pH 8.5, 1.4 mL) and dopamine hydrochloride (4 mg) were added in order. The final solution was vortexed for 10 sec.

uhPDMA containing docetaxel solution—Docetaxel (0.4, 1 and 1.6 mg) was dissolved in methanol (0.6 mL). Afterwards, PEI (700 Da, 3 mg), uhPDMA (4 or 10 mg; Mn-925 KDa, PDI-1.25) dissolved in tris buffer (pH 8.5, 1.4 mL) were added in order. Dopamine hydrochloride (4 mg) was dissolved in the solution prepared. The final solution was vortexed for 10 sec.

DA containing estradiol solution—Docetaxel (0.4 and 1 mg) was dissolved in methanol (0.6 mL). Afterwards, PEI (700 Da, 3 mg), tris buffer (1.4 mL) and dopamine hydrochloride (4 mg) were added in order. The final solution was vortexed for 10 sec.

uhPDMA containing estradiol solution—Estradiol (0.4 and 1 mg) was dissolved in methanol (0.6 mL). Afterwards, Afterwards, PEI (700 Da, 3 mg), uhPDMA (4 or 10 mg; Mn-925 KDa, PDI-1.25) dissolved in tris buffer (pH 8.5, 1.4 mL) were added in order. Dopamine hydrochloride (4 mg) was dissolved in the solution prepared. The final solution was vortexed for 10 sec.

DA containing dexamethasone solution—Dexamethasone phosphate (0.4, 1 and 1.6 mg) was dissolved in methanol (0.2 mL). Afterwards, PEI (700 Da, 3 mg), tris buffer (1.8 mL) and dopamine hydrochloride (4 mg) were added in order. The final solution was vortexed for 10 sec.

uhPDMA containing dexamethasone solution—Dexamethasone phosphate (0.4, 1 and 1.6 mg) was dissolved in methanol (0.2 mL). Afterwards, PEI (700 Da, 3 mg), uhPDMA (4 or 10 mg; Mn-925 KDa, PDI-1.25) dissolved in tris buffer (pH 8.5, 1.4 mL) were added in order. Dopamine hydrochloride (4 mg) was dissolved in the solution prepared. The final solution was vortexed for 10 sec.

General Procedure for Coating Preparation:

The coating was prepared in a single step without the need of any pretreatment on the substrates. The coating component or formulation solution described previously (0.4 mL) was transferred to a well (48-well plate) containing substrate (piece of silicon wafer, 5 mm×5 mm) at room temperature. After 24 h, the substrate was removed and washed gently with miliQ water and dried in air.

Experimental for drug release: The coated substrate was incubated in a 48-well plate in PBS (10 mM, pH-7.4) (total volume 1 mL) at 370 C in shaker at speed of loo rpm. At different time points the supernatants were removed and the absorbance of the solution was measured at the characteristic wave length using UV-Vis spectroscopy. The concentration of the agents was determined using a calibration curve prepared using pure bioactive agents in the same media.

Scanning electron microscopy analysis: A Helios™ scanning electron microscopy (SEM) (FIE™, USA) with the accelerating voltage of 1 kV was used to analyze the coating morphology utilizing the secondary electron (SE) mode. To prepare samples for SEM imaging, dried samples were attached on the SEM stub by a double-sided carbon tape followed by mounting with a silver paint to prevent drifting issues while imaging. Then, all mounted samples were coated with iridium (20 nm) by using a Leica™ sputter coater (working distance: 3 cm and current: 80 mA). We also utilized energy dispersive X-ray (EDS) accessory equipped on the SEM instrument. An accelerating voltage of 10 KV was used to scan the surface of the coating in back-scattered electron (BSE) mode.

Antifouling Measurements:

Resistance to protein adsorption: Protein (FITC-BSA, 1 mg/mL) solution was incubated with coated substrates in PBS solution for 1 h at 37° C. The samples were rinsed with PBS solution and visualized using fluorescence microscopy measurements.

Resistance to bacterial adhesion: Bacterial (*E. coli*) (1×106 CFU/mL) suspension was cultured over substrate (coated substrate) in LB media for 24 h. The substrate was rinsed with PBS for 3 times and stained with Syto9/PI solution and visualized using fluorescent microscopy.

Coating Formulation and Component Preparation:

Docetaxel/uhPDMA/DA solution preparation (Docetaxel coating): Docetaxel was dissolved in methanol at a concentration of 1.67 mg/mL. uhPDMA was prepared at a concentration of 2.9 mg/mL in 10 mM Tris buffer, pH 8.5. PEI (700 Da) was prepared in water with a final concentration of 100 mg/mL. The docetaxel solution (3 mL), uhPDMA (Mn-925 kDa, PDI-1.25) solution (6.7 mL) and PEI solution (150 μL) were added into a vial subsequently. Afterwards, dopamine hydrochloride (20 mg) was added. The solution was vortexed for 10 sec.

Dexamethasone/uhPDMA/DA solution preparation (Dexamethasone coating): Dexamethasone was dissolved in Tris buffer at a concentration of 1.67 mg/mL. uhPDMA was prepared at a concentration of 2.9 mg/mL in 10 mM Tris buffer, pH 8.5. PEI (700 Da) was prepared in water with a final concentration of 100 mg/mL. The Dexamethasone solution (3 mL), uhPDMA (Mn-925 kDa, PDI-1.25) solution (6.7 mL) and PEI solution (150 uL) were added into a vial subsequently. Afterwards, dopamine hydrochloride (20 mg) was added. The solution was vortexed for 10 sec.

Paclitaxel/uhPDMA/DA solution preparation (Paclitaxel coating): Paclitaxel was dissolved in methanol at a concentration of 0.5 mg/mL. uhPDMA was prepared at a concentration of 2.9 mg/mL in 10 mM Tris buffer, pH 8.5. PEI (700 Da) was prepared in water with a final concentration of 100 mg/mL. The paclitaxel solution (4 mL), uhPDMA (Mn-925 kDa, PDI-1.25) solution (6 mL) and PEI solution (150 μL) were added into a vial subsequently. Afterwards, dopamine hydrochloride (20 mg) was added. The final solution was vortexed for 10 sec.

Coating synthesis: The coating is synthesized in a one-step as illustrated previously. The solution (0.4 mL) was transferred to a well (48-well plate) containing substrate (silicon wafer piece, 5 mm×5 mm). After 24 h, the substrate was removed and washed gently with miliQ water and dried in air. The coating was characterized using various surface analytical techniques including scanning electron microscopy analysis, contact angle measurements and FT-IR measurements.

Drug release measurements: The coated silicon wafers were added into the wells of 96 well-plate and immersed in PBS buffer (200 μL) was added to each well. At day 1 and day 7, the solution was collected and the drug concentration was measured using UV-Vis spectroscopy and standard curves prepared using pure bioactive agents. The released solution was diluted to 1 mL using PBS before the measurements. The concentration for eluted docetaxel, dexamethasone and paclitaxel was 12.5 ppm (microgram/mL), 0.64 ppm (microgram/mL) and 1.3 ppm (microgram/mL) at day 1. The concentration for eluted docetaxel, dexamethasone and paclitaxel was 13.7 ppm (microgram/mL), 0.89 ppm (microgram/mL) and 1.4 ppm (microgram/mL) at day 7. The data demonstrate controlled release of different pharmaceutically active agents over several days.

Biological Activity Measurements in Cancer Cells

Coated silicon wafer samples: Control coating—no drug; Docetaxel coating; Dexamethasone coating; and Paclitaxel coating.

Cell media: RPMI; and DMEM.

Cells: Various cancer cell lines from ATCC used for evaluating the drug activity. These cell lines used are for illustrative purposes. We used T24, HepG2, PC-3, LNCaP cell lines for the study Assay used: CellTiter 96™ AQ$_{ueous}$ One Solution Cell Proliferation Assay, Promega Corporation™, Madison, WI, USA.

Protocol for the study: Coated silicon wafer samples were transferred into individual wells of a 96 well plate and UV irradiated for 1 hour for sterilization. 96-well plates were stored under sterile conditions until use. Under sterile conditions, 200 μL of cell media was added to corresponding silicon wafer sample wells, the samples were immersed in the media and left to allow for drug elution at room temperature under sterile conditions. The cell media addition to samples and length of incubation is detailed above in TABLE 7. Cell media was recovered at t=1 day, and stored in microcentrifuge tubes until use. At 70% confluency, cells were dissociated and seeded at 10,000 cells per well in 96 well plates. The cells were left to adhere for 24 hours at 37° C. and 5% $CO_2$ for 24 hours. Collected cell media from the drug elution from the previous step were added to corresponding cell lines based on their respective media and allowed to incubate for 24 hours as “drug treatment”. After “drug treatment”, the cells were washed twice with PBS and subjected to an MTS viability assay (followed manufacturer’s protocol). Following controls were used (High control—fresh media; Low control—media+DMSO; and Background control—no cells).

Coating Methods

To prepare dip coated substrate, a substrate was immersed in coating solution for 24 hours followed by washing the substrate and air drying. To spray coat, a substrate was placed tilted and sprayed using a spray bottle. The thickness and stability of the spray coated substrate was adjusted using the volume of solution sprayed. The sprayed substrate was left on the benchtop overnight for air drying.

To coat flat substrates with coating formed at water-air interface, the substrate was faced down on the surface of the coating layer formed at the interface of air and coating solution. After 10 minutes the substrate was removed and flipped down so that the coated side faced upwards. The coated substrate was left on the benchtop overnight for air drying. To coat cylindrical substrates (for example, a catheter), the coating formed at the interface of air and coating solution was floated on water. Then, the catheter was placed underneath the coating layer floating on water followed by removal of the catheter with the coating bound to surface. The coated catheter was left overnight for air drying. Flow coating is different from interfacially coating, whereby the coating solution is allowed to flow over the surface to generate a coating. It works for tubular structures very well (e.g. catheters).

Additional Characterization of Coatings

Effect of uhPDMA on Lubrication Properties:

The lubrication properties of coating were assessed using a conventional T50 pin-on-disk tribometer (Nanovea™, Irvine, CA, US). The friction coefficient was measured during the experiment. A constant disk rotation speed of 60 revolutions per min (RPM) was applied over a wear radius of 5 mm, with a constant weight of 2 N was applied normally to the pin. Polydimethylsiloxane (PDMS), SYLGARD 184™ (Dow Corning™, Midland, MI, US), tribo-pairs were used to mimic human soft tissue with Mili-Q water used as the lubricant for friction assessment. The PDMS balls with a diameter of 6 mm were cased in a 3D printed mould with a standard 10:1 mixing ratio. The PDMS tribo-pair was cured at room temperature for 24 followed by high-temperature curing at 100° C. for 35 min. This allowed the air bubbles trapped in the 3D printed mould during the casting process to have sufficient time to surface. The PDMS tribo-pair was then undergoing allylamine plasma treatment and coating after 24 h resting at room temperature to render the hydrophobic surface into hydrophilic.

Coating Stability Measurements:

The coated samples were exposed to different testing conditions. Afterwards, the exposed coated samples were tested in terms of anti-adhesive activity against *E. coli* in a bacteria culture media. The surface morphology of the exposed coatings was also assessed using SEM and compared with the original coatings. The first stability test was performed by exposure of the sample to ultrasound conditions.

To perform the experiment, the coated substrate was placed in a microtube containing 1 mL PBS. The tube was placed in the sonication bath for 10 min and performance of the coating was measured. To assess the rub resistance of the coating, the coated substrate was rubbed out back and forth for 30 times using a piece of paper towel. Then, the amount of coating detached was visualized. Also, the anti-adhesive property of the coating was compared. In the case of sterilization test, the coated substrate was placed in autoclave conditions used for sterilization of equipment/solids for 1 h or immersed in ethanol 70 vol % for 24 h.

PDA/PDMA/Ag Mask Coating—Dip Coating Method (Coating 1)

The uhPDMA (Mn-925 kDa, PDI-1.25) was prepared at a concentration of 24 mg/mL in sodium acetate buffer (50 mM, pH=5). Dopamine was freshly prepared at a concentration of 24 mg/mL in sodium acetate buffer (50 mM, pH=5) before each experiment. Sodium periodate was freshly prepared at a concentration of 86 mg/mL in sodium acetate buffer (50 mM, pH=5). The dopamine solution was then mixed with uhPDMA solution with a volume ratio of 1:5 (dopamine:uhPDMA). The solution was then mixed with sodium periodate solution with equal volume (1:1) to generate a final concentration of uhPDMA at 10 mg/mL, dopamine at 2 mg/mL and NaIO4 at 43 mg/mL. Silver nitrate solution (7.5 uL, 50 mg/mL) was added into the solution and vortexed for 10 s. The mask (1 cm×1 cm) (polypropylene) was dipped into a mixed solution (0.7 mL) of uhPDMA, dopamine, silver, NaIO4 in the wells of 24 well-plate for 2 hr. The coated mask was then rinsed by Mill-Q water and dried at ambient room temperature.

PDA/PDMA/Ag Mask Coating—Spray Coating Method (Coating 2)

The uhPDMA (Mn-925 kDa, PDI-1.25) was prepared at a concentration of 24 mg/mL in sodium acetate buffer (50 mM, pH=5). Dopamine was freshly prepared at a concentration of 24 mg/mL in sodium acetate buffer (50 mM, pH=5) before each experiment. Sodium periodate was freshly prepared at a concentration of 8.6 mg/mL in sodium acetate buffer (50 mM, pH=5). The dopamine solution was then mixed with uhPDMA solution with a volume ratio of 1:5 (dopamine:uhPDMA). The solution was then mixed with sodium periodate solution with equal volume (1:1) to generate a final concentration of uhPDMA at 10 mg/mL, dopamine at 2 mg/mL and NaIO4 at 4.3 mg/mL. Silver nitrate solution (7.5 uL, 50 mg/mL) was added into the solution and vortexed for 10 s and transferred to a spray bottle. The solution (6 mL) was sprayed onto the mask (9 cm×7.5 cm) (polypropylene) and dried and ambient condition. The coated mask was then rinsed by Mill-Q water and dried at ambient room temperature.

Antimicrobial Efficiency of PDA/PDMA/Ag Mask Coatings

Coated and uncoated mask samples were cut into 1×1 cm pieces and suspended in 70% ethanol for 5 min. The ethanol was removed, and samples were rinsed in sterile phosphate-buffered saline for a total of 3 times. The last rinse was removed, and each sample was exposed to LB medium containing approximately 1 mL of 5×104 CFU/mL of *S. aureus*. All samples were incubated at 37° C. on a 360° rotator. At 30 min, 1 hr and 2 hr, the culture medium (10 µL) was taken from each sample and then serially diluted and plated on LB agar for CFUs.

Antiviral Efficiency of PDA/PDMA/Ag Coating on the Mask

Human coronavirus 229E (HCoV-229E) with 1×105 Plaque Forming units (100 µL) was placed it on the mask for a certain period (0, 0.5, 1, 3, 6, 10, 24, 48, 72, 96 h). Opti-mem (500 µL) was added on the mask to absorb the virus off the mask. Serial dilutions were performed and the virus concentration (PFU/mL) was measured by the plaque assay.

EXAMPLES

Example 1

Design and Development of the SLAB-C Coating

Catechol chemistry was utilized to generate a self-limiting coating containing tiny in-situ formed silver nanoclusters (<10 nm) through a simple and universal coating process. The objective was to generate a thick anti-adhesive coating containing silver nanoclusters with an extended release profile to inhibit bacterial growth and biofilm formation over longer periods of time. The inventors hypothesized that a thick porous coating containing tiny metallic nanoclusters would give a sustained release profile.

Figure 8:
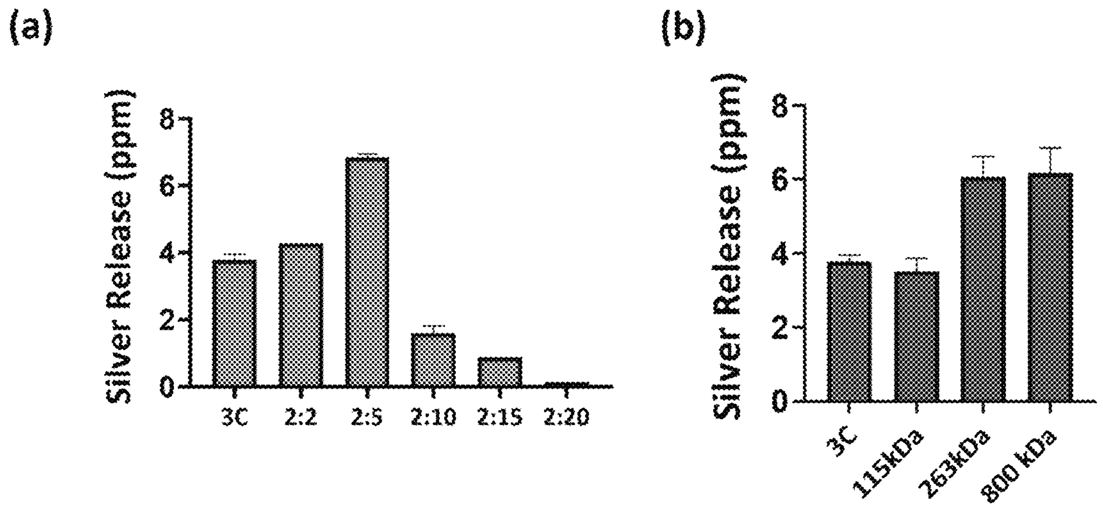
FIG. 8 shows an ICP-OES analysis, wherein the amount of silver released from the coatings based on different (a) DA:PDMA ratios and (b) molecular weights of PDMA after 4 weeks incubation with DIW.

Initially a high-throughput screening assay was used to identify the optimal coating composition containing a binder compound, cross-linking agent and metal salt with or without ultra-high molecular weight hydrophilic polymers for providing antibacterial and anti-adhesive properties. The optimal coating composition was found to be containing dopamine (DA), polyethylenimine (PEI) and silver nitrate in terms of its anti-adhesive activity and coating uniformity (TABLE 1, FIGS. 1*a*, 5, 6, and 7). However, coating composition without the ultra-high molecular weight polymer did not provide long-term anti-biofilm activity. A screening of a diverse library of hydrophilic polymers with different molecular weights and chemistries in combination with DA, PEI and silver nitrate generated a 4 component coating composition which can be applied to diverse substrates from water based solution (tris buffer solution at pH=8.5) (FIG. 1*b*). The best composition was found to consist of DA (2 mg/mL), PEI (1.5 mg/mL), silver nitrate (0.5 mg/mL) and ultrahigh molecular weight poly (N,N-dimethyl acrylamide) (uhPDMA) (5 mg/mL) (FIG. 1*c*). Among diverse hydrophilic polymers tested, the coating based on uhPDMA yielded the best antiadhesive activity (FIG. 1*d*) and also generated significantly higher silver release over long-term (FIG. 1*e*). Also, 2:5 DA:PDMA ratio was found to have the best sustained silver release profile (FIG. 8*a*). The concentration of uhPDMA was also an important parameter. The coating formed with <5 mg/mL PDMA concentration failed to generate excellent anti-adhesive performance (FIG. 1*f*). Among three different molecular weights tested, the coating formed with uhPDMA (800 kDa) gave the best anti-adhesive activity with extended release profile (FIG. 1*g* and FIG. 8*b*). The optimal coating fully suppressed the attachment of *E. coli* on polyurethane substrate over long-term (>4 weeks) compared to the control coatings (FIG. 1*h*).

TABLE 1

The compositions of samples used for used in a high-throughput screening.

| Colormap Cell (FIG. 1(a)) | Catechol | Cross-linking Agent | Metal Salt |
|---|---|---|---|
| A1 | L-DOPA (2 mg/mL) | Polyethylenimine (1.5 mg/mL) | Silver Nitrate (0.5 mg/mL) |
| A2 | 1,3,5-Benzenetriol (2 mg/mL) | Polyethylenimine (1.5 mg/mL) | Silver Nitrate (0.5 mg/mL) |
| A3 | Resorcinol (2 mg/mL) | Polyethylenimine (1.5 mg/mL) | Silver Nitrate (0.5 mg/mL) |
| A4 | Dopamine (2 mg/mL) | Gentamicin (0.5 mg/mL) | Silver Nitrate (0.5 mg/mL) |
| A5 | Dopamine (2 mg/mL) | Gentamicin (1.5 mg/mL) | Silver Nitrate (0.5 mg/mL) |
| A6 | Dopamine (2 mg/mL) | Amine modified polyethylene glycol (0.5 mg/mL) | Silver Nitrate (0.5 mg/mL) |
| A7 | Dopamine (2 mg/mL) | Amine modified polyethylene glycol (1.5 mg/mL) | Silver Nitrate (0.5 mg/mL) |
| A8 | Dopamine (2 mg/mL) | Poly(N-vinyl amine) (0.5 mg/mL) | Silver Nitrate (0.5 mg/mL) |
| A9* | Dopamine (2 mg/mL) | Polyethylenimine (1.5 mg/mL) | Silver Nitrate (0.5 mg/mL) |
| A10 | Dopamine (2 mg/mL) | Polyethylenimine (1.5 mg/mL) | Gold (III) Chloride (0.5 mg/mL) |
| A11 | Dopamine (2 mg/mL) | Polyethylenimine (1.5 mg/mL) | Copper (II) Nitrate (0.5 mg/mL) |
| A12 | Dopamine (2 mg/mL) | Polyethylenimine (1.5 mg/mL) | Gallium Nitrate (0.5 mg/mL) |
| A13 | Dopamine (2 mg/mL) | Polyethylenimine (1.5 mg/mL) | Nickel Nitrate (0.5 mg/mL) |
| B1 | Dopamine (2 mg/mL) | Polyethylenimine (1.5 mg/mL) | Zinc Nitrate (0.5 mg/mL) |
| B2 | Dopamine (2 mg/mL) | PVAm1.5 | Silver Nitrate (0.5 mg/mL) |
| B3 | Pyrocatechol (2 mg/mL) | Gentamicin (1.5 mg/mL) | Silver Nitrate (0.5 mg/mL) |
| B4 | Pyrocatechol (2 mg/mL) | Gentamicin (1.5 mg/mL) | Copper (II) Nitrate (0.5 mg/mL) |
| B5 | Pyrocatechol (2 mg/mL) | Amine modified polyethylene glycol (0.5 mg/mL) | Silver Nitrate (0.5 mg/mL) |
| B6 | Pyrocatechol (2 mg/mL) | Amine modified polyethylene glycol (0.5 mg/mL) | Copper (II) Nitrate (0.5 mg/mL) |
| B7 | Pyrocatechol (2 mg/mL) | Polyethylenimine (1.5 mg/mL) | Silver Nitrate (0.5 mg/mL) |
| B8 | Pyrocatechol (2 mg/mL) | Polyethylenimine (1.5 mg/mL) | Gold (III) Chloride (0.5 mg/mL) |
| B9 | Pyrocatechol (2 mg/mL) | Polyethylenimine (1.5 mg/mL) | Copper (II) Nitrate (0.5 mg/mL) |
| B10 | Pyrocatechol (2 mg/mL) | Polyethylenimine (1.5 mg/mL) | Gallium Nitrate (0.5 mg/mL) |
| B11 | Pyrocatechol (2 mg/mL) | Polyethylenimine (1.5 mg/mL) | Copper (II) Nitrate (0.5 mg/mL) |
| B12 | Pyrocatechol (2 mg/mL) | Polyethylenimine (1.5 mg/mL) | Zinc Nitrate (0.5 mg/mL) |
| B13 | Pyrocatechol (2 mg/mL) | Poly(N-vinyl amine) (1.5 mg/mL) | Silver Nitrate (0.5 mg/mL) |
| C1 | Pyrocatechol (2 mg/mL) | Poly(N-vinyl amine) (1.5 mg/mL) | Copper (II) Nitrate (0.5 mg/mL) |
| C2 | Pyrogallol (2 mg/mL) | Amikacin (1.5 mg/mL) | Copper (II) Nitrate (0.5 mg/mL) |
| C3 | Pyrogallol (2 mg/mL) | Amikacin (1.5 mg/mL) | Copper (II) Nitrate (1.5 mg/mL) |
| C4 | Pyrogallol (2 mg/mL) | Gentamicin (1.5 mg/mL) | Silver Nitrate (0.5 mg/mL) |
| C5 | Pyrogallol (2 mg/mL) | Gentamicin (1.5 mg/mL) | Copper (II) Nitrate (0.5 mg/mL) |
| C6 | Pyrogallol (2 mg/mL) | Amine modified polyethylene glycol (0.5 mg/mL) | Silver Nitrate (0.5 mg/mL) |
| C7 | Pyrogallol (2 mg/mL) | Amine modified polyethylene glycol (0.5 mg/mL) | Copper (II) Nitrate (0.5 mg/mL) |
| C8 | Pyrogallol (2 mg/mL) | Polyethylenimine (1.5 mg/mL) | Silver Nitrate (0.5 mg/mL) |
| C9 | Pyrogallol (2 mg/mL) | Polyethylenimine (1.5 mg/mL) | Gold (III) Chloride (0.5 mg/mL) |
| C10 | Pyrogallol (2 mg/mL) | Polyethylenimine (1.5 mg/mL) | Copper (II) Nitrate (0.5 mg/mL) |
| C11 | Pyrogallol (2 mg/mL) | Polyethylenimine (1.5 mg/mL) | Gallium Nitrate (0.5 mg/mL) |
| C12 | Pyrogallol (2 mg/mL) | Polyethylenimine (1.5 mg/mL) | Copper (II) Nitrate (0.5 mg/mL) |

TABLE 1-continued

The compositions of samples used for used in a high-throughput screening.

| Colormap Cell (FIG. 1(a)) | Catechol | Cross-linking Agent | Metal Salt |
|---|---|---|---|
| C13 | Pyrogallol (2 mg/mL) | Polyethylenimine (1.5 mg/mL) | Zinc Nitrate (0.5 mg/mL) |
| CD1 | Pyrogallol (2 mg/mL) | Poly(N-vinyl amine) (1.5 mg/mL) | Silver Nitrate (0.5 mg/mL) |
| D2 | Pyrogallol (2 mg/mL) | Poly(N-vinyl amine) (1.5 mg/mL) | Copper (II) Nitrate (0.5 mg/mL) |
| D3 | Serotonin (2 mg/mL) | Gentamicin (1.5 mg/mL) | Silver Nitrate (0.5 mg/mL) |
| D4 | Serotonin (2 mg/mL) | Gentamicin (1.5 mg/mL) | Copper (II) Nitrate (0.5 mg/mL) |
| D5 | Serotonin (2 mg/mL) | Amine modified polyethylene glycol (0.5 mg/mL) | Silver Nitrate (0.5 mg/mL) |
| D6 | Serotonin (2 mg/mL) | Amine modified polyethylene glycol (0.5 mg/mL) | Copper (II) Nitrate (0.5 mg/mL) |
| D7 | Serotonin (2 mg/mL) | Polyethylenimine (1.5 mg/mL) | Silver Nitrate (0.5 mg/mL) |
| D8 | Serotonin (2 mg/mL) | Polyethylenimine (1.5 mg/mL) | Gold (III) Chloride (0.5 mg/mL) |
| D9 | Serotonin (2 mg/mL) | Polyethylenimine (1.5 mg/mL) | Copper (II) Nitrate (0.5 mg/mL) |
| D10 | Serotonin (2 mg/mL) | Polyethylenimine (1.5 mg/mL) | Gallium Nitrate (0.5 mg/mL) |
| D11 | Serotonin (2 mg/mL) | Polyethylenimine (1.5 mg/mL) | Copper (II) Nitrate (0.5 mg/mL) |
| D12 | Serotonin (2 mg/mL) | Polyethylenimine (1.5 mg/mL) | Zinc Nitrate (0.5 mg/mL) |
| D13 | Serotonin (2 mg/mL) | Poly(N-vinyl amine) (1.5 mg/mL) | Silver Nitrate (0.5 mg/mL) |
| E1 | Serotonin (2 mg/mL) | Poly(N-vinyl amine) (1.5 mg/mL) | Copper (II) Nitrate (0.5 mg/mL) |
| E2 | Tannic Acid (2 mg/mL) | Gentamicin (1.5 mg/mL) | Silver Nitrate (0.5 mg/mL) |
| E3 | Tannic Acid (2 mg/mL) | Gentamicin (1.5 mg/mL) | Copper (II) Nitrate (0.5 mg/mL) |
| E4 | Tannic Acid (2 mg/mL) | Amine modified polyethylene glycol (0.5 mg/mL) | Silver Nitrate (0.5 mg/mL) |
| E5 | Tannic Acid (2 mg/mL) | Amine modified polyethylene glycol (0.5 mg/mL) | Copper (II) Nitrate (0.5 mg/mL) |
| E6 | Tannic Acid (2 mg/mL) | Polyethylenimine (1.5 mg/mL) | Silver Nitrate (0.5 mg/mL) |
| E7 | Tannic Acid (2 mg/mL) | Polyethylenimine (1.5 mg/mL) | Gold (III) Chloride (0.5 mg/mL) |
| E8 | Tannic Acid (2 mg/mL) | Polyethylenimine (1.5 mg/mL) | Copper (II) Nitrate (0.5 mg/mL) |
| E9 | Tannic Acid (2 mg/mL) | Polyethylenimine (1.5 mg/mL) | Gallium Nitrate (0.5 mg/mL) |
| E10 | Tannic Acid (2 mg/mL) | Polyethylenimine (1.5 mg/mL) | Copper (II) Nitrate (0.5 mg/mL) |
| E11 | Tannic Acid (2 mg/mL) | Polyethylenimine (1.5 mg/mL) | Zinc Nitrate (0.5 mg/mL) |
| E12 | Tannic Acid (2 mg/mL) | Poly(N-vinyl amine) (1.5 mg/mL) | Silver Nitrate (0.5 mg/mL) |
| E13 | Tannic Acid (2 mg/mL) | Poly(N-vinyl amine) (1.5 mg/mL) | Copper (II) Nitrate (0.5 mg/mL) |

Example 2

Characterization of SLAB-C Coating

Figure 2:
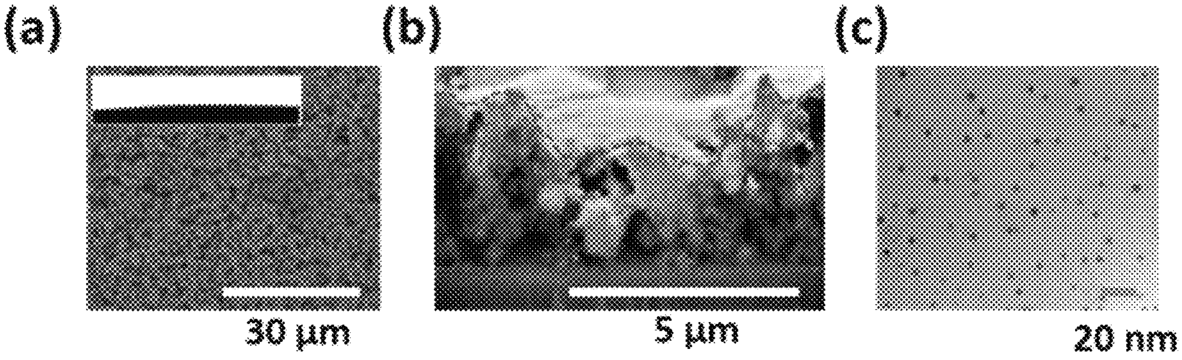
FIG. 2 shows SLAB-C coating characterization, (a) the SEM image of the SLAB-C coating along with the water contact angle image of the SLAB-C coating in the inset; (b) the FIB-created cross-section SEM image of the SLAB-C coating; (c) the TEM image of silver nanoparticles incorporated into the SLAB-C coating; (d) the STEM dark field image (left) and silver mapping (right) of the silver nanoparticles incorporated into the SLAB-C coating; (e) the XPS survey scan of the silver coating and the SLAB-C coating; (f) the surface zeta potential of the silver coating and the SLAB-C coating; (g) the silver release profile for silver coating and SLAB-C coating; (h) the atomic force microscopy curves of the silver coating and the SLAB-C coating; (i) the scanning electron microscopy images of the silicon wafers treated with the SLAB-C composition at different time points (0.5, 2, 8, 12, 24, 48 and 72 h); and (j) the cartoon scheme proposed the mechanism of the SLAB-C film formation.
Figure 2:
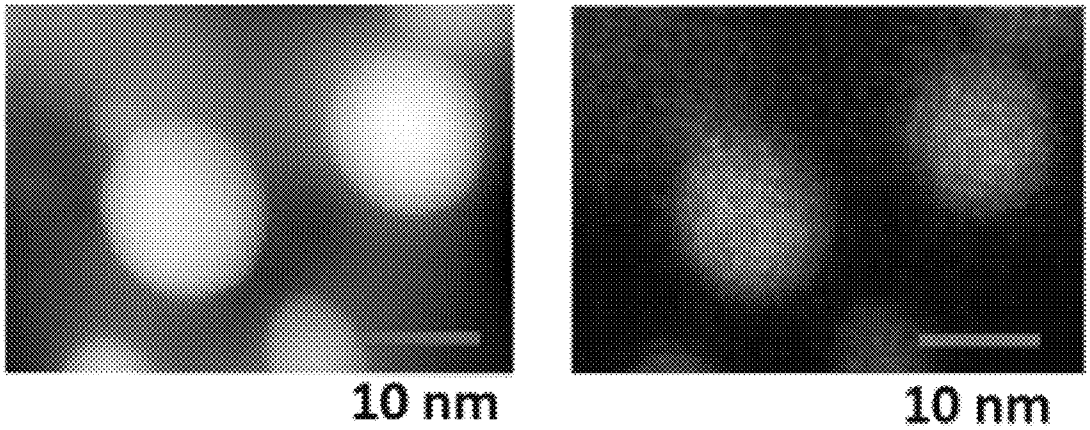
Figure 2:
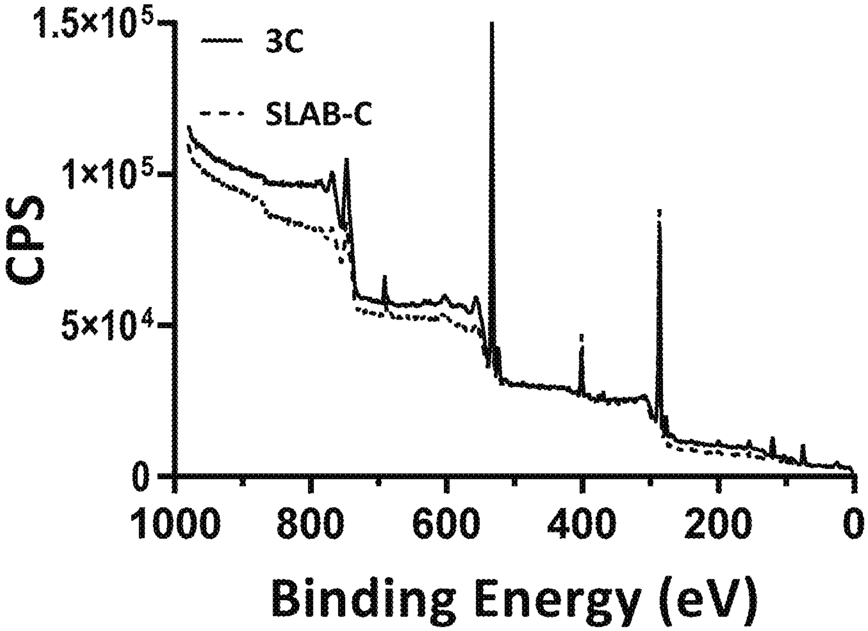
Figure 2:
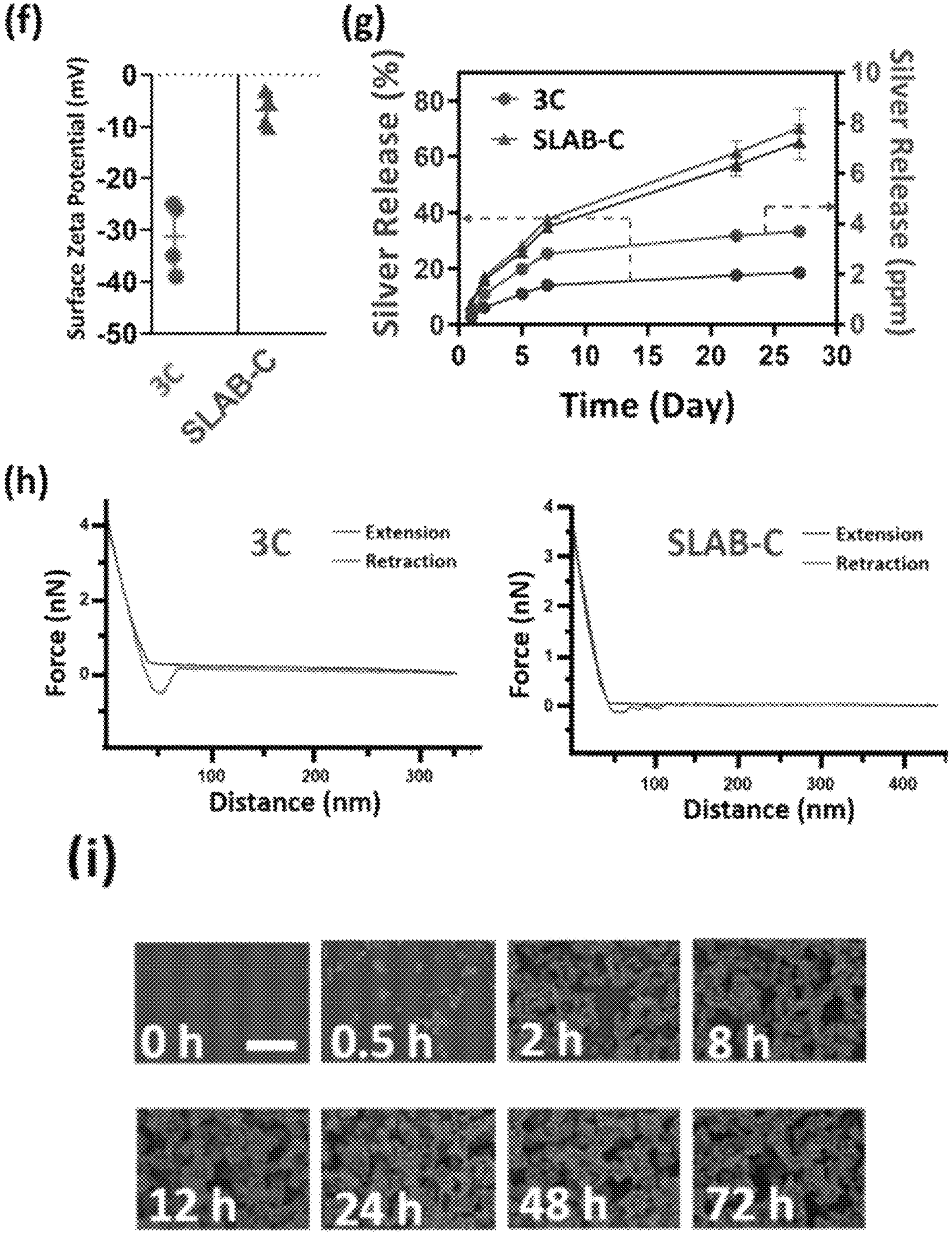
Figure 2:
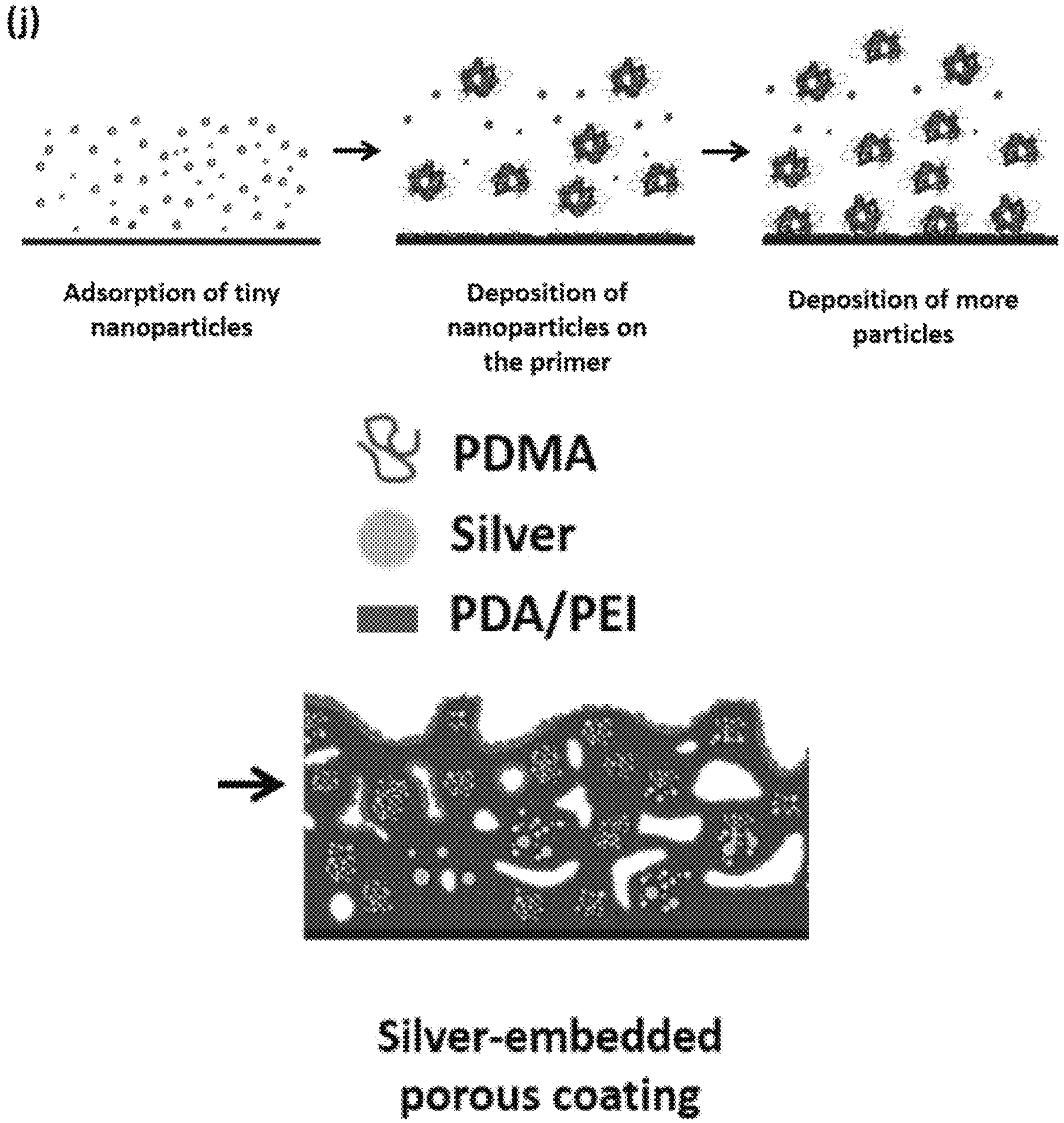
Figure 10:
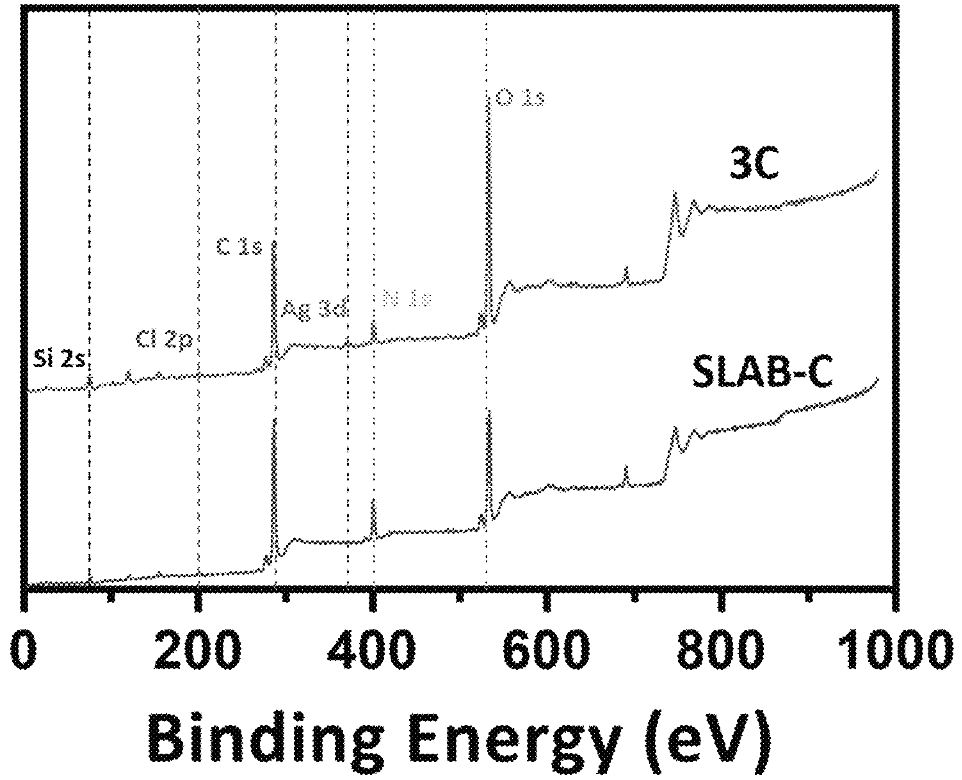
FIG. 10 shows XPS spectra of the 3C coating (upper) and the SLAB-C coating (lower).

We initially utilized electron microscopy techniques to characterize the SLAB-C coating. The results from scanning electron microscopy (SEM) showed that the SLAB-C coating shows a porous colloidal-gel structure (FIG. 2*a*) with very low water contact angle (the inset of FIG. 2*a*). Focused ion beam (FIB) FIB-SEM analysis showed that the SLAB-C coating has a dry thickness of ~3.5 μm (FIG. 2*b*). Transmission electron microscopy (TEM) and scanning transmission electron microscopy (STEM) analysis demonstrated that the size of silver nanoclusters incorporated in the SLAB-C coating is ~10 nm which is much lower than that of silver nanoclusters incorporated in the control coating (FIGS. 2*c, d,* and *f* and TABLE 2). The size of the silver nanoclusters decreased with increasing PDMA content reaching around 5 nm for the coating based on DA:P-DMA=2:10. The x-ray photoelectron spectroscopy (XPS) analysis verified the effective incorporation of silver into the coating indicated by the characteristic peak at 300 eV corresponding to the Ag 3/2d orbital (FIG. 2*e*); the attenuation of the silver peak in the case of SLAB-C coating is attributed to the enrichment of uhPDMA on its surface (FIG. 2*e*, FIG. 10 and TABLE 3).

TABLE 2

The size analysis of nanoparticles incorporated into the 3C and the SLAB-C coatings formed based on different DA:PDMA ratios by using SEM and TEM.

| | Particle Size (nm) by TEM | | Particle Size (nm) by SEM | |
|---|---|---|---|---|
| | Mean | STD | Mean | STD |
| 3C | 48.3 | 16.3 | 77.4 | 30.3 |
| 2:2 | 17.1 | 3.2 | N.A. | N.A. |
| 2:5 | 8.9 | 2.1 | 12.7 | 5.4 |
| 2:10 | 4.3 | 0.9 | 10.2 | 4.2 |

TABLE 3

The chemical composition of coatings.

| | Si (%) | Cl (%) | C (%) | Ag (%) | O (%) | N/C | O/C |
|---|---|---|---|---|---|---|---|
| 3C | 0.77 | 0.90 | 36.69 | 1.02 | 53.64 | 0.189 | 1.461 |
| SLAB-C | 0.01 | 0.02 | 48.29 | 0.03 | 37.77 | 0.288 | 0.783 |

Figure 11:
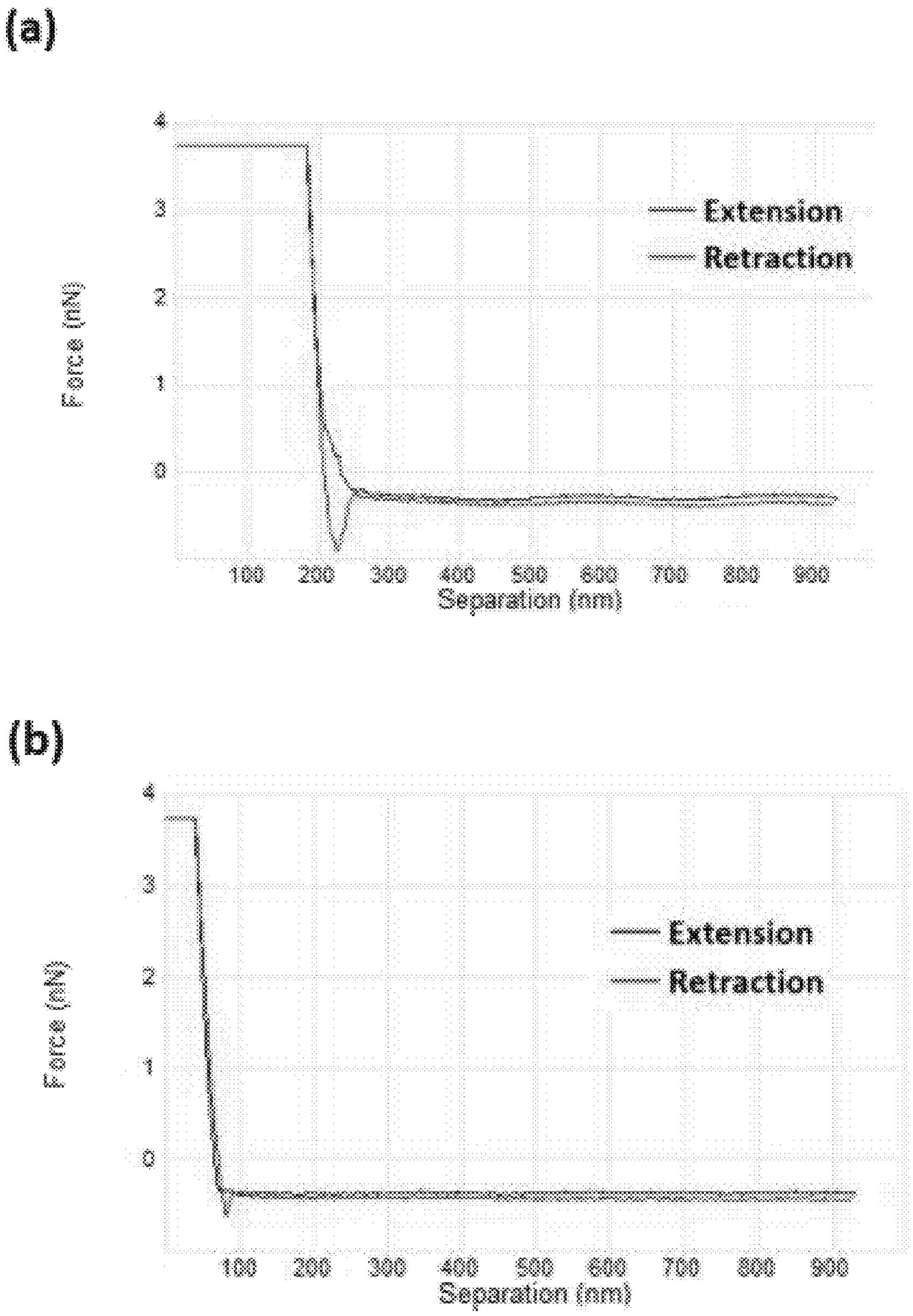
FIG. 11 shows the atomic force microscopy data corresponding to coatings prepared based on different molecular weight of PDMA: (a) 115 kDa and (b) 263 kDa.

The anti-adhesive property of the SLAB-C coating is believed to be due to the surface enrichment with uhPDMA. We employed surface zeta potential measurements and atomic force microscopy (AFM) analysis to probe this. The surface zeta potential of the SLAB-C coating was close to zero demonstrating its neutral surface charge in comparison to a highly negative value for the control coating (~−30 mV) (FIG. 2*f*). AFM force measurements supported the enrichment of uhPDMA on the surface with larger rupture length and considerable decrease in interaction force compared to the control coating (FIG. 2*h*). High molecular PDMA chains are incorporated more on the surface compared to the low molecular weight PDMA chains (FIG. 11*a*, FIG. 11*b*).

Figure 12:
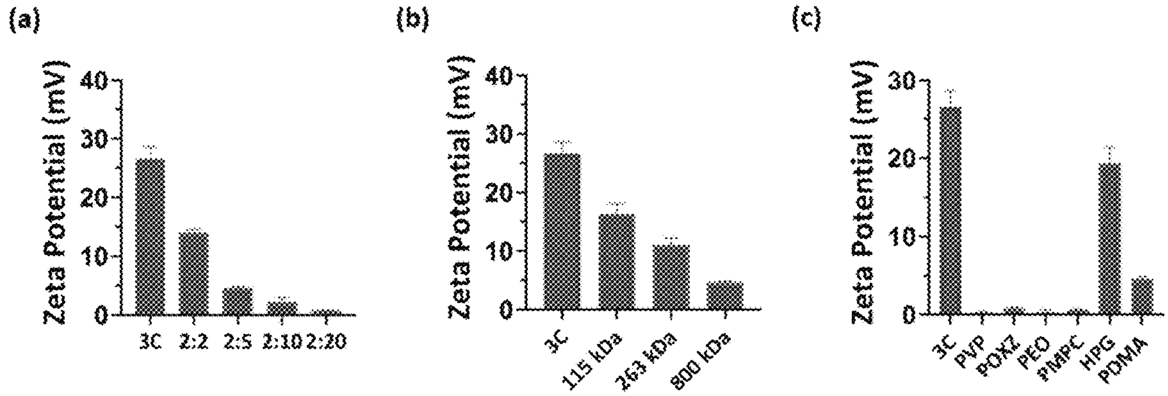
FIG. 12 shows zeta potential analysis, with zeta potential of solutions based on different (a) PDA:PDMA ratios, (b) molecular weights of PDMA and (c) hydrophilic polymers.

We further explored the kinetics of SLAB-C film formation using SEM measurements. The morphology of the surface at different time points (FIG. 2*i*) show that a thin primer was initially formed by the adsorption of small nanoparticles (<1 h) and deposition of nanoparticles with time resulting in the final composite colloidal gel structure with excellent anti-adhesive properties. Based on the characterization data, we propose the following mechanism for the formation of the SLAB-C coating. At the initial stages of the coating process, silver ions were reduced during oxidative oligomerization of DA resulting in silver nanoparticles which were covered with a composite layer of PDA/PEI/uhPDMA (FIG. 12). The presence of uhPDMA yielded improved stability of the nanoparticles and prevented formation of large silver aggregates. The adsorption of very small silver nanoparticles from the suspension onto the surface forms the primer layer, followed by the self-assembly of larger PDA/PEI/PDMA coated silver nanoparticles to form the colloidal-gel structure on the surface. The uhPDMA chains rearrange on the surface to generate a surface enriched with highly hydrophilic PDMA chains providing remarkable anti-adhesive properties (FIG. 2*j*).

Example 3

Sustained Release Behavior of the SLAB-C Coating

Figure 9:
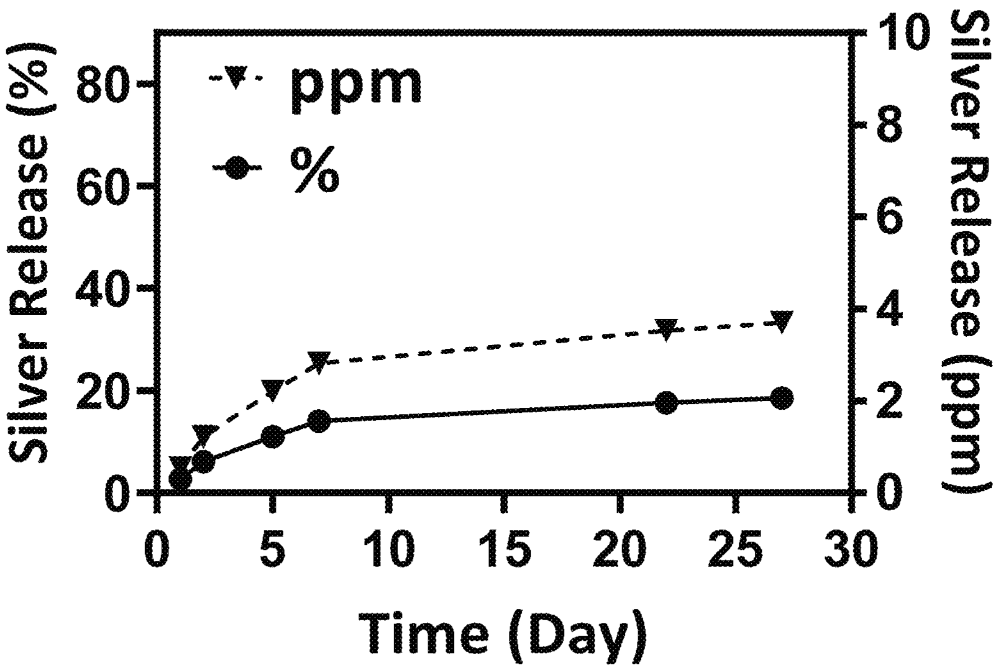
FIG. 9 shows the percentage and the amount of silver ions released from the 3C coating over 4 weeks immersion in DIW.
Figure 13:
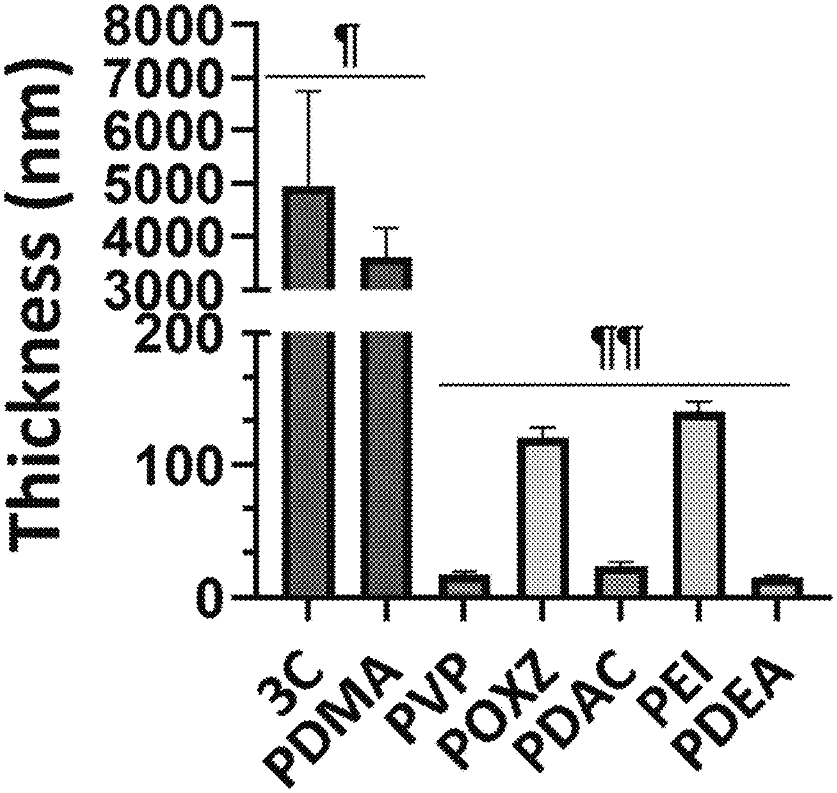
FIG. 13 shows dry thickness of coatings based on different hydrophilic polymers.

Silver release from the coating was studied using ICP-OES measurements. The SLAB-C coating was able to generate silver ion release over a long period of time (>4 weeks) (FIG. 2*g*) in comparison to the control coating which showed effective release of silver ions for less than a week (FIG. 9). The short-term release profile of the control coating could be attributed to the presence of large aggregates of silver which failed to present a large surface area for sufficient dissolution. Among the diverse polymers used, only the uhPDMA-containing coating was able to provide sustained a sustained silver ion release profile with highly efficient antibacterial activity. Polymers such as PVP, PDXZ, PVCL, PLSN, PVAM and PAAM prevented the formation of a thick enough coating (FIG. 13) that allowed the incorporation of sufficient amount of silver clusters. Although some polymers such as PEO, HPG and PMPC yielded thick coatings, the silver release was not as high as with uhPDMA. The SLAB-C coating resulted in sustained release of silver ions with ~9 ppm over 4 weeks. The sustained release could be explained by the fact that silver within the coating was in the form of tiny silver nanoclusters (<10 nm). Over the 4 week period, the total amount of silver released from the SLAB-C coating was about 70% of the total amount of incorporated silver incorporated. The results from TEM showed that the size of silver nanoclusters in the SLAB-C coating decreased during release over time (4 weeks) indicating the considerable dissolution of silver nanoparticles.

Example 4

Broad-Spectrum Anti-Biofilm Activity of the SLAB-C Coating

Figure 3:
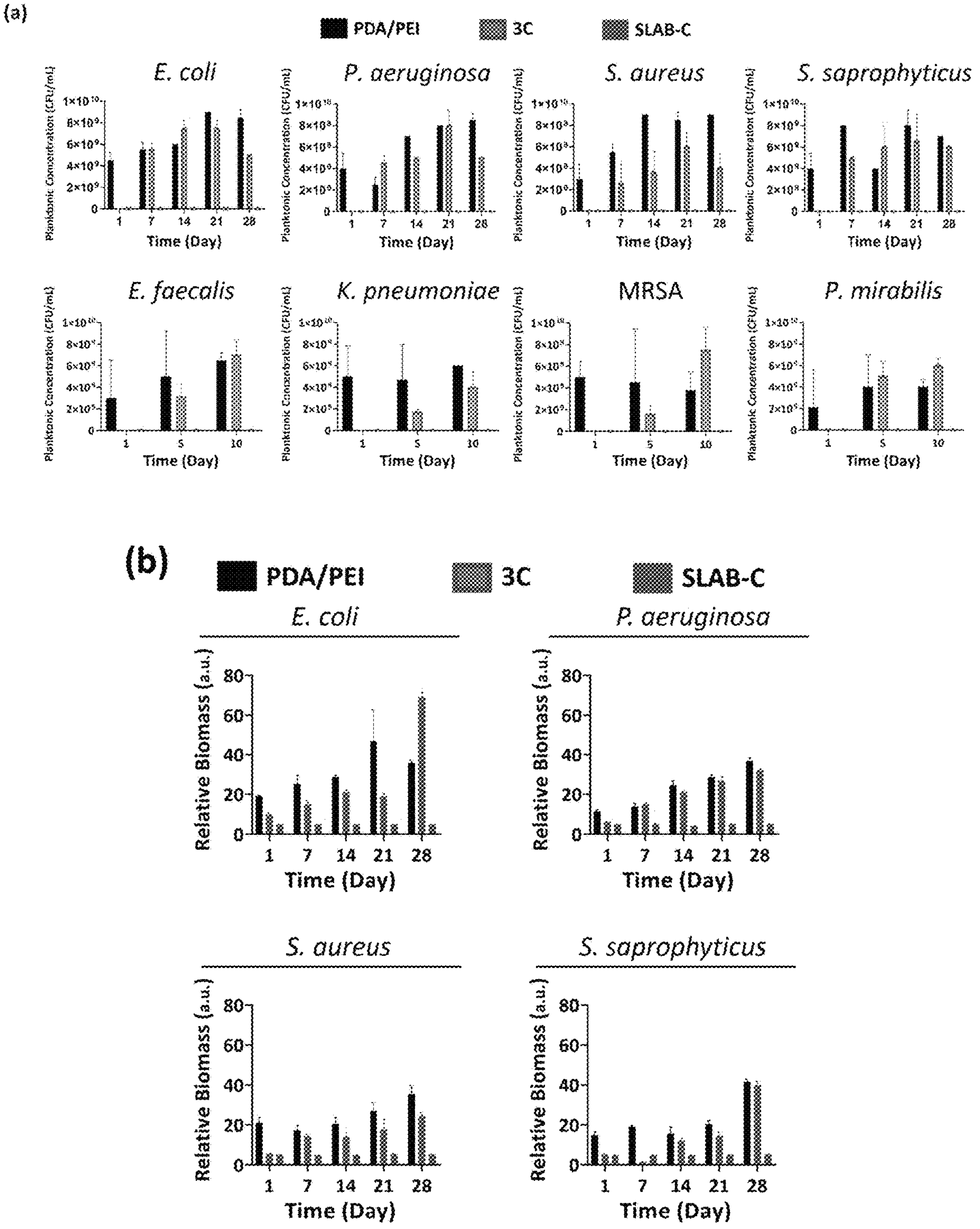
FIG. 3 shows long-term activity of the SLAB-C coating, (a) concentration of the planktonic bacteria present in the LB over 4 weeks co-incubation of the coated PU squares with diverse bacterial strains (initial concentration: $1\times10^6$ CFU/mL); (b) amount of the corresponding biomass deposited on the surface of the silver coating and the SLAB-C coatings after 4 weeks co-incubation with diverse bacterial strains (initial concentration: $1\times10^6$ CFU/mL); (c) fluorescence images of the biofilm formation; and (d) amount of the corresponding *S. aureus* biomass deposited on the surface of the controls and the SLAB-C coating on Ti in harsh conditions ($>1\times10^9$ CFU/mL, LB) for 3 weeks; (e) amount of the bacterial biomass; and (f) fluorescence images of the biofilm formation on the surface of the coated PU squares exposed to a highly concentrated stream of *E. coli* ($>1\times10^9$ CFU/mL, LB) for 3 weeks; (g) planktonic concentration of *E. coli* in LB (initial concentration: $1\times10^6$ CFU/mL) after 2 weeks co-incubation with uncoated and SLAB-C coated biomedical devices; and (h) number of the bacterial colonies attached to the surface of uncoated and SLAB-C coated biomedical devices incubated with *E. coli* (initial concentration: $1\times10^6$ CFU/mL, LB) for 2 weeks.
Figure 3:
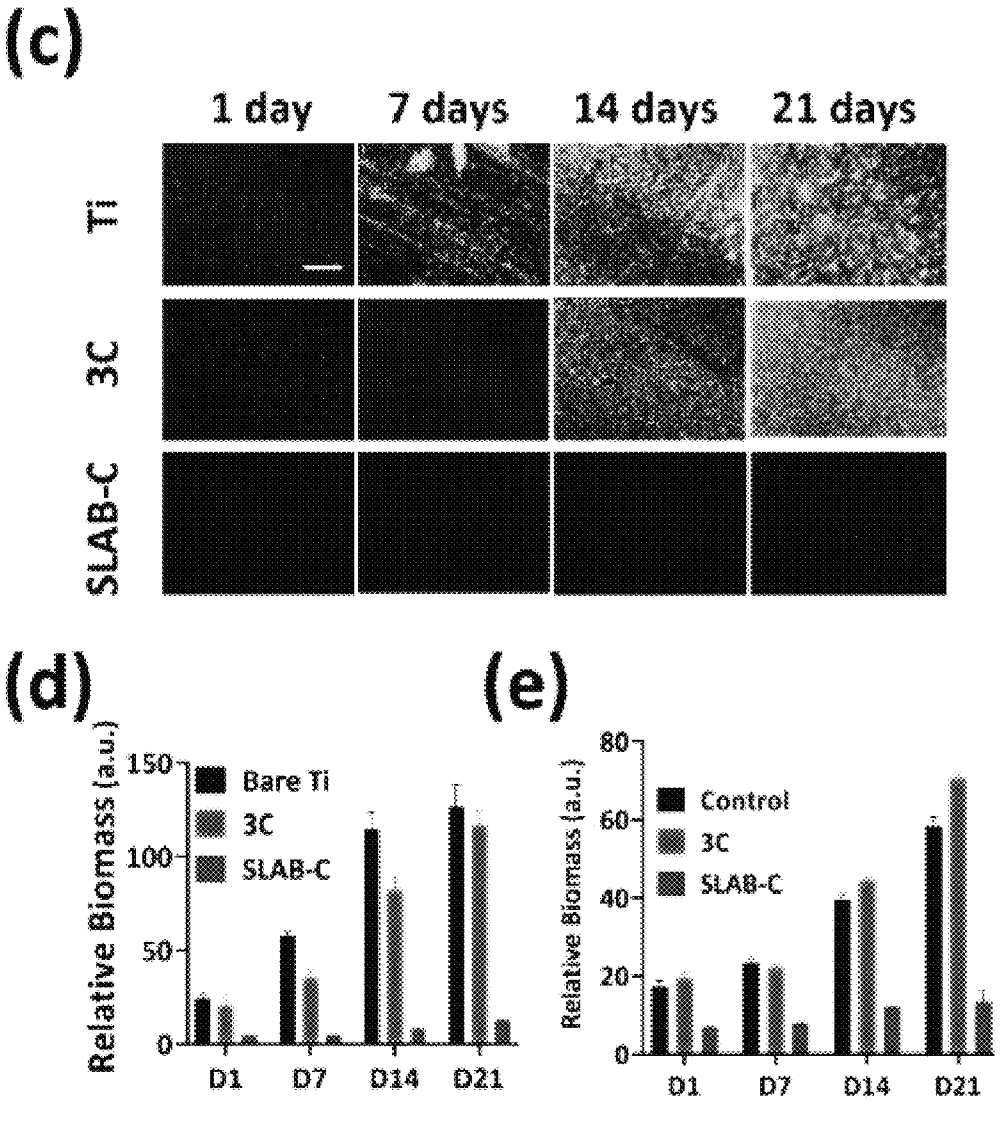
Figure 3:
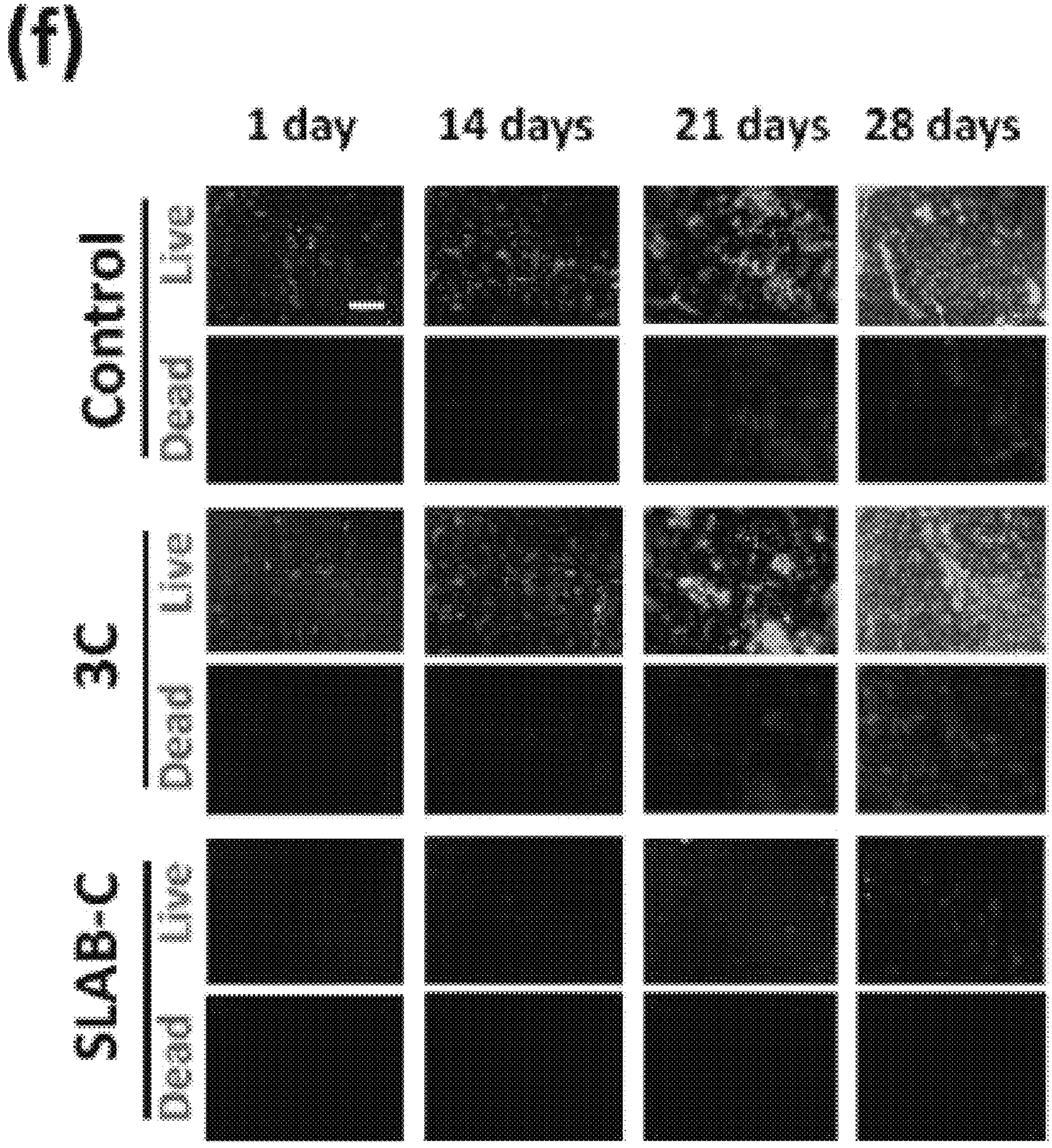
Figure 3:
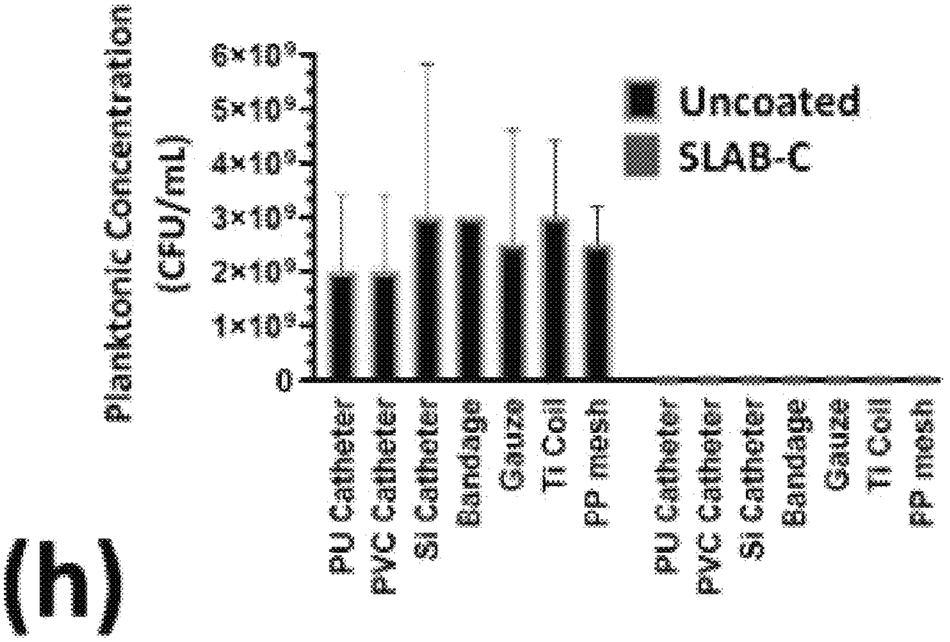
Figure 3:
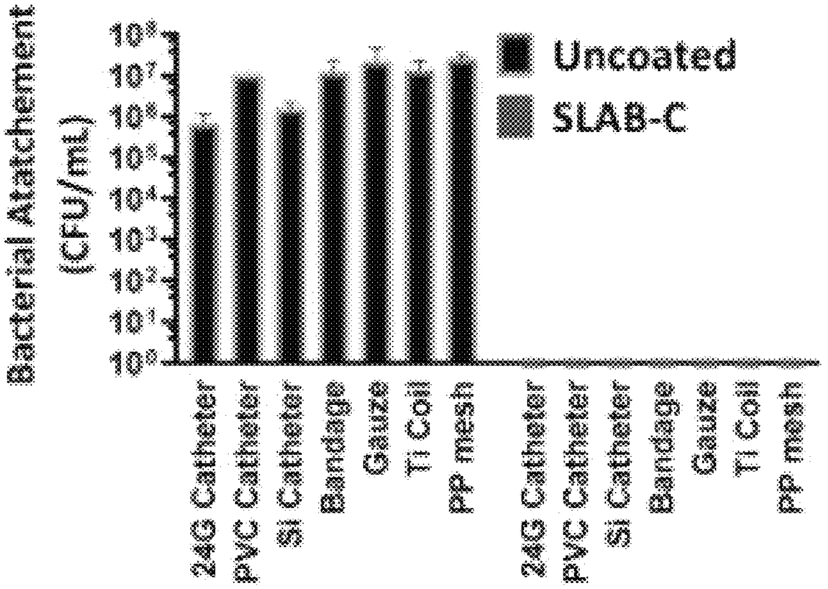
Figure 14:
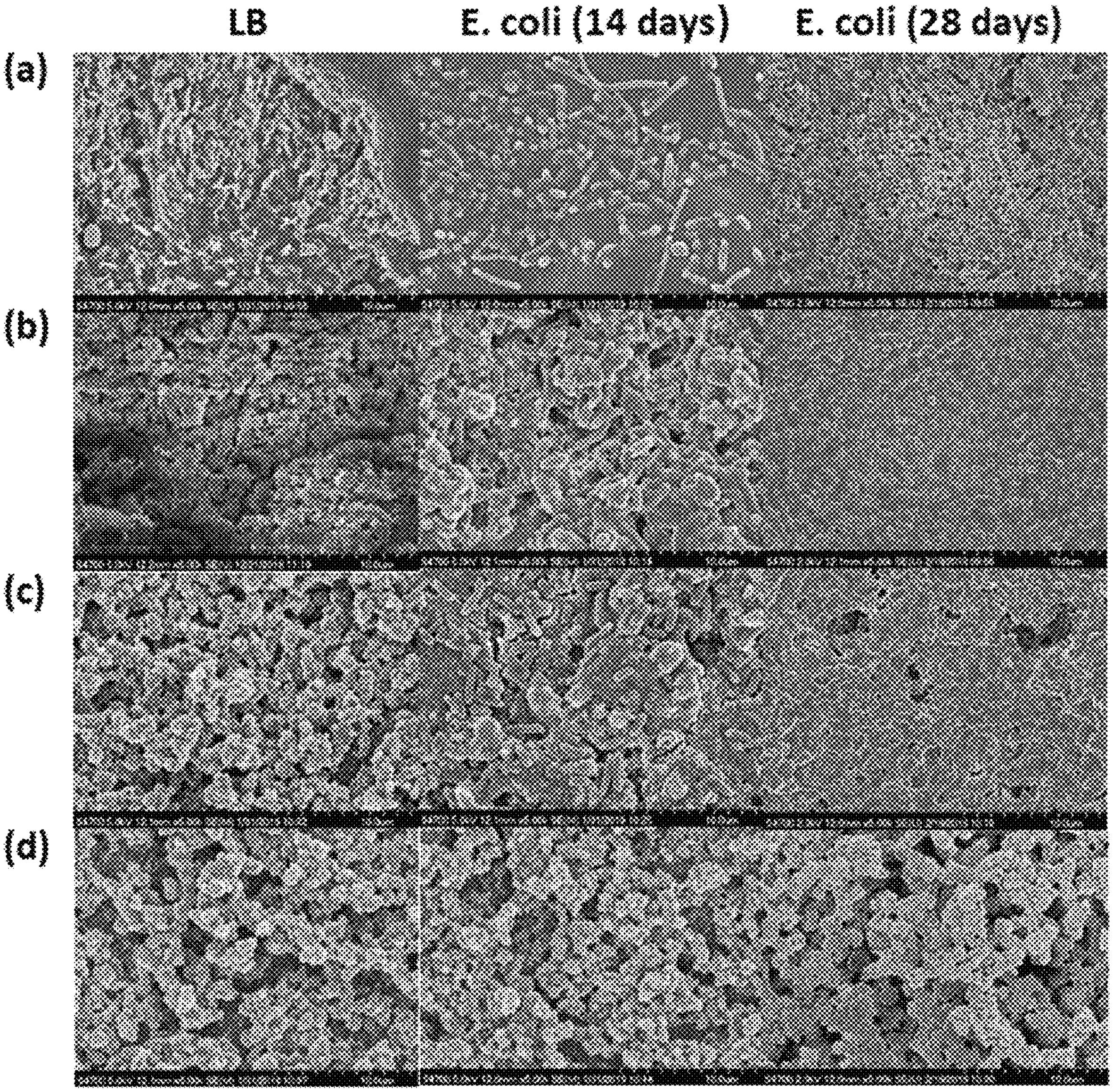
FIG. 14 shows a scanning electron microscopy images of biofilm formed by *E. coli* ($1\times10^6$ CFU/mL, LB) on the surface of (a) uncoated polyurethane, (b) the PDA/PEI treated polyurethane, (c) the 3C treated polyurethane and (d) the SLAB-C treated polyurethane.

Next, we demonstrated the broad-spectrum anti-biofilm activity of the SLAB-C coating against diverse bacterial strains including *P. aeruginosa, E. coli, S. aureus, S. saprophyticus, E. faecalis, K. pneumoniae,* Methicillin-resistant *S. aureus* (MRSA) and *P. mirabilis* in comparison with control coatings. While the control silver coating inhibited the planktonic growth of both gram-positive and gram-negative strains for ~a week effectively (FIG. 3*a*), the SLAB-C coating showed an excellent long-term bacteria-killing activity over a 4 week period. In addition, the SLAB-C coating also showed excellent long-term anti-adhesive properties in comparison with the control silver coating which showed short-term activity. Based on these data, the superior long-term anti-biofilm activity of the SLAB-C coating is due to its ability to resist bacterial attachment and colonization on the material surface via repulsion and direct bacterial killing (FIG. 3*b* and FIG. 14). The significant difference in the killing and anti-adhesive activity of the control silver coating compared to the SLAB-C coating can be explained by the difference in silver release profiles and the presence of highly enriched PDMA chains on the surface of SLAB-C (see FIG. 2).

Example 5

Long-Term Anti-Biofilm Activity of SLAB-C Coating

We further investigated the long-term activity of the SLAB-C coating in harsher conditions in which bacterial concentration the materials were exposed to was maintained at >1×$10^9$ CFU/mL with daily changes in bacterial culture over a 3 week time period. In comparison to samples coated with SLAB-C, a thick layer of bacterial biomass formed on the surface of control samples (uncoated and silver coated titanium (Ti)) contained within a few days post-inoculation which increases with time (FIG. 3*c*). The SLAB-C coating showed minimal bacterial adhesion and biomass accumulation was negligible compared to the control samples biofilm free surface (FIG. 3*d*).

We further utilized a flow model previously developed in our lab to test the coating on polyurethane (PU)[62], as flow is known to increase bacterial adhesion, colonization and biofilm formation of some bacterial species. Using this model, samples were exposed to a constant flow of bacterial culture (*E. coli,* >$1\times10^9$ CFU/mL) for 28 days with daily changes in medium. Samples were removed at different time points and assayed for biofilm development using fluorescence microscopy following live/dead staining (PI/Syto9 kit). Under these conditions, the SLAB-C coating was found to inhibit bacterial biomass deposition/biofilm formation on the surface compared to control samples demonstrating its long-term activity (FIGS. 3*e* and *f*).

Example 6

Universality and Stability of the SLAB-C Coating

Figure 15:
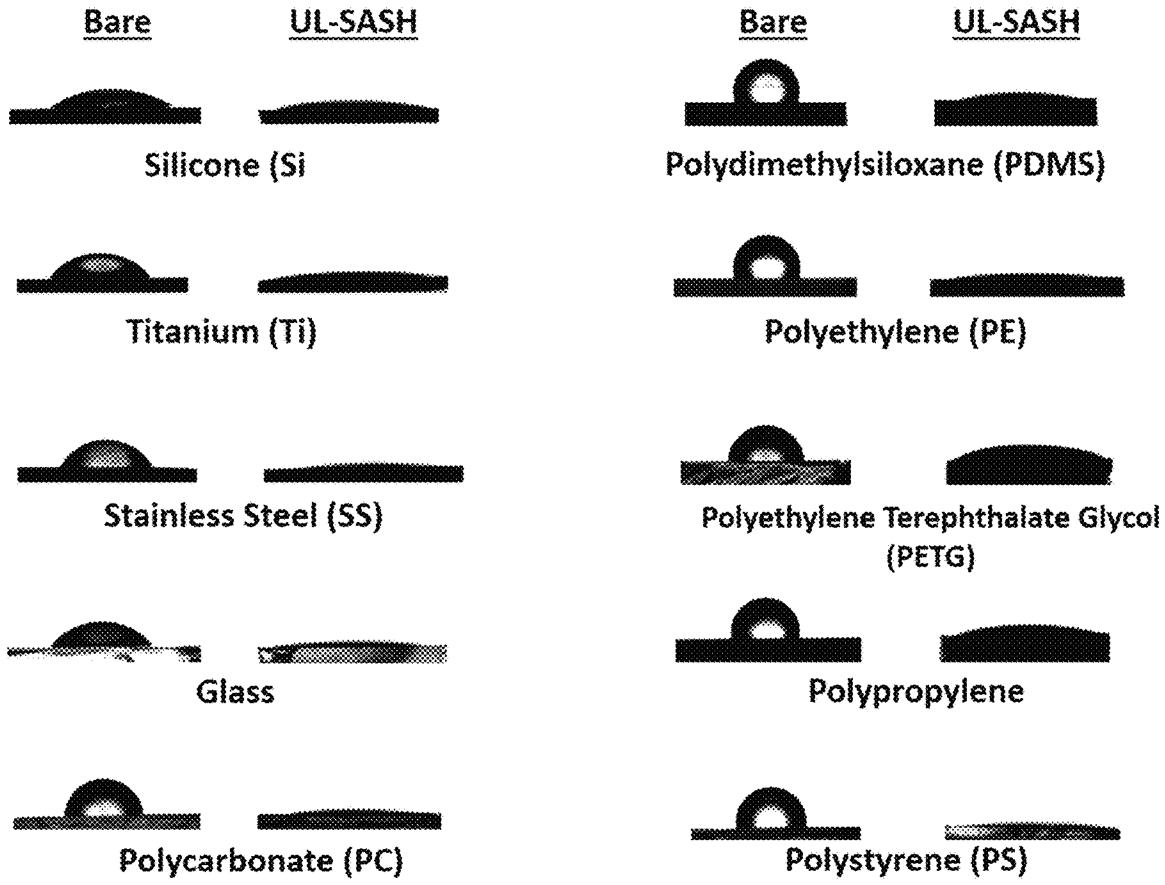
FIG. 15 shows water contact angle images a variety of SLAB-C materials.
Figure 16:
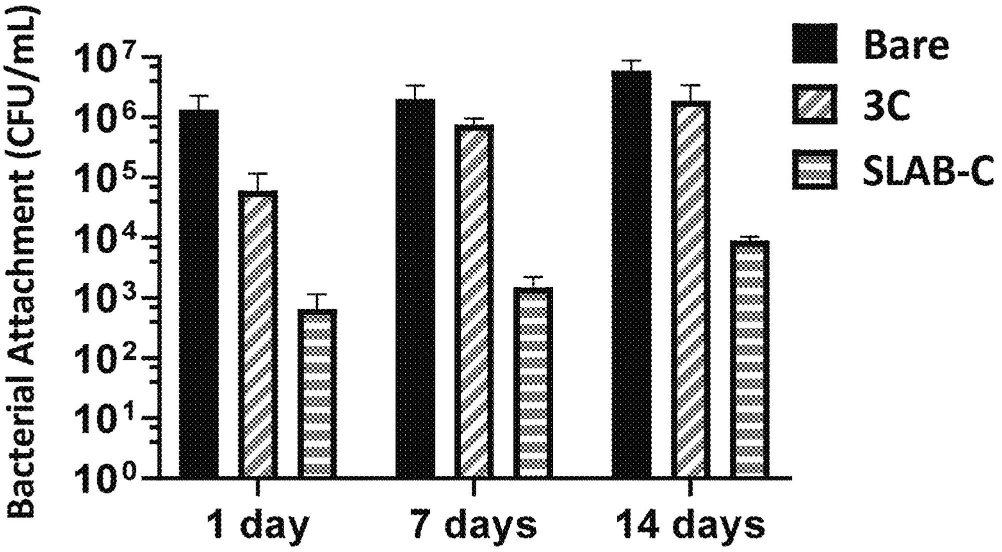
FIG. 16 shows anti-adhesive activity of the devices treated with the SLAB-C coating in challenging conditions, where the number of *S. aureus* (>$1\times10^9$ CFU/mL, LB) colonies attached to the surface of different biomedical devices coated with the 3C coating and the SLAB-C composition: (a) 24 G PU IV catheter, (b) 16 Fr PVC catheter, (c) Ti wire, (d) 10 Fr Si catheter. (e) The comparison between anti-adhesive activity of the UL-SASH coated 16 Fr PVC urinary catheter and that of the Bardex urinary catheter.
Figure 16:
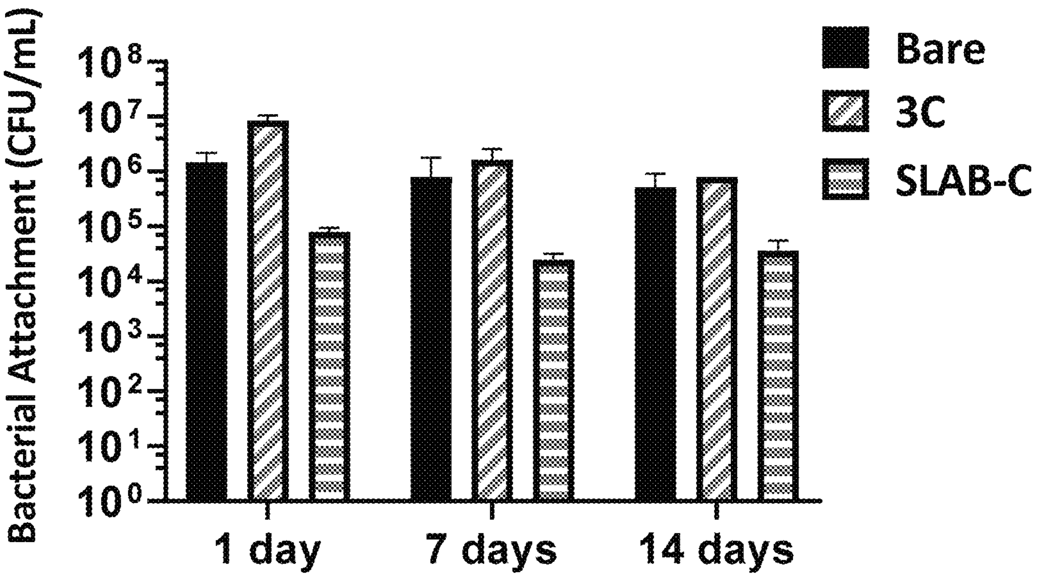
Figure 16:
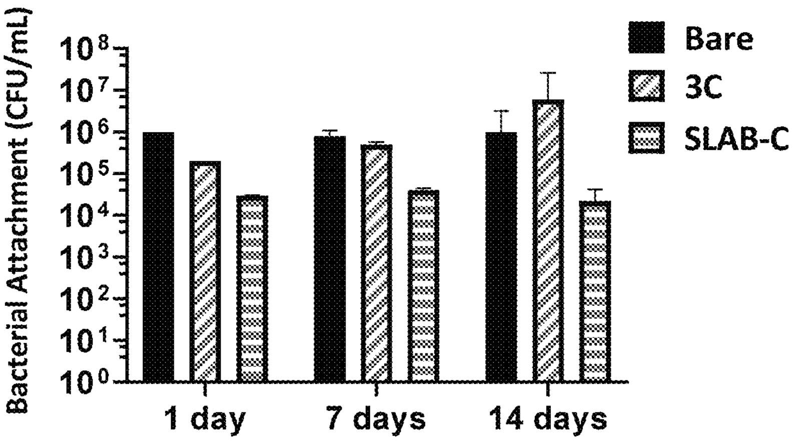
Figure 16:
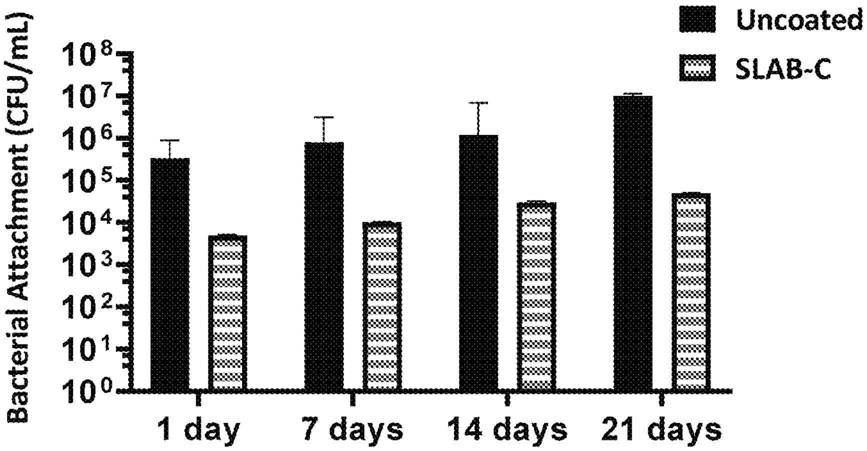
Figure 16:
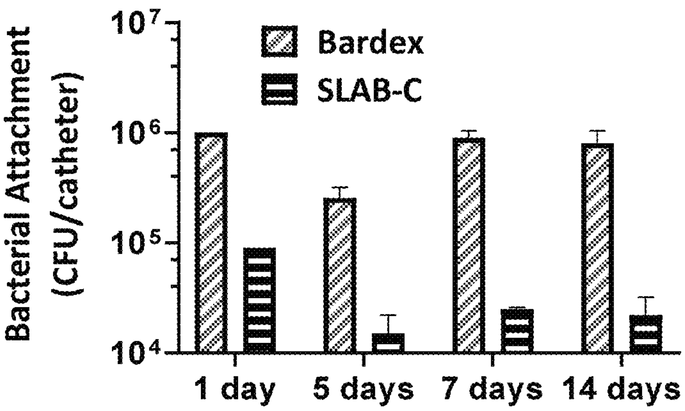

Having shown efficacy of the SLAB-C coating on Ti and PU substrates, we investigated the universality of the coating in terms of our ability to coat diverse materials. For this we included polymers (polyethylene (PE), polypropylene (PP), polystyrene (PS), polydimethyl siloxane (PDMS), poly vinyl chloride (PVC), polycarbonate (PC), polyacrylic (PA), polyethylene terphtalate glycol (PTEG) and polyurethane (PU)), metals (Si, Ti and stainless steel (SS)) and glass. All materials tested were effectively coated with the SLAB-C composition (FIG. 15), and the morphology of the SLAB-C coating on the different materials was found to be similar demonstrating the adaptability of the SLAB-C coating to diverse materials. Furthermore, the antibiofilm activity of the coated materials was verified against *E. coli* over a 1-week period, resulting in the same anti-biofilm activity on all materials. To further validate the efficacy of our coating in the medical field, we treated a broad range of commercially available biomedical devices/materials including Ti wire implants, bandages, cotton gauzes, PP surgical mesh, 24 G PU intravenous (IV) catheters, 16 Fr PVC catheters and 10 Fr Si Foley-catheters with the SLAB-C composition. Our data demonstrate that all of the biomedical devices/materials were successfully coated, and that the coating not only inhibited planktonic bacterial growth but also prevented the attachment and colonization of the material surface by bacteria over a 2-week period in challenging conditions (FIGS. 3*g* and *h,* FIGS. 16*a-d*). To assess how efficacy of our SLAB-C coating compared to the only "antimicrobial" urinary catheter currently available on the market, we tested the antibacterial and antibiofilm activity of PVC-CLAB-C catheters to the silver-based Bardex urinary catheter (BD) over a 2-week period in our flow model. Overall, we found a 2-log decrease in bacterial numbers on the surface of the PVC-SLAB-C catheters compared to Bardex, indicating significantly greater antibiofilm activity of our coating (FIG. 16*e*).

To evaluate the stability of the SLAB-C coating, the coated samples were exposed to different environments/conditions including autoclave wet sterilization, 10 min sonication and two months storage in air at room temperature. SEM was utilized to assess the morphology of the exposed SLAB-C coatings. Overall, we did not find any difference in the morphology of the SLAB-C coating exposed to any of the conditions/environments compared to those left unexposed. We further investigated the anti-adhesive activity of the exposed coatings and verified that the anti-adhesive activity was maintained following exposure to all conditions/environments.

To assess the biocompatibility of our coating, we utilized the fibroblast deposition assay and evaluated the deposition of cells onto SLAB-C coated surfaces over a 24-hour period. Overall, we found the SLAB-C coating to suppress cell compared to samples containing the control coating which were covered with cells. Furthermore, protein deposition analysis using fluorescently tagged proteins (FITC-BSA and Alexa-Fibrinogen) showed that the SLAB-C coating decreases FITC-BSA and Alexa-Fibrinogen deposition by 91.3% and 98.9%, respectively. Collectively these data verify the antifouling and biocompatibility nature of the SLAB-C coating.

Furthermore, the applicability and versatility of DOPASIL coating was tested on a diverse set of objects treated with DOPASIL coating and was compared to uncoated object (i.e. bandage; 24 G IV PU catheter; glass vials (two different sizes); pieces of 16 Fr PVC urinary catheter; metallic needle; green plastic rod; vascular graft; plastic tubes with six different sizes; 6 mL norm-jet syringe; Y-shaped connectors; and pieces of 10 Fr silicone urinary. The diverse uncoated and DOPASIL coated objects were incubated in bacterial solution (i.e. *E. coli* ($1\times10^6$ CFU. $mL^{-1}$, LB)) for 24 h and the number of planktonic colonies present in bacterial solution after 24 h incubation were compared between coated and uncoated objects. Furthermore, the number of bacteria attached to the surface of diverse uncoated/DOPASIL coated objects incubated with *E. coli* ($1\times10^6$ CFU. $mL^{-1}$, LB) for 24 h was also compared. In both cases the coated articles had significant planktonic concentrations (i.e. between $1\times10^9$ and $1\times10^{10}$ CFU/mL) and significant bacterial attachment (i.e. between $1\times10^5$ and $1\times10^6$ CFU/surface), while the coated surfaces had no planktonic concentrations and no bacterial attachment (data not shown). Accordingly, the DOPASIL (uhPDMA/LMW-PEI/silver nitrate/DA) showed versatile coating properties and anti-bacterial protection to a variety of objects, having various shapes and sizes.

Example 7

Evaluation of SLAB-C Coating in Infection Models in Animals

Figure 4:
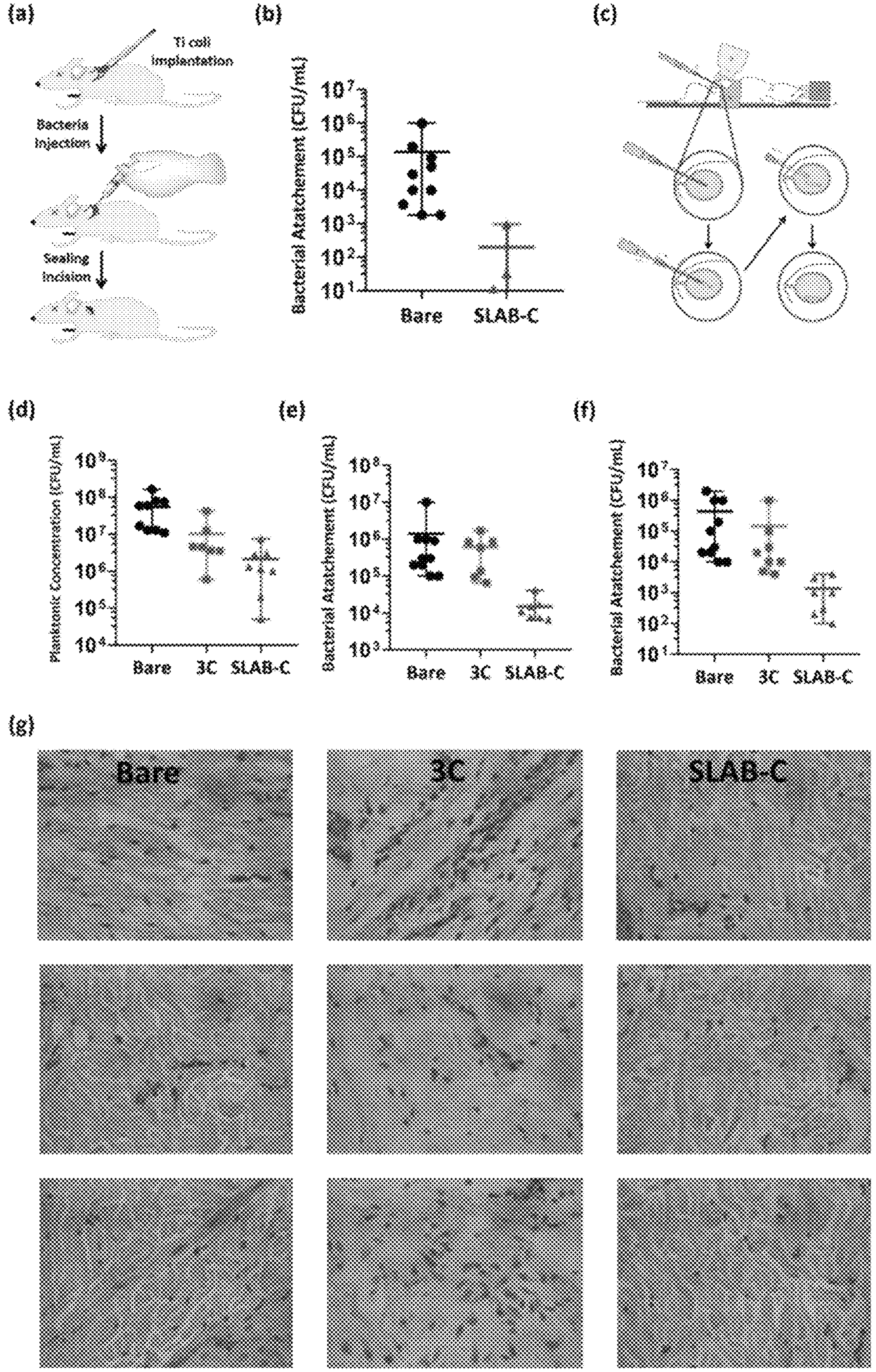
FIG. 4 shows in-vivo activity of the SLAB-C coating and histology analysis, (a) insertion of the Ti implant under the skin at the back of the rat in the subcutaneous pocket containing 100 μL bacterial solution (*P. aeruginosa,* LB, $1\times10^8$ CFU/mL); (b) number of bacterial colonies attached to the surface of uncoated and SLAB-C coated Ti implants after 7 days incubation with *P. aeruginosa* in the subcutaneous pocket in rats. (c) Percutaneous implantation of the uncoated and coated piece of 24 G PU IV catheter into the bladder of the anesthetized mouse; (d) number of planktonic bacteria present in the bladder of mice treated with MRSA (LB, $1\times10^8$ CFU/mL) for 7 days. The number of bacterial colonies attached to the surface of uncoated, silver coated and SLAB-C coated pieces of 24 G PU IV catheters after 3 days incubation with (e) MRSA ($1\times10^8$ CFU/mL, LB); (f) *P. aeruginosa* ($1\times10^8$ CFU/mL, LB) in the mice bladders; and (g) optical images of the H&E treated tissues exposed to the Ti wires (Uncoated, silver coated (3C) and SLAB-C coated) implanted in rats for 7 days.
Figure 5A:
FIG. 5 shows screening data for identification of the best metal salt in the three-component system containing DA (2 mg/mL), PEI (1.5 mg/mL) and a metal salt (0.5 mg/mL) including silver nitrate, copper (II) nitrate, zinc nitrate, gallium nitrate, nickel nitrate and gold (III) chloride, (a) the water contact angle images of the silicone substrate treated with three-component compositions containing DA (2 mg/mL), PEI (1.5 mg/mL) and different metals salts including (fluorescence images of biofilm formation are not shown); (b) the bacterial biomass deposited on the surface of silicone substrate treated with different three-component compositions after 24 h incubation with *E. coli* ($1\times10^6$ CFU/mL, LB); (c) the number of planktonic bacterial colonies present in the LB media containing *E. coli* ($1\times10^6$ CFU/mL) co-incubated with the silicone substrates treated with compositions containing different metal salts for 24 h; and (d) the dry thickness of the silicone substrates treated with compositions containing different metal salts determined by ellipsometry technique.
Figure 5B:
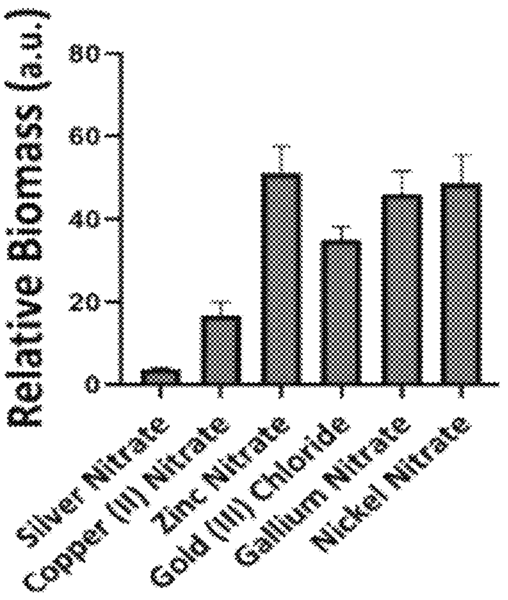
Figure 5C:
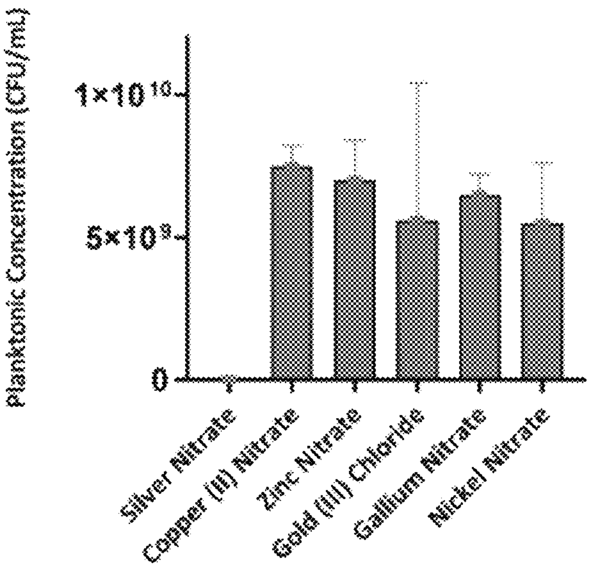
Figure 5D:
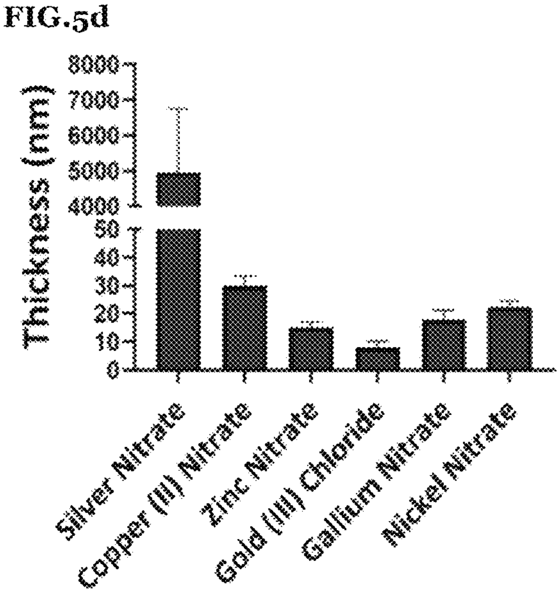
Figure 6:
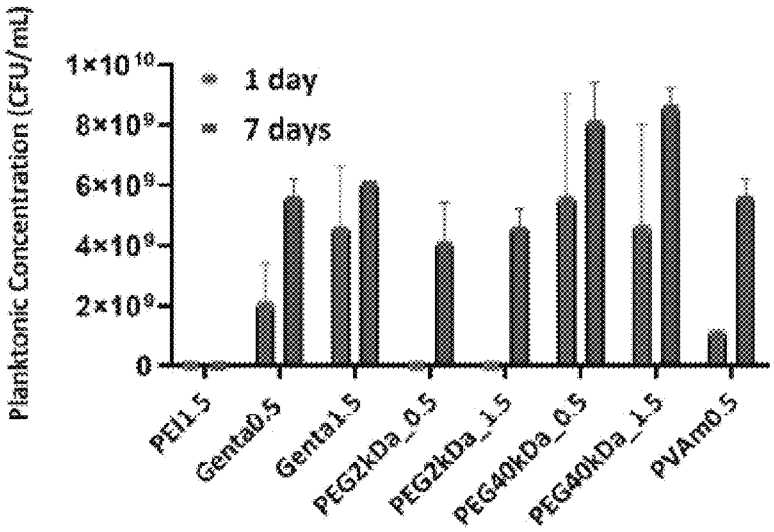
FIG. 6 shows screening data for identification of the best cross-lining agent in the three-component system containing DA (2 mg/mL), silver nitrate (0.5 mg/mL) and a cross-linking agent (1.5 mg/mL) including polyethylenimine, gentamicin, amine-functionalized polyethylene glycol (2 kDa and 40 kDa) and polyvinyl amine, with the number of planktonic bacterial colonies present in the LB media containing *E. coli* ($1\times10^6$ CFU/mL) co-incubated with the silicone substrates treated with compositions containing different metal salts (fluorescence images of biofilm formation on the surface of silicone substrates treated with different three-component compositions after 7 days incubation with *E. coli* ($1\times10^6$ CFU/mL, LB) were also taken, but are not shown).
Figure 7:
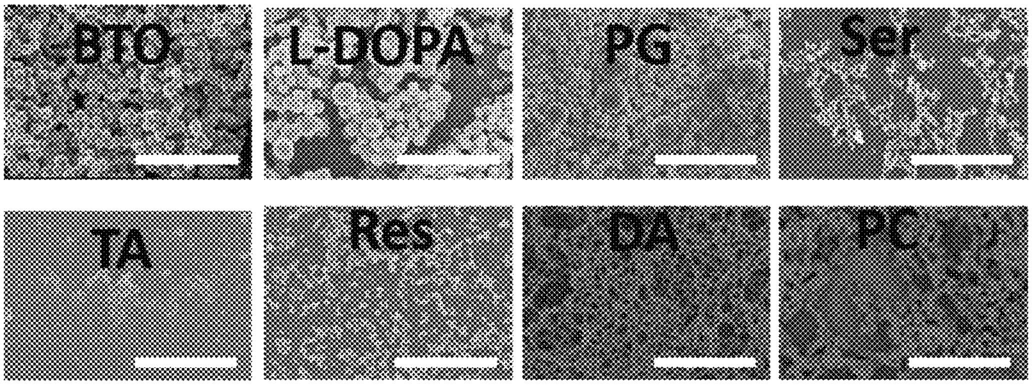
FIG. 7 shows scanning electron microscopy images of coatings based on three-component compositions containing silver nitrate (0.5 mg/mL), polyethylenimine (1.5 mg/mL) and a catechol including: dopamine (DA), norepinephrine (NE), pyrogallol (PG), 1,3,5-benzene triol (BTO), catechin, resorcinol (Res), serotonin (Ser), pyrocatechol (PC) and tannic acid (TA) (Scale bar is 4 μm).

To assess the efficacy of our coating in realistic environments, we utilized two different infection models to evaluate the ability of the SLAB-C coating to combat indwelling device-associated infections. Specifically, we used a subcutaneous implant infection model in rats and a mouse model of catheter-associate urinary tract infection (CAUTI). For the subcutaneous implant infection model in rats, coated and uncoated titanium implants (coated/uncoated 30 cm Ti wire were rolled up) were implanted into two dorsal pockets. Prior to closing of the implant site, the pocket was instilled with *P. aeruginosa,* ($1\times10^8$ CFU/mL). Animals were recovered for 3-days at which point the implants were removed and bacterial attachment was assessed. Using this model, we show that the SLAB-C coating significantly reduced the number of bacteria on the implant compared to the control silver coating. (FIGS. 4*a* and *b*). To validate the efficacy of our coating in the urinary environment, 4 mm pieces of SLAB-C coated and uncoated 24 G IV catheter (polyurethane) pieces were inserted into the bladder of mice according to our previously reported procedure[31]. Following catheter insertion, bladders of separate animals were inoculated with MRSA or *P. aeruginosa* ($1\times10^8$ CFU/mL). Catheter pieces were collected after a 3 day recovery period and analyzed for bacterial attachment to the material surface and killing in urine. Our results show that the SLAB-C coating resulted in an ~2 log reduction in bacterial attachment to the catheter surface in comparison to the bare catheter and silver-based control coating. (FIGS. 4*c, d* and *e*). Together these data demonstrate the excellent activity in preventing infection in vivo.

To verify that the sustained release of silver ions from our coating does not have toxic effects on surrounding tissue, we assessed the tissue response to the SLAB-C coating in the rat subcutaneous model. After subcutaneous implantation of Ti wire implants in rats over 7 days, we used histological analysis to assess the toxicity to surrounding tissues. Overall, we found the tissue exposed to the SLAB-C coating to not differ significantly histologically from that exposed to uncoated material, demonstrating that the SLAB-C coating is not toxic to tissue. This favourable characteristic is likely attributed to the fact that the amount of silver release, while highly effective at preventing bacterial growth and biofilm formation, is outside of the range that results in the type of tissue damage seen with other silver-release coatings[64, 65, 66].

Example 8

Figure 17:
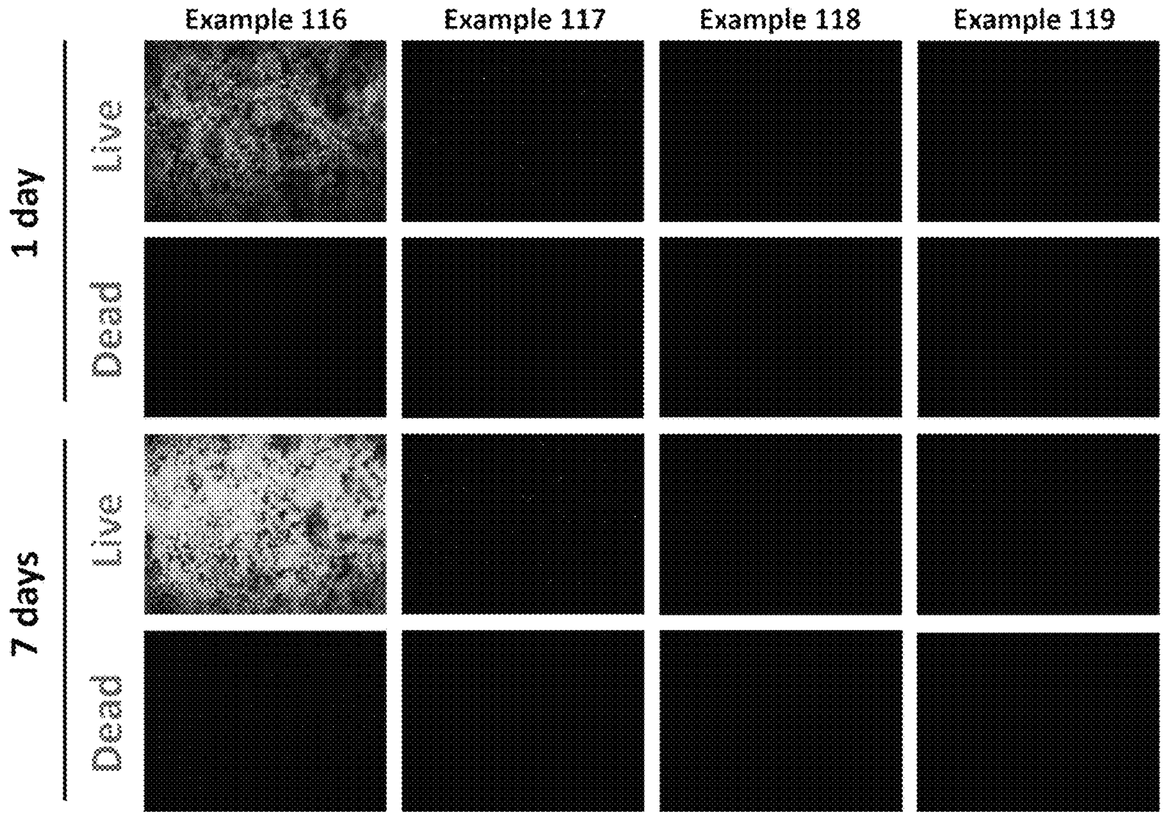
FIG. 17 shows representative fluorescence images of biofilm formed by *E. coli* ($1\times10^8$ CFU/mL) on the surface of PU coated with compositions containing LMW-PVP (1.5 mg/mL), which generally shows that all the coatings containing LMW-PVP and silver nitrate ($AgNO_3$) showed efficient activity on day 7, with the top panel showing live cells and the lower panel showing dead cells.

Antimicrobial Activity with SLAB-C Coatings Incorporating PVP as a Cross-Linking Agent Composition were also tested with PVP as the cross linking agent as shown below in TABLE 4 for composition examples 116-119. The anti-adhesive activity of the coatings formed based on LMW-PVP (MW=700 Da) as the cross-linking agent generally show that all the coatings containing LMW-PVP and silver nitrate ($AgNO_3$) showed efficient activity on day 7 (see FIG. 17).

TABLE 4

| Low Molecular Weight PVP compositions | |
|---|---|
| Component | Concentration (mg/mL) |
| Example 116: | |
| Dopamine hydrochloride | 2 |
| Polyvinyl pyrrolidone (MW = 700 Da) | 1.5 |
| Example 117: | |
| Dopamine hydrochloride | 2 |
| Polyvinyl pyrrolidone (MW = 700 Da) | 1.5 |
| Silver Nitrate | 0.5 |
| Example 118: | |
| Dopamine hydrochloride | 2 |
| Polyvinyl pyrrolidone (MW = 700 Da) | 1.5 |
| Silver Nitrate | 0.5 |
| Poly(N,N-dimethylacrylamide) (MW = 900 kDa) | 2 |
| Example 119: | |
| Dopamine hydrochloride | 2 |
| Polyvinyl pyrrolidone (MW = 700 Da) | 1.5 |
| Silver Nitrate | 0.5 |
| Poly(N,N-dimethylacrylamide) (MW = 900 kDa) | 5 |

In summary, described herein are sustained silver-based long-acting antibiofilm colloidal-gel composite coatings with broad spectrum activity. The inventors demonstrated that the coating can be applied to diverse materials (metals, polymers, and glass) and biomedical devices (catheters, metallic wire implants, polymeric surgical meshes, and bandages) via a simple one-step dip coating process at room temperature, conveying a potent antibacterial and antibiofilm activity on any material it is applied to. Overall, the SLAB-C coating has excellent bacterial killing activity and anti-adhesive performance over long periods of time (4 weeks) in the presence of significant bacterial concentrations (>$1\times10^9$ CFU/mL). The nature of the hydrophilic polymer was found to be important in providing sustained release behavior and bacteria repelling activity of the coating. The optimal coating gave sustained release profiles over long time periods (>4 weeks) at a therapeutic dose without being toxic to tissues.

Example 9

Figure 18:
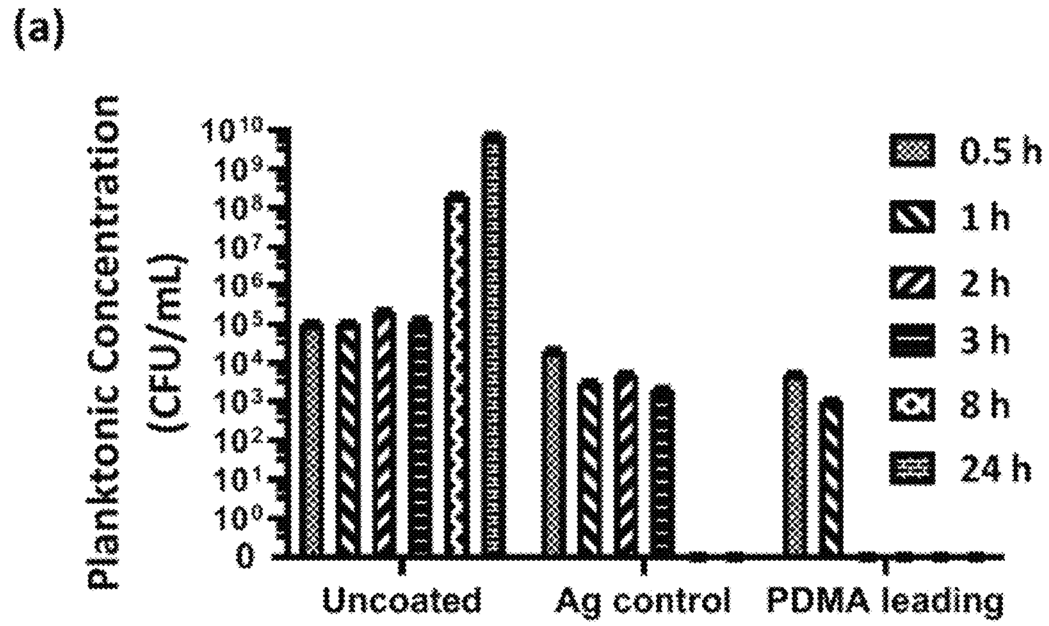
FIG. 18 shows (a) the number of planktonic bacteria present in solution containing *E. coli* ($1\times10^6$ CFU/mL, LB) co-incubated with uncoated, Ag control and PDMA leading coated PP mask pieces at different time points; and shows (b) the number of bacterial colonies attached to the surface uncoated, Ag control and PDMA leading coated PP mask pieces incubated with *E. coli* ($1\times10^6$ CFU/mL, LB) at different time points.
Figure 18:
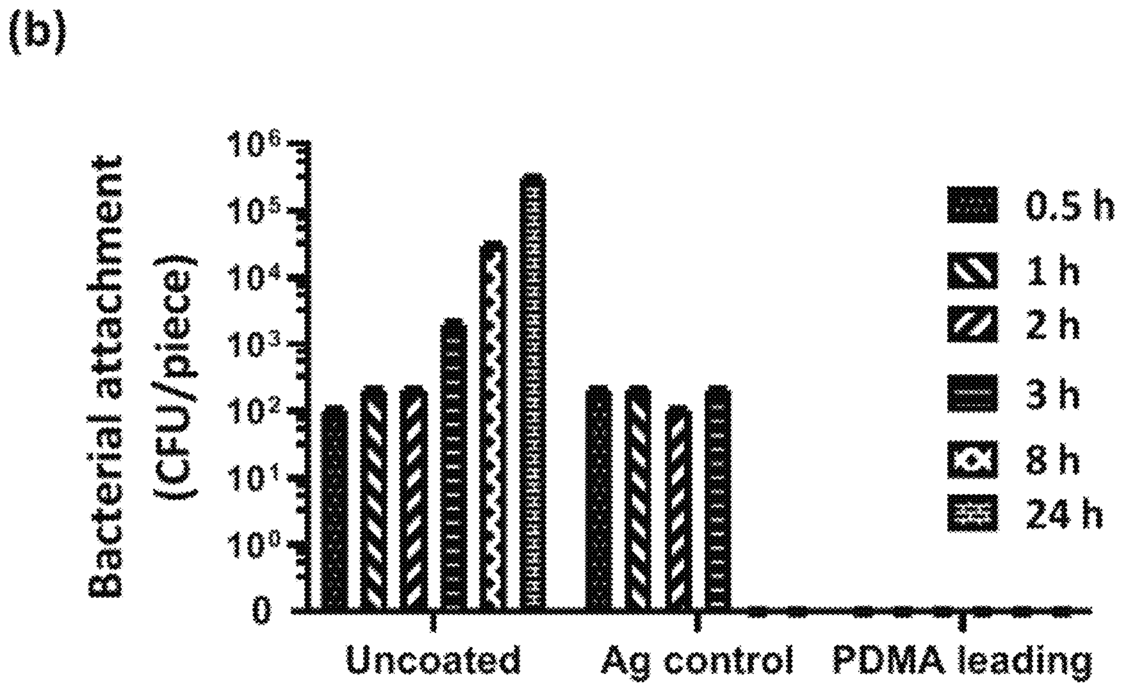

Anti-Viral and Anti-Bacterial Activity of the Coating with Four Components (PDA/PEI/uhPDMA/Ag) on Polypropylene (PP) Masks The effect of ultra-high molecular weight PDMA on antimicrobial activity of coated masks was tested. Uncoated material was compared to a silver (Ag) coated control and what is described herein as PDMA leading coating composition (i.e. uhPDMA (5 mg/mL) (Mn-925 kDa, PDI-1.25) was dissolved in tris buffer solution (10 mM, pH 8.5). LMW-PEI (1.5 mg/mL), silver nitrate (0.5 mg/mL) and DA (2 mg/mL)). As shown in FIG. 18 the number of planktonic bacteria present in solution containing *E. coli* ($1\times10^6$ CFU/mL, LB) co-incubated with uncoated, Ag control and PDMA leading coated poly(propylene) (PP) mask pieces at different time points are shown in (a), while the number of bacterial colonies attached to the surface uncoated, Ag control and PDMA leading coated PP mask pieces incubated with *E. coli* ($1\times10^6$ CFU/mL, LB) at different time points are shown in (b). The PDMA leading coating composition entirely suppressed bacterial growth in solution by 2 h and on the surface of PP mask by 0.5 h.

Fluorescence microscopy to examine biofilm formation on the surface of both uncoated and PDMA-leading coated PP mask pieces was examined after 24 h incubation with *E. coli* ($1\times10^6$ CFU/mL, LB). Biofilm formation on the surface of PP mask was significantly inhibited utilizing the coating formed based on uhPDMA, where the coated mask showed no bacterial attachment (images not shown).

Figure 19:
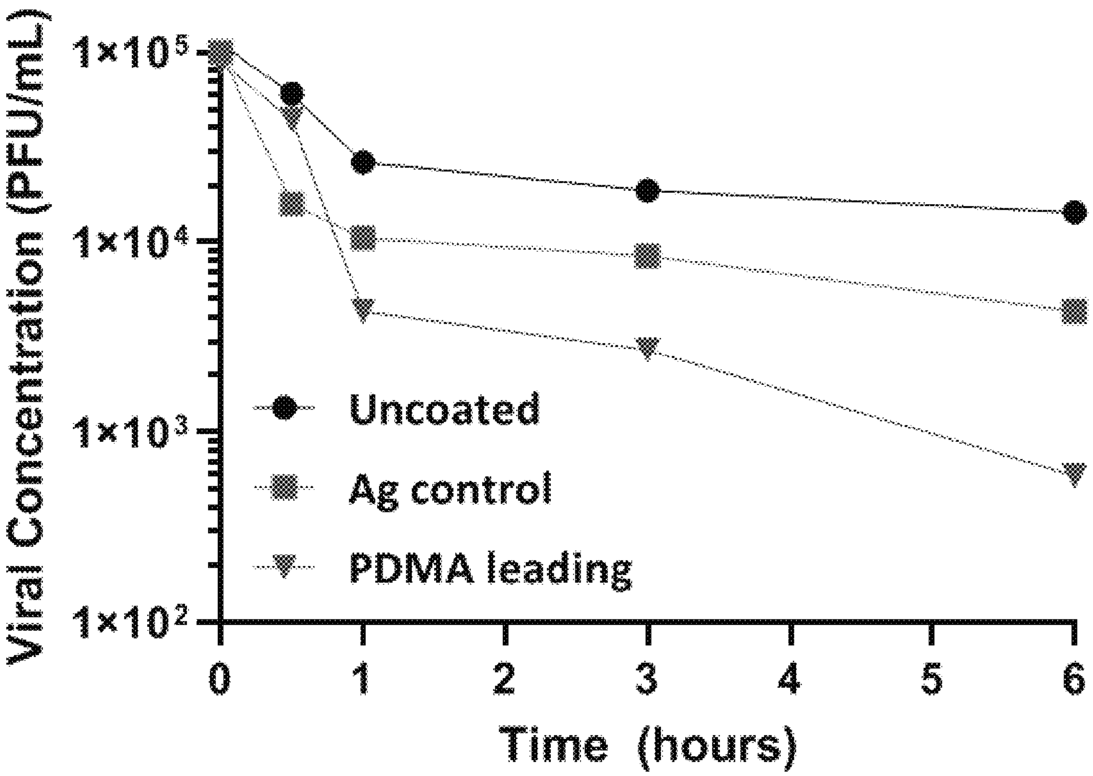
FIG. 19 shows the number of virions attached to the surface of uncoated, Ag control and PDMA leading coated PP mask pieces at different time points.

Similarly, as shown in FIG. 19 the number of virions attached to the surface of uncoated, Ag control and PDMA leading coated PP mask pieces at different time points. The composition containing uhMW PDMA (PDMA coating) significantly improved anti-viral activity of the PP mask.

Example 10

Incorporation and Release of Diverse Pharmaceutically Active Agents from the Coating In addition to the antibiotics and inorganic metal and metal nanoparticle-based agents, the incorporation of diverse pharmaceutically active agents, were tested for their ability to release from the coating and its bioactivity. These preliminary studies are to illustrate the versatility of the coatings to incorporate diverse agents using different formulations.

TABLE 5

Comparison of Different Pharmaceutically Active Agents Tested

| Chemical | Hydrophobicity/ Hydrophilicity | Partition coefficient (cLogP)[67] | Water solubility (mg/mL)[67] | Net charge at pH 7.4 |
|---|---|---|---|---|
| Tobramycin | Hydrophilic | −3 | 53.7 (soluble) | Neutral |
| Gentamicin | Hydrophilic | −1.6 | 12.6 (soluble) | Neutral |
| Penicillin | Hydrophilic | — | >30 (soluble) | Neutral |
| Rifampicin | Hydrophobic | 3.85 | 0.0413 (slightly soluble) | Neutral |
| Antimicrobial peptide E5 | Hydrophilic | — | soluble | Positively charged |
| Docetaxel | Hydrophobic | 2.92 | <0.01 (insoluble) | Neutral |
| Paclitaxel | Hydrophobic | 3 | <0.001 (insoluble) | Neutral |
| Dexamethasone phosphate | Hydrophilic | — | soluble | Negatively charged |
| Estradiol | Hydrophobic | 4.01 | <0.01 (insoluble) | Neutral |

We have included docetaxel, paclitaxel, dexamethasone phosphate and estradiol as examples of different class of drug molecules. All of these agents are purchased from Sigma Aldrich™. Different concentrations of drug molecules are used coating preparation. The following coating compositions and protocols were used to illustrate the strategy.

TABLE 6

Examples of the Coatings Used for Testing Alternative Pharmaceutically Active Agents

| Component | Concentration (mg/mL) |
|---|---|
| Example 120: | |
| Dopamine hydrochloride | 2 |
| Polyethylenimine (PEI) | 1.5 |
| Docetaxel | 0.2 |
| Example 121: | |
| Dopamine hydrochloride | 2 |
| Polyethylenimine (PEI) | 1.5 |
| Docetaxel | 0.5 |
| Example 122: | |
| Dopamine hydrochloride | 2 |
| Polyethylenimine | 1.5 |
| Docetaxel | 0.8 |
| Example 123: | |
| Dopamine hydrochloride | 2 |
| Polyethylenimine | 1.5 |
| Docetaxel | 0.8 |
| Poly (N,N-dimethylacrylamide) (uhPDMA) | 2 |
| Example 124: | |
| Dopamine hydrochloride | 2 |
| Polyethylenimine | 1.5 |
| Docetaxel | 0.8 |
| uhPDMA | 5 |
| Example 125: | |
| Dopamine hydrochloride | 2 |
| Polyethylenimine (PEI) | 1.5 |
| Dexamethasone phosphate | 0.2 |

TABLE 6-continued

Examples of the Coatings Used for Testing Alternative Pharmaceutically Active Agents

| Component | Concentration (mg/mL) |
|---|---|
| Example 126: | |
| Dopamine hydrochloride | 2 |
| Polyethylenimine (PEI) | 1.5 |
| Dexamethasone phosphate | 0.5 |
| Example 127: | |
| Dopamine hydrochloride | 2 |
| Polyethylenimine (PEI) | 1.5 |
| Dexamethasone phosphate | 0.8 |
| Example 128: | |
| Dopamine hydrochloride | 2 |
| Polyethylenimine | 1.5 |
| Dexamethasone phosphate | 0.8 |
| uhPDMA | 2 |
| Example 129: | |
| Dopamine hydrochloride | 2 |
| Polyethylenimine (PEI) | 1.5 |
| Dexamethasone phosphate | 0.8 |
| uhPDMA | 5 |
| Example 130: | |
| Dopamine hydrochloride | 2 |
| Polyethylenimine (PEI) | 1.5 |
| Estradiol | 0.16 |
| Example 131: | |
| Dopamine hydrochloride | 2 |
| Polyethylenimine (PEI) | 1.5 |
| Estradiol | 0.35 |
| Example 132: | |
| Dopamine hydrochloride | 2 |
| Polyethylenimine (PEI) | 1.5 |
| Estradiol | 0.5 |
| Example 133: | |
| Dopamine hydrochloride | 2 |
| Polyethylenimine (PEI) | 1.5 |
| Estradiol | 0.8 |
| uhPDMA | 2 |

TABLE 6-continued

| Examples of the Coatings Used for Testing Alternative Pharmaceutically Active Agents | |
|---|---|
| Component | Concentration (mg/mL) |
| Example 134: | |
| Dopamine hydrochloride | 2 |
| Polyethylenimine (PEI) | 1.5 |
| Estradiol | 0.8 |
| uhPDMA | 5 |

Figure 20:
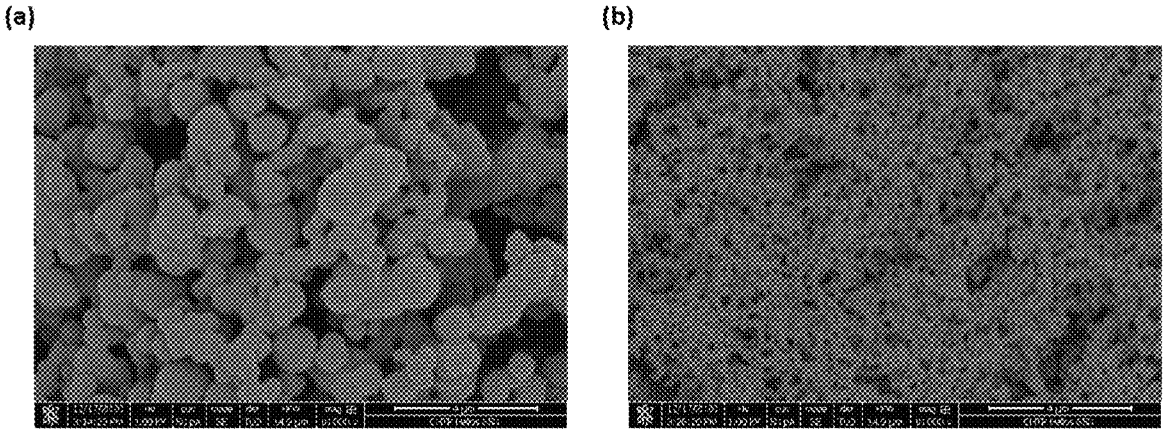
FIG. 20 shows representative SEM images of silicon wafer coated with (a) Example 126 and (b) Example 121 composition.

Surface analytical studies using scanning electron micrographs (SEM) showed that the coating formed on a substrate was uniform (see FIG. 20).

Figure 21:
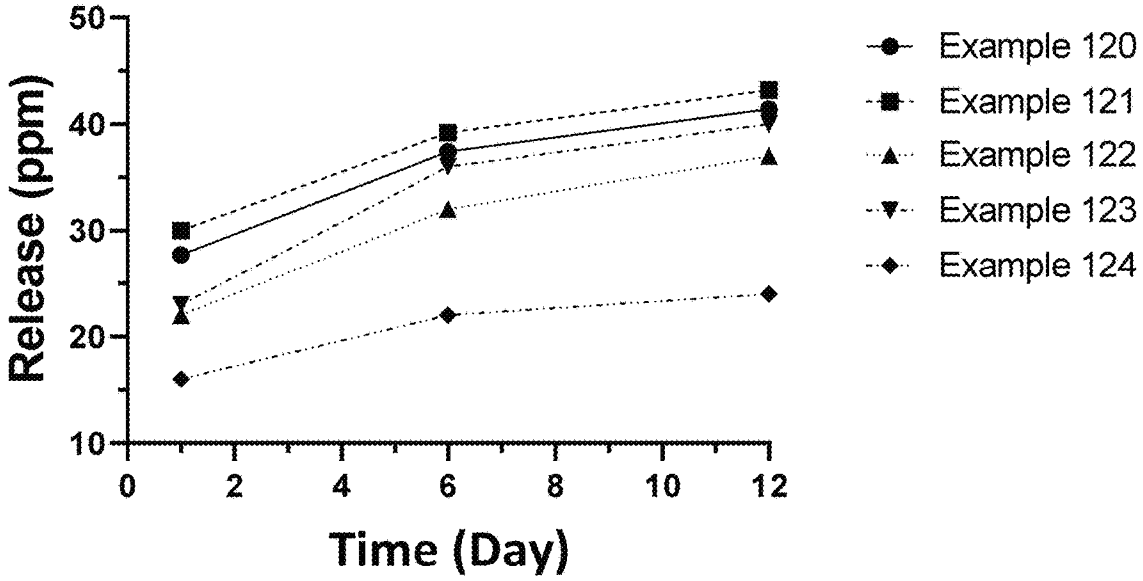
FIG. 21 shows the amount of docetaxel released from different docetaxel containing coatings (Examples 120-124).
Figure 22:
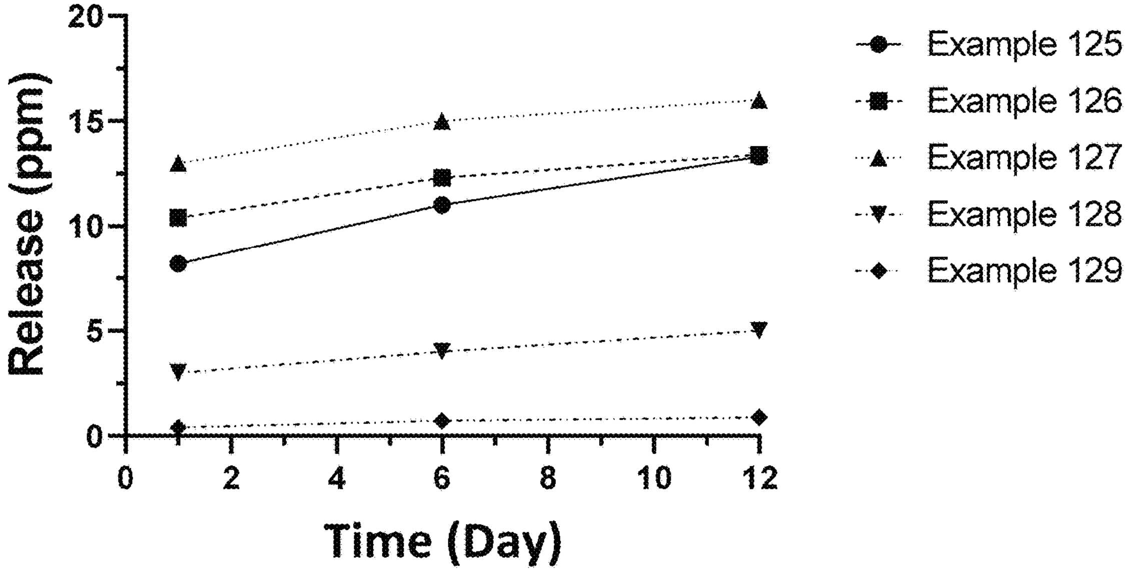
FIG. 22 shows the amount of estradiol released from different estradiol containing coatings (Examples 130-134).
Figure 23:
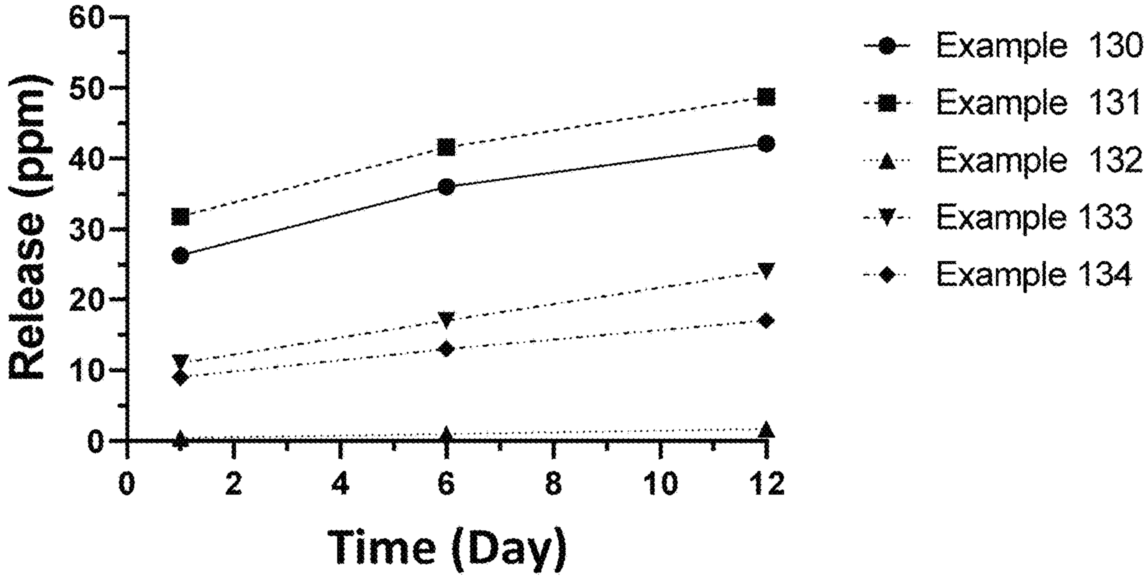
FIG. 23 shows the amount of dexamethasone released from different dexamethasone phosphate containing coatings (Examples 125-129).

The release of the pharmaceutically active agents from the coating is illustrated in FIGS. 21-23. Different amounts of pharmaceutically active agents were released from the coating in a time dependent fashion. Importantly the release of the coating can be controlled with different coating compositions. The data shows that various pharmaceutically active agents were incorporated in a single step process and can be released in a controlled fashion from the coating prepared.

The antifouling properties of the coatings was further tested using fluorescence microscopy of the bacteria attached to the surface of coatings formed based on (a) control (DA/PEI), (b) Example 121 and (c) Example 124. Bacteria (*E. coli*) ($1\times10^6$ CFU/mL) were cultured over substrate (silicon wafer) in LB media for 24 hr. The substrate was rinsed with PBS for 3 times and stained with Syto9/PI solution and visualized using fluorescent microscopy. The coating containing ultrahigh molecular weight polymer component (for example, uhPDMA) decreased the bacterial adhesion considerably compared to the control coatings without uhPDMA illustrating the anti-fouling property of the coating (images not shown). Furthermore, the fluorescence microscopy demonstrates the importance ultrahigh molecular weight polymer component in the coating. The coating is able to prevent bacterial adhesion, whereby the coating with uhPDMA incorporated showed enhanced reduction of bacterial adhesion and protein adsorption.

Example 11

Figure 24:
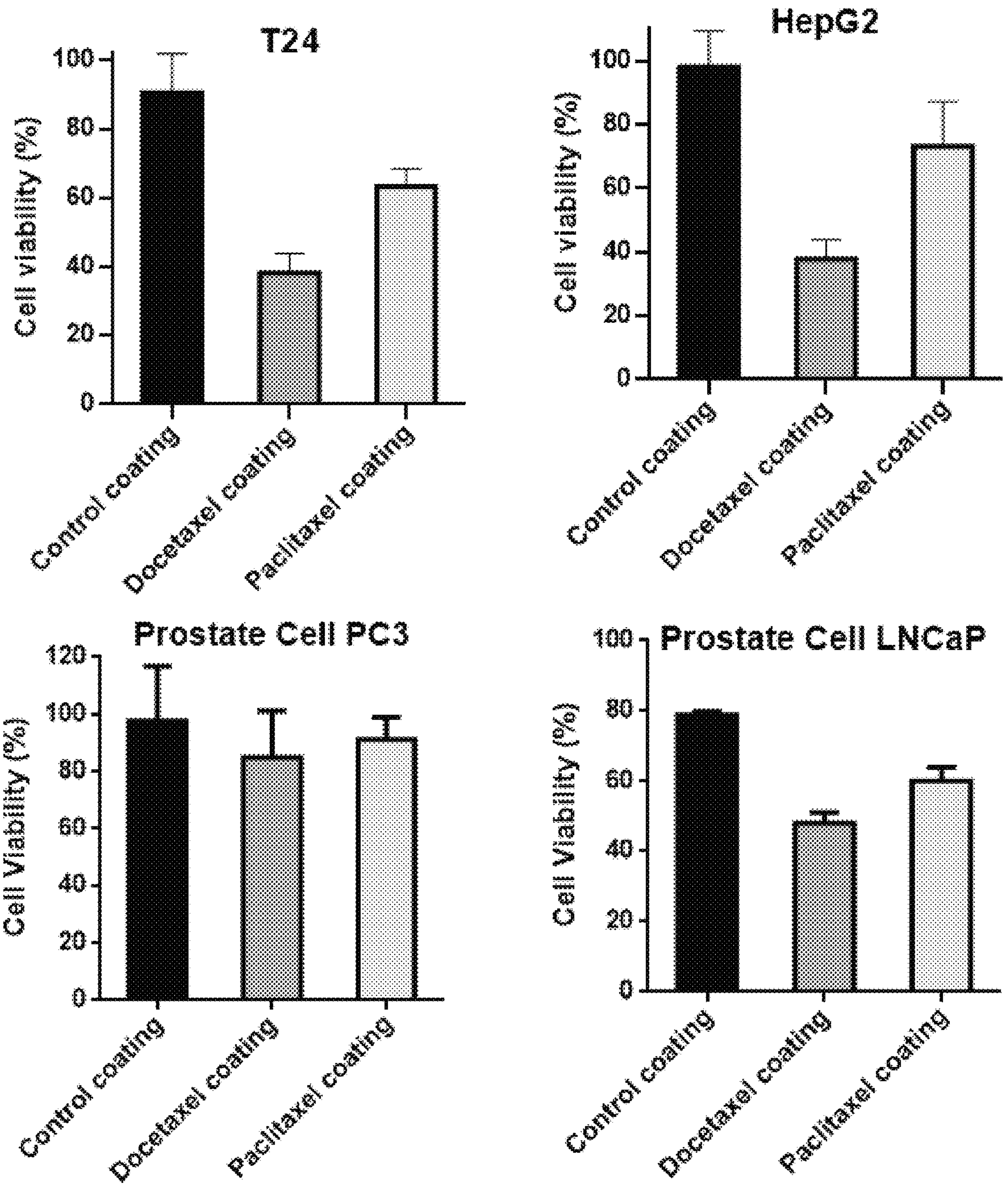
FIG. 24 shows anticancer activity of the pharmaceutically active agents released from the coating, where the panel shows the activity of the released drug on day 1 measured using T24, HepG2, prostate cell PC3 and LNCaP cells.

Pharmaceutically Active Agent Release from the Coating and Bioactivity Measurements of the Coatings The amount of released docetaxel, dexamethasone and paclitaxel was 12.5 ppm (microgram/mL), 0.64 ppm (microgram/mL) and 1.3 ppm (microgram/mL) respectively, at day 1. As shown in FIG. 24, the anticancer activity of the bioactive agents released from the coating on day 1 using T24, HepG2, PC3, LNCaP cells.

TABLE 7

Drug Elution Length and Media Used

| | Day 1 | | Day 7 | |
|---|---|---|---|---|
| Drug Treatment | RPMI | DMEM | RPMI | DMEM |
| Control | n = 2 | n = 2 | n = 2 | n = 2 |
| Docetaxel coating | n = 2 | n = 2 | n = 2 | n = 2 |
| Dexamethasone coating | n = 2 | n = 2 | n = 2 | n = 2 |
| Paclitaxel coating | n = 2 | n = 2 | n = 2 | n = 2 |

Example 12

Alternative Coating Methods Compared

Figure 25:
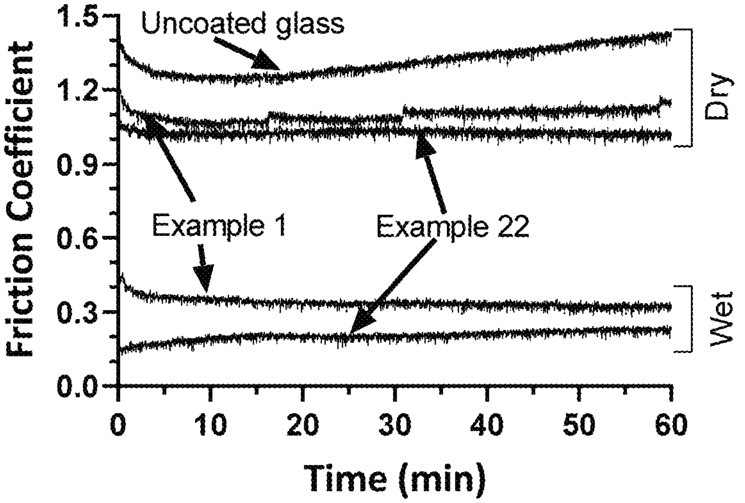
FIG. 25 shows the frictional coefficient of coated glass against PDMS ball in both wet and dry conditions. The example 1 does not have uhPMDA and Example 22 has uhPMDA incorporated within the coating. The presence of uhPDMA in the coating decreased the friction coefficient illustrating the lubricous property of the coated substrate.
Figure 26:
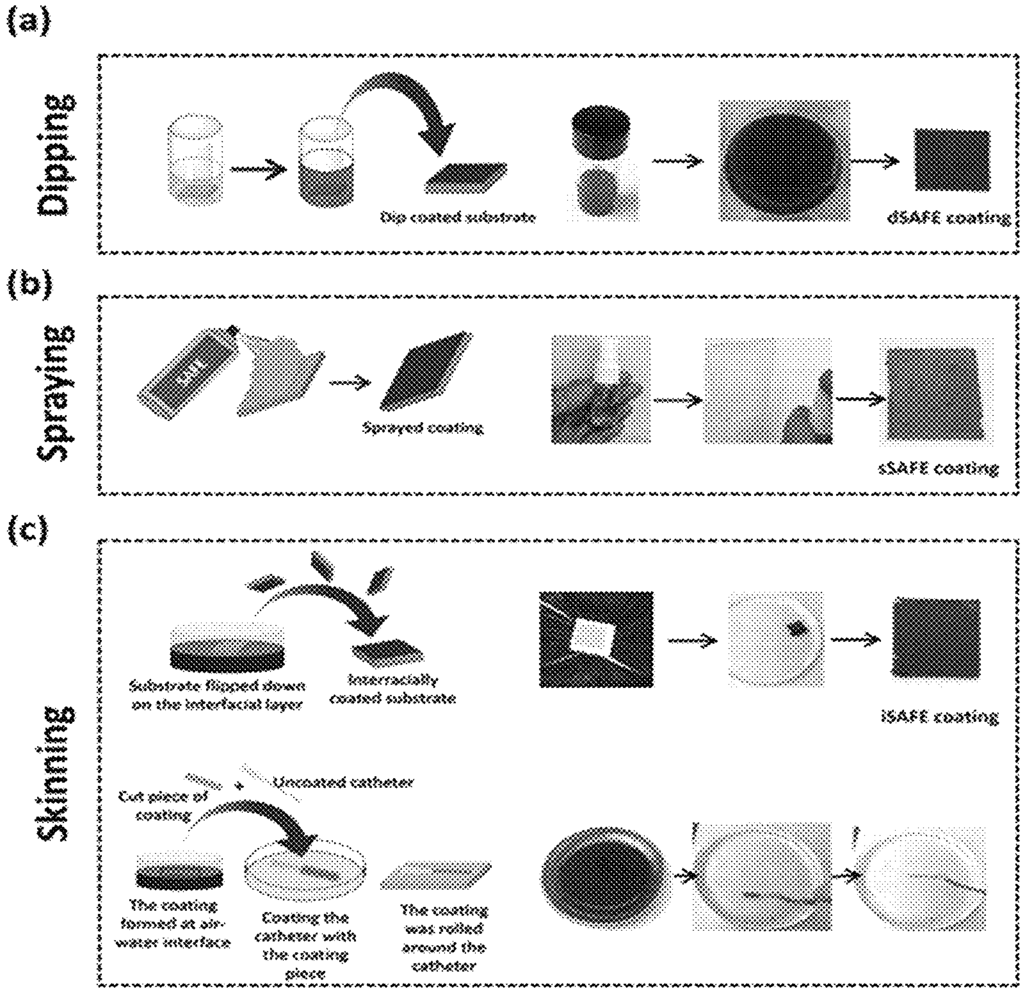
FIG. 26 shows an illustration of different coating methods including (a) dipping, (b) spraying and (c) skinning. Example 22 (with uhPDMA) can be applied to substrate via different coating processes including dipping, spraying and skinning

Different coating methods including (a) dipping, (b) spraying and (c) skinning are shown in FIG. 26. The example 22 (with uhPDMA) can be applied to substrate via different coating processes including dipping, spraying and skinning. The frictional coefficient of coated glass against PDMS ball in both wet and dry conditions was compared in FIG. 25. For Example 1 there is no uhPMDA, whereas Example 22 has uhPMDA incorporated within the coating. The presence of uhPDMA in the coating decreased the friction coefficient illustrating the lubricous property of the coated substrate.

Figure 27:
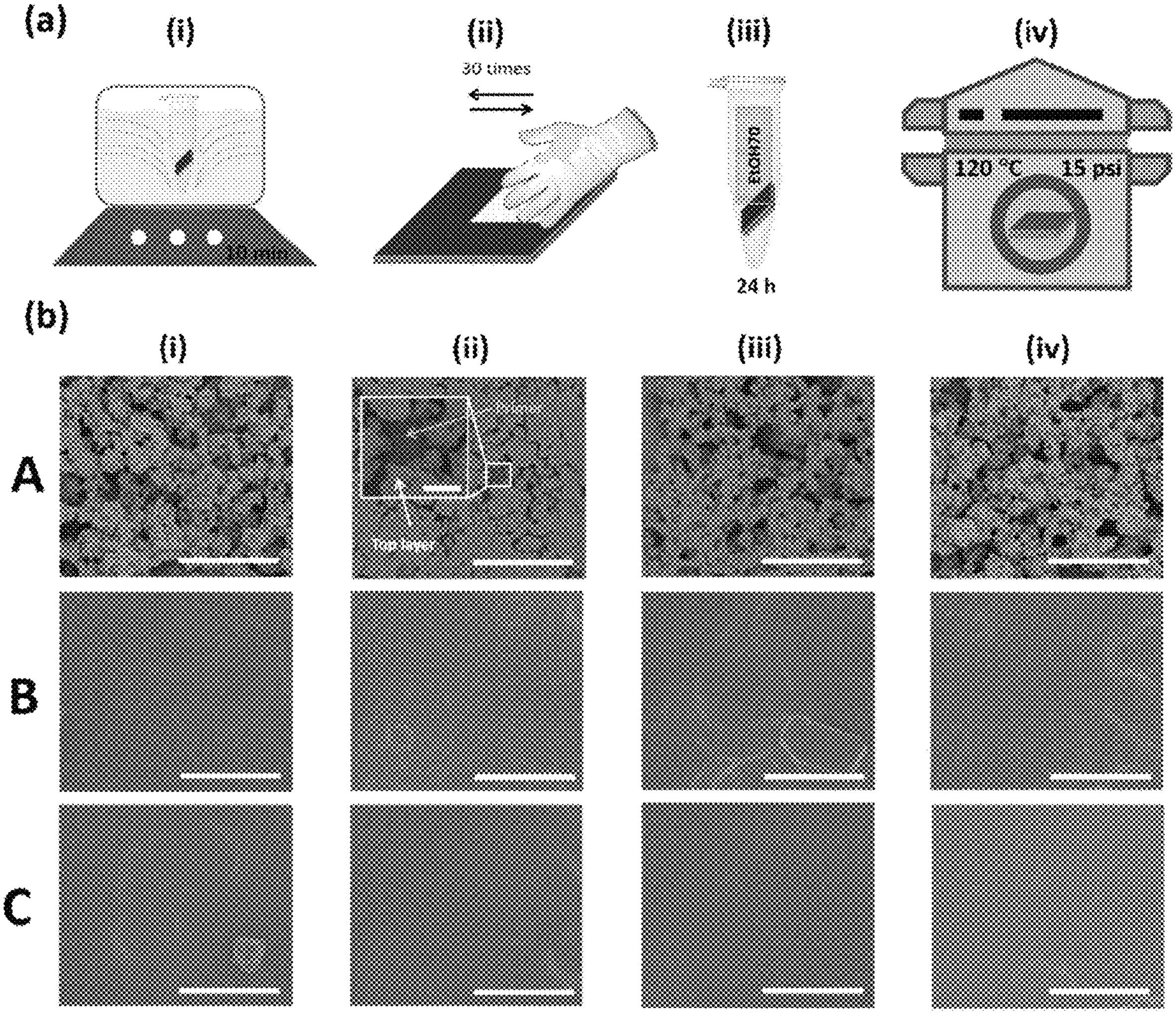
FIG. 27 shows (a) a schematic representing different testing conditions including (i) sonication for 10 min, (ii) back and forth rub-out, (iii) immersion in ethanol 70% for 24 h and (iv) autoclaving for 1 h at 120° C. and 15 psi; (b) SEM images of substrate coated with the composition containing uhPDMA via different methods (A: dip coated, B: spray coated and C: interfacially coated) after exposure to different testing conditions: (i) sonication for 10 min, (ii) back and forth rub-out, (iii) immersion in ethanol 70% for 24 h and (iv) autoclaving for 1 h at 120° C. and 15 psi. The scale bar is 5 μm. The percentage of reduction in bacterial attachment to the surface of original and exposed coatings (after different test conditions) including; (c) dip coated; (d) spray coated; and (e) interfacially coated substrate after 7 days incubation with *E. coli* ($1\times10^6$ CFU. mL-1, LB). The data confirm that the coatings formed in the presence of uhPDMA illustrate high mechanical robustness and robust antifouling activity.
Figure 27:
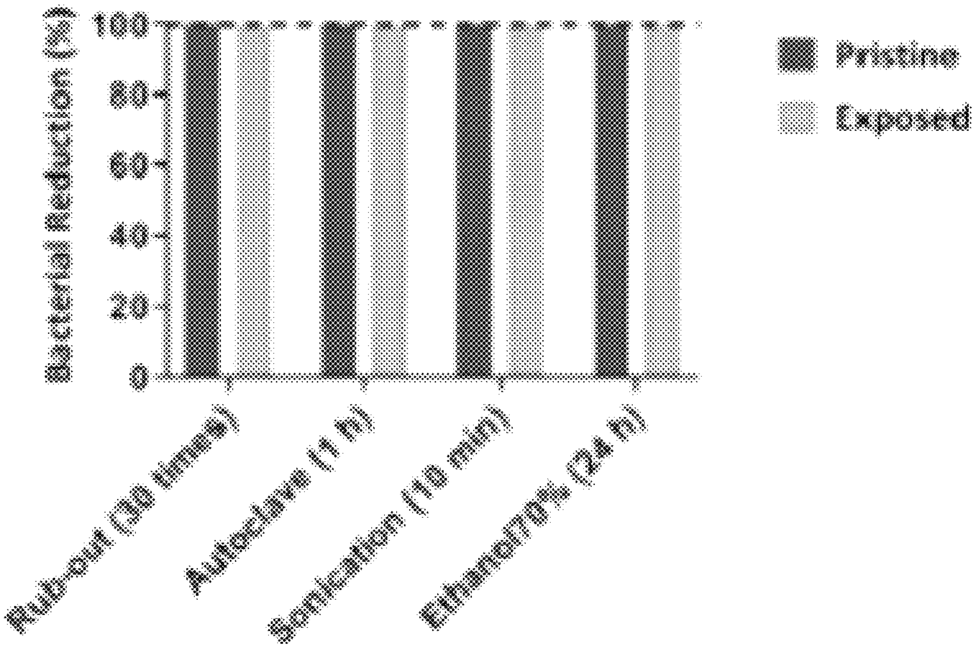
Figure 27:
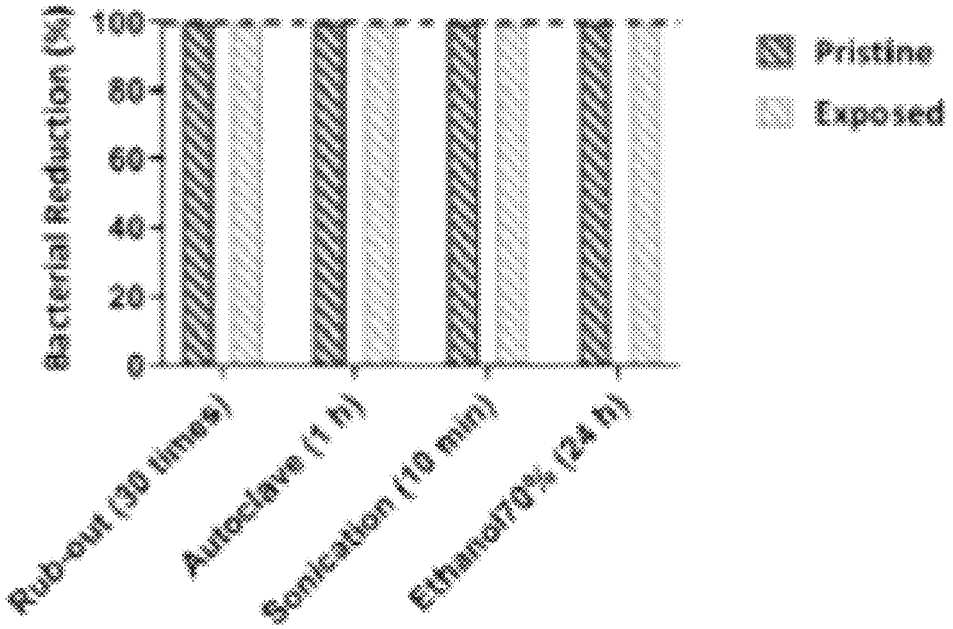
Figure 27:
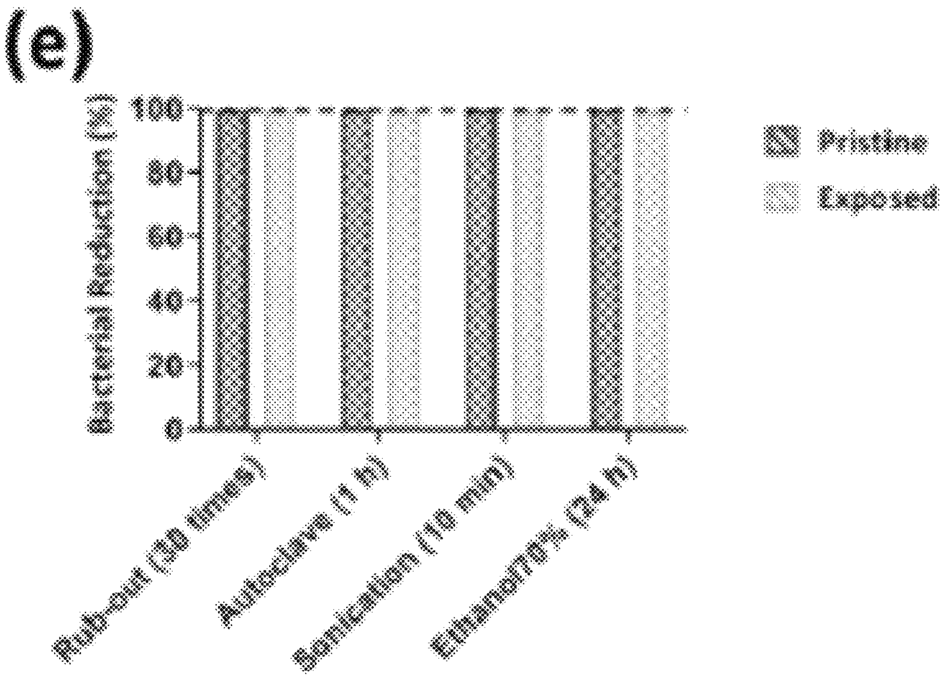

Different testing conditions including (i) sonication for 10 min, (ii) back and forth rub-out, (iii) immersion in ethanol 70% for 24 h and (iv) autoclaving for 1 h at 120° C. and 15 psi; (b) SEM images of substrate coated with the composition containing uhPDMA via different methods (A: dip coated, B: spray coated and C: interfacially coated) after exposure to different testing conditions: (i) sonication for 10 min, (ii) back and forth rub-out, (iii) immersion in ethanol 70% for 24 h and (iv) autoclaving for 1 h at 120° C. and 15 psi are shown in FIG. 27, whereby the percentage reduction in bacterial attachment to the surface of original and exposed coatings (after different test conditions) including (c) dip coated, (d) spray coated and (e) interfacially coated substrate after 7 days incubation with *E. coli* ($1\times10^6$ CFU. mL-1, LB) are also compared. This data confirms that the coatings formed in the presence of uhPDMA have high mechanical robustness and robust antifouling activity.

Example 13

Figure 28:
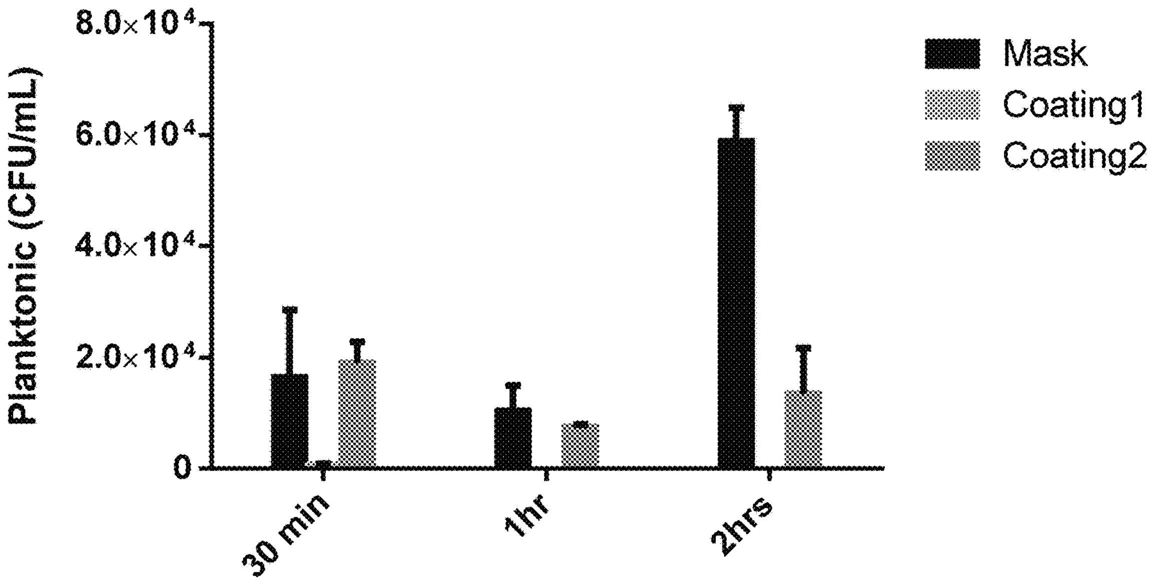
FIG. 28 shows a bar graph of antibacterial activity for a PDMA/PDA/Ag coating, with a reduction in planktonic bacteria concentration after exposing the uncoated and coated mask to *S. aureus* ($5\times10^4$ CFU/mL).
Figure 29:
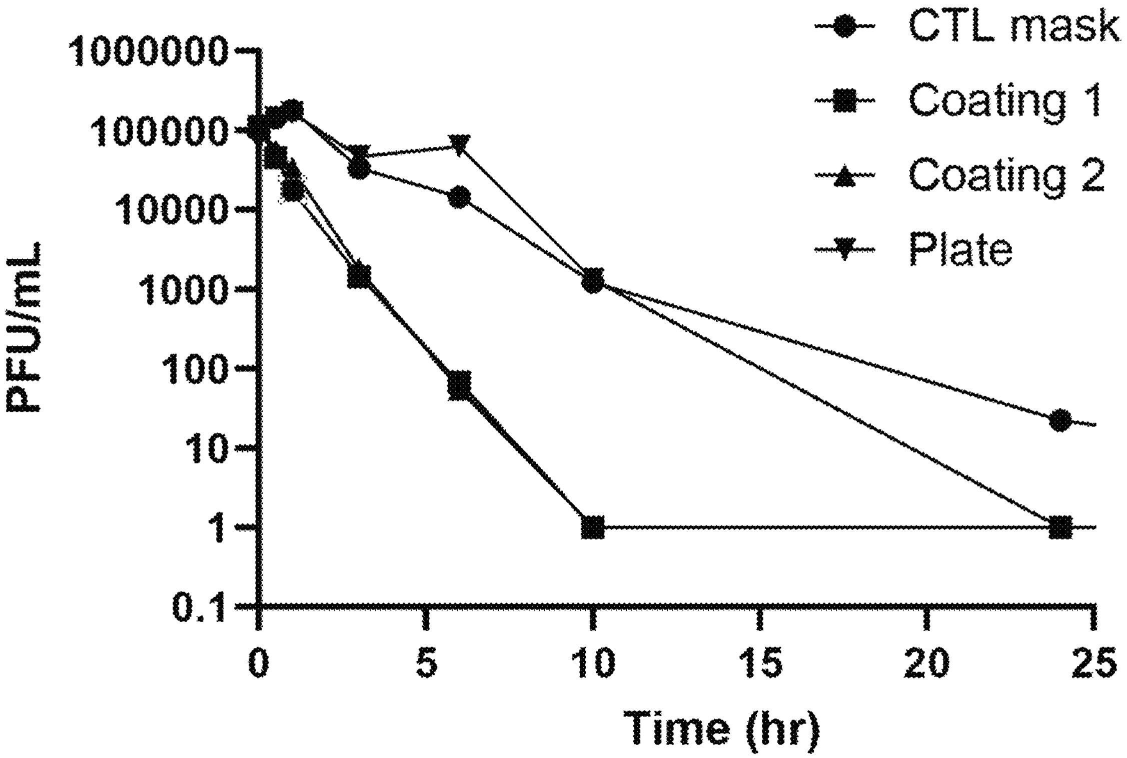
FIG. 29 shows a graph of antiviral activity of the PDDMA/PDA/Ag coating, with a reduction in virus concentration after exposing the uncoated and coated mask to Human coronavirus 229E (HCoV-229E).

Antiviral and Antibacterial Activity of the Coating with Three Components (PDA/uhPDMA/Ag) on Polypropylene Masks Two coatings (i.e. 1 and 2) showed a 100% and 27.6% anti-microbial killing efficiency at 1 hr., 100% and 77.1% at 2 hr., respectively, as compared to untreated mask (see FIG. 28). The same two coatings (i.e. 1 and 2) showed an anti-viral killing efficiency of 90% and 81.2% at 1 hr., 95.6% and 94.6% at 3 hr., 99.5% and 99.6% at 6 hr., respectively, as compared to untreated mask (see FIG. 29). Although the data shows some usefulness for the 3 component coatings, the three component system is specially designed for fast acting surfaces (for example, face masks) where faster silver or antimicrobial release may be needed. However, the amount of silver or drugs that can be incorporated seems to be limited in comparison to the 4 component system described herein (i.e. a low molecular weight cross-linking agent, wherein the cross linking agent is selected from polyethylenimine (PEI) and polyvinyl pyrrolidone (PVP), having a number average molecular weight of between about 0.7 kDa and about 4.0 kDa), and the thickness is also much thinner than the four component system, which is likely to have implications for durability and high contact surfaces.

Example 14

Figure 30:
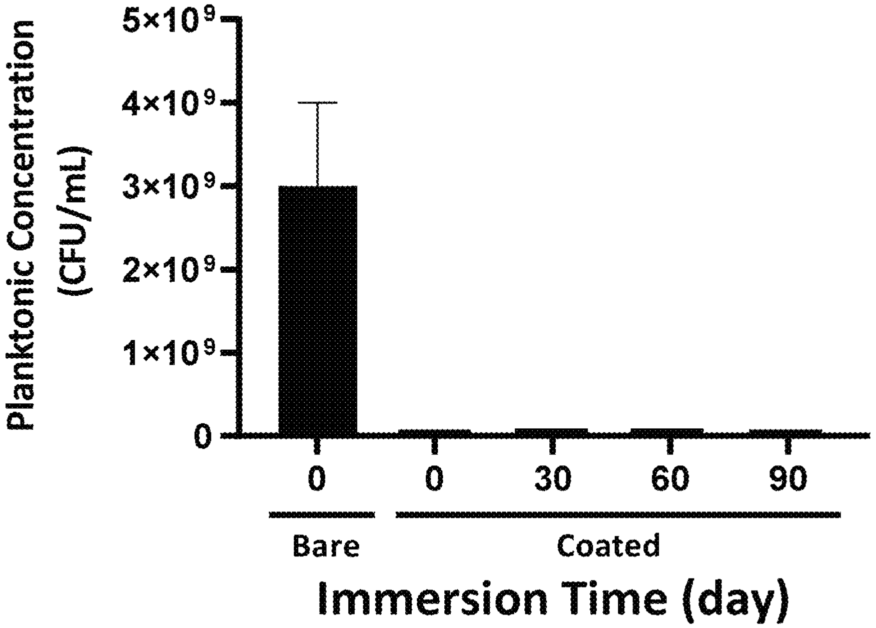
FIG. 30 shows (a) Number of *E. coli* planktonic bacteria grown in solution after 24 h incubation with the silicone catheter piece coated with uhPDMA/PDA/PEI/$AgNO_3$ after incubating at different periods of time, and (b) Killing efficiency (KE) of the silicone catheter pieces (1 cm) coated with uhPDMA/PDA/PEI/$AgNO_3$ after immersion in PBS for different periods including 0, 30, 60 and 90 days against *E. coli* (0.5 mL, $5\times10^5$ CFU/mL, LB, 24 h). Sustained long-term killing is shown by the coating.
Figure 30:
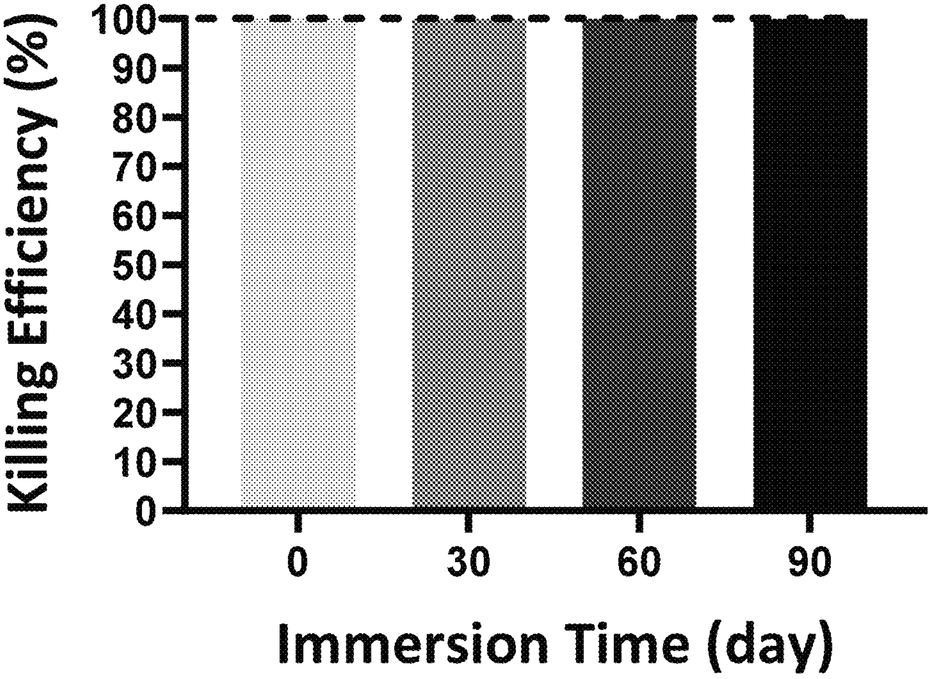
Figure 31:
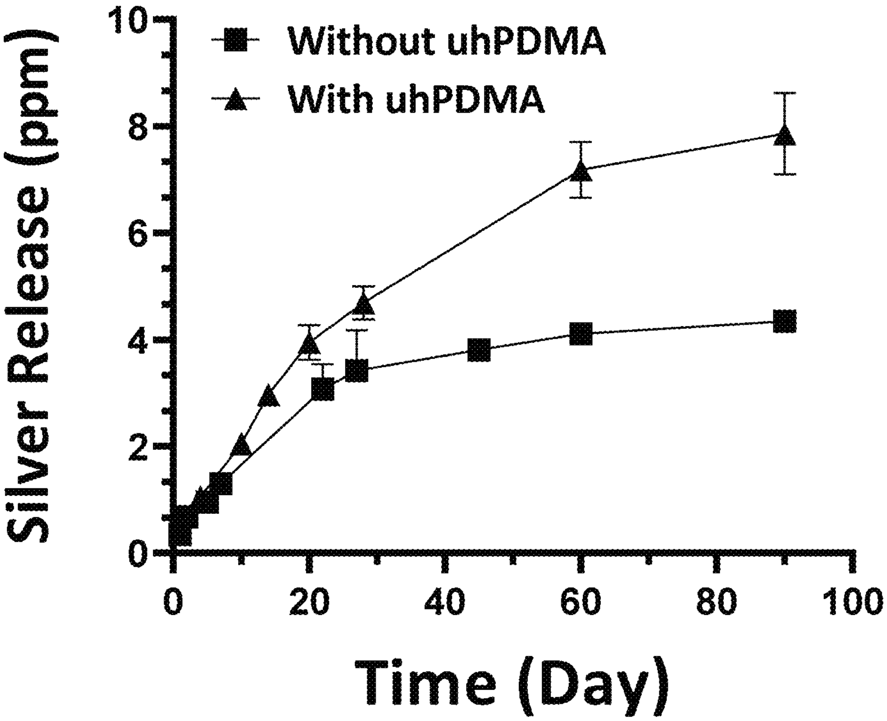
FIG. 31 shows the amount of silver ions released from the coatings formed in the absence and presence of uhPDMA. The composition consists of (PDA/PEI/$AgNO_3$) and (uhPDMA/PDA/PEI/$AgNO_3$) respectively. The silver content is measured using Inductively Coupled Plasma-Optical Emission Spectroscopy. Sustained long-term release of silver is shown.

Long-Term Antimicrobial Activity and Sustained Silver Release from the Coating with uhPDMA/PDA/PEI/$AgNO_3$) on Catheter Pieces Coatings on catheter pieces showed long-term antimicrobial activity when exposed to buffer conditions over 30, 60 and 90 days. Very high antimicrobial activity is demonstrated over long-term, and 100% or close to 100% killing efficiency is achieved on the coating compared to the uncoated substrate (see FIG. 30). The coating also showed sustained release of silver from the substrate over long-term (measured up to 90 days) using ICP measurements (see FIG. 31). These data demonstrate long-term activity as well sustained release of pharmaceutically active agent from the coating.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to an embodiment of the present invention. The invention includes all embodiments and variations substantially as hereinbefore described and with reference to the examples and drawings.

REFERENCES

1. SUNDARAM, Harihara S. et al. Advanced Materials Interfaces (2014) 1: 1400071.
2. HONG, Seonki et al. Advanced Functional Materials (2012) 22: 4711-4717.
3. DREYER, Daniel R. et al. Langmuir (2012) 28:6428-6435.
4. Diaz Blanco, C. et al. Building an antifouling zwitterionic coating on urinary catheters using an enzymatically triggered bottom-up approach. *ACS Appl. Mater. Interfaces* 6, 11385-11393 (2014).
5. Wu, C. et al. Active Antibacterial and Antifouling Surface Coating via a Facile One-Step Enzymatic Cross-Linking. *Biomacromolecules* 18, 210-216 (2017).
6. Mohan, T. et al. Highly Protein Repellent and Antiadhesive Polysaccharide Biomaterial Coating for Urinary Catheter Applications. *ACS Biomater. Sci. Eng.* 5, 5825-5832 (2019).
7. Vaterrodt, A. et al. Antifouling and Antibacterial Multifunctional Polyzwitterion/Enzyme Coating on Silicone Catheter Material Prepared by Electrostatic Layer-by-Layer Assembly. *Langmuir* 32, 1347-1359 (2016).
8. Yuan, P. et al. Substrate-Independent Coating with Persistent and Stable Antifouling and Antibacterial Activities to Reduce Bacterial Infection for Various Implants. *Adv. Healthc. Mater.* 8, 1-9 (2019).
9. Kurowska, M. et al. A Simultaneously Antimicrobial, Protein-Repellent, and Cell-Compatible Polyzwitterion Network. *Biomacromolecules* 18, 1373-1386 (2017).
10. Yong, Y. et al. Conformal Hydrogel Coatings on Catheters to Reduce Biofouling. *Langmuir* 35, 1927-1934 (2019).
11. Asha, A. B. et al. Rapid Mussel-Inspired Surface Zwitteration for Enhanced Antifouling and Antibacterial Properties. *Langmuir* 35, 1621-1630 (2019).
12. Cheng, H. et al. Mussel-Inspired Multifunctional Hydrogel Coating for Prevention of Infections and Enhanced Osteogenesis. *ACS Appl. Mater. Interfaces* 9, 11428-11439 (2017).
13. He, M. et al. Design of Antibacterial Poly(ether sulfone) Membranes via Covalently Attaching Hydrogel Thin Layers Loaded with Ag Nanoparticles. *ACS Appl. Mater. Interfaces* 9, 15962-15974 (2017).
14. Zhou, C. et al. In Vivo Anti-Biofilm and Anti-Bacterial Non-Leachable Coating Thermally Polymerized on Cylindrical Catheter. *ACS Appl. Mater. Interfaces* 9, 36269-36280 (2017).
15. Kwon, H. J. et al. Zwitterionic sulfobetaine polymer-immobilized surface by simple tyrosinase-mediated grafting for enhanced antifouling property. *Acta Biomater.* 61, 169-179 (2017).
16. Keum, H. et al. Prevention of bacterial colonization on catheters by a one-step coating process involving an antibiofouling polymer in water. *ACS Appl. Mater. Interfaces* 9, 19736-19745 (2017).
17. Cheng, G. et al. Zwitterionic carboxybetaine polymer surfaces and their resistance to long-term biofilm formation. *Biomaterials* 30, 5234-5240 (2009).
18. Zhao, C. & Zheng, J. Synthesis and characterization of poly(N-hydroxyethylacrylamide) for long-term antifouling ability. *Biomacromolecules* 12, 4071-4079 (2011).
19. Franco, A. R. et al. Antimicrobial coating of spider silk to prevent bacterial attachment on silk surgical sutures. *Acta Biomater.* 99, 236-246 (2019).
20. Yan, S. et al. Hierarchical Polymer Brushes with Dominant Antibacterial Mechanisms Switching from Bactericidal to Bacteria Repellent. *Biomacromolecules* 17, 1696-1704 (2016).
21. Peng, C., Vishwakarma, A., Mankoci, S., Barton, H. A. & Joy, A. Structure-Activity Study of Antibacterial Poly(ester urethane)s with Uniform Distribution of Hydrophobic and Cationic Groups. *Biomacromolecules* 20, 1675-1682 (2019).
22. Hizal, F. et al. Impact of 3D hierarchical nanostructures on the antibacterial efficacy of a bacteria-triggered self-defensive antibiotic coating. *ACS Appl. Mater. Interfaces* 7, 20304-20313 (2015).
23. Yan, S. et al. Nonleaching Bacteria-Responsive Antibacterial Surface Based on a Unique Hierarchical Architecture. *ACS Appl. Mater. Interfaces* 8, 24471-24481(2016).
24. Zhang, P. et al. Biofilm Inhibition and Elimination Regulated by Cationic Conjugated Polymers. *ACS Appl. Mater. Interfaces* 9, 16933-16938 (2017).
25. Yu, H. et al. Water-Insoluble Polymeric Guanidine Derivative and Application in the Preparation of Antibacterial Coating of Catheter. *ACS Appl. Mater. Interfaces* 10, 39257-39267 (2018).
26. Choudhary, P. & Das, S. K. Bio-Reduced Graphene Oxide as a Nanoscale Antimicrobial Coating for Medical Devices. *ACS Omega* 4, 387-397 (2019).
27. Gomez-Carretero, S., Nybom, R. & Richter-Dahlfors, A. Electroenhanced Antimicrobial Coating Based on Conjugated Polymers with Covalently Coupled Silver Nanoparticles Prevents *Staphylococcus aureus* Biofilm Formation. *Adv. Healthc. Mater.* 6, 1-10 (2017).

28. Watson, G. S. et al. A Simple Model for Binding and Rupture of Bacterial Cells on Nanopillar Surfaces. *Adv. Mater. Interfaces* 6, 1-8 (2019).
29. Wang, W., Lu, Y., Xie, J., Zhu, H. & Cao, Z. A zwitterionic macro-crosslinker for durable non-fouling coatings. *Chem. Commun.* 52, 4671-4674 (2016).
30. Pandit, S. et al. Vertically Aligned Graphene Coating is Bactericidal and Prevents the Formation of Bacterial Biofilms. *Adv. Mater. Interfaces* 5, 1-9 (2018).
31. Yu, K. et al. Anti-adhesive antimicrobial peptide coating prevents catheter associated infection in a mouse urinary infection model. *Biomaterials* 116, 69-81 (2017).
32. Xue, Q. et al. Anti-infective biomaterials with surface-decorated tachyplesin I. *Biomaterials* 178, 351-362 (2018).
33. Atefyekta, S., Pihl, M., Lindsay, C., Heilshorn, S. C. & Andersson, M. Antibiofilm elastin-like polypeptide coatings: functionality, stability, and selectivity. *Acta Biomater.* 83, 245-256 (2019).
34. Lim, K. et al. Development of a catheter functionalized by a polydopamine peptide coating with antimicrobial and antibiofilm properties. *Acta Biomater.* 15, 127-138 (2015).
35. Mishra, B., Lushnikova, T., Golla, R. M., Wang, X. & Wang, G. Design and surface immobilization of short anti-biofilm peptides. *Acta Biomater.* 49, 316-328 (2017).
36. Zhang, X. Y. et al. Antimicrobial Peptide-Conjugated Hierarchical Antifouling Polymer Brushes for Functionalized Catheter Surfaces. *Biomacromolecules* 20, 4171-4179 (2019).
37. Xu, L. C., Wo, Y., Meyerhoff, M. E. & Siedlecki, C. A. Inhibition of bacterial adhesion and biofilm formation by dual functional textured and nitric oxide releasing surfaces. *Acta Biomater.* 51, 53-65 (2017).
38. Pant, J. et al. A multi-defense strategy: Enhancing bactericidal activity of a medical grade polymer with a nitric oxide donor and surface-immobilized quaternary ammonium compound. *Acta Biomater.* 58, 421-431 (2017).
39. Ivanova, K. et al. Quorum-Quenching and Matrix-Degrading Enzymes in Multilayer Coatings Synergistically Prevent Bacterial Biofilm Formation on Urinary Catheters. *ACS Appl. Mater. Interfaces* 7, 27066-27077 (2015).
40. Escobar, A. et al. Antibacterial Layer-by-Layer Films of Poly(acrylic acid)—Gentamicin Complexes with a Combined Burst and Sustainable Release of Gentamicin. *Adv. Mater. Interfaces* 1901373, 1-9 (2019).
41. Escobar, A. et al. Antibacterial Mesoporous Titania Films with Embedded Gentamicin and Surface Modified with Bone Morphogenetic Protein 2 to Promote Osseointegration in Bone Implants. *Adv. Mater. Interfaces* 6, 1-12 (2019).
42. Zhuk, I. et al. Self-defensive layer-by-layer films with bacteria-triggered antibiotic release. *ACS Nano* 8, 7733-7745 (2014).
43. Wei, T., Yu, Q., Zhan, W. & Chen, H. A Smart Antibacterial Surface for the On-Demand Killing and Releasing of Bacteria. *Adv. Healthc. Mater.* 5, 449-456 (2016).
44. Rodríguez López, A. de L. et al. Preventing S. aureus biofilm formation on titanium surfaces by the release of antimicrobial β-peptides from polyelectrolyte multilayers. *Acta Biomater.* 93, 50-62 (2019).
45. Xu, L. C., Meyerhoff, M. E. & Siedlecki, C. A. Blood coagulation response and bacterial adhesion to biomimetic polyurethane biomaterials prepared with surface texturing and nitric oxide release. *Acta Biomater.* 84, 77-87 (2019).
46. Sadrearhami, Z. et al. Antibiofilm Nitric Oxide-Releasing Polydopamine Coatings. *ACS Appl. Mater. Interfaces* 11, 7320-7329 (2019).
47. Diefenbeck, M. et al. Gentamicin coating of plasma chemical oxidized titanium alloy prevents implant-related osteomyelitis in rats. *Biomaterials* 101, 156-164 (2016).
48. Albright, V. et al. Self-defensive antibiotic-loaded layer-by-layer coatings: Imaging of localized bacterial acidification and pH-triggering of antibiotic release. *Acta Biomater.* 61, 66-74 (2017).
49. Han, C. et al. Electrophoretic Deposition of Gentamicin-Loaded Silk Fibroin Coatings on 3D-Printed Porous Cobalt-Chromium-Molybdenum Bone Substitutes to Prevent Orthopedic Implant Infections. *Biomacromolecules* 18, 3776-3787 (2017).
50. Wang, B. et al. Construction of High Drug Loading and Enzymatic Degradable Multilayer Films for Self-Defense Drug Release and Long-Term Biofilm Inhibition. *Biomacromolecules* 19, 85-93 (2018).
51. Yu, M. et al. Facile Surface Multi-Functionalization of Biomedical Catheters with Dual-Microcrystalline Broad-Spectrum Antibacterial Drugs and Antifouling Poly(ethylene glycol) for Effective Inhibition of Bacterial Infections. *ACS Appl. Bio Mater.* 2, 1348-1356 (2019).
52. Chen, X. et al. Antibacterial Surgical Silk Sutures Using a High-Performance Slow-Release Carrier Coating System. *ACS Appl. Mater. Interfaces* 7, 22394-22403 (2015).
53. U.S. Pat. No. 8,541,060.
54. WO2011/005258.
55. U.S. Pat. No. 8,962,772
56. ZHANG, Yan et al. Langmuir (2012) 28:17585-17592.
57. LIU, Yunxiao et al. Langmuir (2014) 30:3118-3126.
58. HUANG, Renliang et al. Langmuir (2015) 31: 12061-12070.
59. WANG, Rong et al. J Biomed Mater Res Part B (2015) 103B:519-528.
60. Dreyer, D. R.; Miller, D. J.; Freeman, B. D.; Paul, D. R.; Bielawski, C. W. *Chem. Sci.* 2013, 4, 3796-3802.
61. Lynge, M. E.; van der Westen, R.; Postma, A.; Städler, B. *Nanoscale,* 2011, 3, 4916-4928.
62. Mei, Y. et al. *ACS Nano* 12, 11881-11891(2018).
63. Peña, B. et al. *Journal of Microscopy* 270, 302-308 (2018).
64. Smith, J. N. et al. *Part. Fibre Toxicol.* 15, 1-12 (2018).
65. Alizadeh, H., Salouti, M. & Shapouri, R. *Sci. Iran.* 20, 1035-1038 (2013).
66. Zhang, X. F., Shen, W. & Gurunathan, S. *Int. J. Mol. Sci.* 17, 1-26 (2016).
67. Wishart D S, Feunang Y D, Guo A C, Lo E J, Marcu A, Grant J R, Sajed T, Johnson D, Li C, Sayeeda Z, Assempour N, Iynkkaran I, Liu Y, Maciejewski A, Gale N, Wilson A, Chin L, Cummings R, Le D, Pon A, Knox C, Wilson M. DrugBank 5.0: a major update to the DrugBank database for 2018. Nucleic Acids Res. 2017 Nov. 8. doi: 10.1093/nar/gkx1037.

What is claimed is:

1. A composition, the composition comprising:

(a) a polymeric binder or a salt thereof, wherein a monomer of the polymeric binder has the following structure:

I

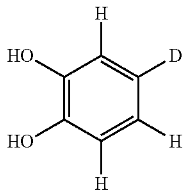

wherein,

D is selected from

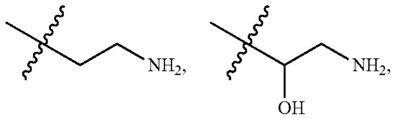,

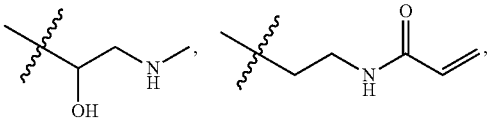,

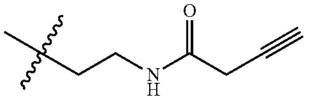 and

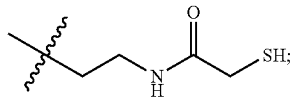;

(b) a high molecular weight polymer selected from a poly(N,N-dimethylacrylamide) (PDMA) polymer having a number average molecular weight of ≥200 kDa and a (2-ethyl-2-oxazoline) (POXZ) polymer having a number average molecular weight of ≥200 kDa;

(c) a pharmaceutically active agent; and (d) a low molecular weight cross-linking agent, wherein the cross linking agent is selected from polyethylenimine (PEI) and polyvinyl pyrrolidone (PVP), having a number average molecular weight of between about 0.7 kDa and about 4.0 kDa.

2. The composition of claim 1, wherein the pharmaceutically active agent is selected from one or more of: an anti-microbial agent; an anti-viral agent; an anti-fungal agent; an anti-cancer agent; an anti-inflammatory agent; an anti-fibrotic agent; and an analgesic agent.

3. The composition of claim 2, wherein the antimicrobial agent is silver nitrate ($AgNO_3$).

4. The composition of claim 3, wherein the $AgNO_3$ is at a concentration: between 0.2 mg/ml and 3 mg/ml; between 0.25 mg/ml and 2 mg/ml; between 0.3 mg/ml and 1 mg/ml; or of 0.5 mg/ml.

5. The composition of claim 1, wherein the high molecular weight polymer is poly(N,N-dimethylacrylamide) (PDMA) polymer.

6. The composition of claim 1, wherein the monomer of the polymeric binder is selected from: dopamine (DA); dopamine hydrochloride; and norepinephrine.

7. The composition of claim 1, wherein the ratio of the polymeric binder to the high molecular weight polymer is: between 2:2 and 2:200; between 2:2 and 2:15; between 2:2 and 2:10; or 2:5.

8. The composition of claim 1, wherein the high molecular weight polymer is: between 1 mg/ml and 10 mg/ml; between 2 mg/ml and 8 mg/ml; between 3 mg/ml and 7 mg/ml; between 4 mg/ml and 6 mg/ml; or 5 mg/ml.

9. The composition of claim 1, wherein the high molecular weight polymer has: a number average molecular weight of between ≥200 kDa and ≥1,000 kDa; a number average molecular weight of between ≥200 kDa and ≥800 kDa; or a number average molecular weight of 800 kDa.

10. The composition of claim 1, wherein the cross-linking agent is PEI.

11. The composition of claim 10, wherein the PEI has a number average molecular weight of between about 0.7 kDa and about 3.5 kDa.

12. The composition of claim 1, wherein the composition further comprises: an aqueous solution; a water soluble organic solvent; and/or a buffer.

13. The composition of claim 12, wherein the aqueous solution lacks a salt; wherein the aqueous solution contains an oxidizing agent; wherein the buffer has a pH of between 3 and 12; or wherein the buffer comprises a salt.

14. A coated substrate, the coated substrate comprising: a substrate coated with a composition of claim 1.

15. The coated substrate of claim 14, wherein the substrate is a plastic, a metal, a ceramic, a carbon based material, a metal oxide, a hydrogels, a biological tissue, a wood, a composite material or a cement.

16. The coated substrate of claim 14, wherein the substrate is poly(propylene) (PP); poly(urethane) (PU); poly(ethylene) (PE); unplasticized polyvinyl chloride (uPVC); plasticized polyvinyl chloride (pPVC); poly(imide) (PI); ethylene vinyl acetate (EVA); poly(tetrafluoroethylene) (PTFE); titanium dioxide ($TiO_2$), or silicon dioxide ($SiO_2$).

17. The coated substrate of claim 14, wherein the surface zeta potential (SZP) between −10 mV and 10 mV.

18. The composition of claim 1, wherein the composition has a zeta potential (SZP) between −10 mV and 10 mV.

19. A composition, the composition comprising:

(a) dopamine;

(b) PDMA having a number average molecular weight of 800 kDa;

(c) $AgNO_3$; and (d) PEI having a number average molecular weight of between about 0.7 kDa and about 4.0 kDa; or (a) dopamine;

(b) PDMA having a number average molecular weight of between about 800 kDa and about 925 kDa;

(c) docetaxel; and (d) PEI having a number average molecular weight of between about 0.7 kDa and about 4.0 kDa; or (a) dopamine;

(b) PDMA having a number average molecular weight of between about 800 kDa and about 925 kDa;

(c) paclitaxel; and (d) PEI having a number average molecular weight of between about 0.7 kDa and about 4.0 kDa.

20. The composition of claim 19, wherein the dopamine is at a concentration of 2 mg/mL, the PDMA having a number average molecular weight of 800 kDa is at a concentration of 5 mg/ml, the $AgNO_3$ is at a concentration of 0.5 mg/ml and the PEI having a number average molecular weight of between about 0.7 kDa and about 4.0 kDa is at a concentration of 1.5 mg/mL.

21. A composition, the composition comprising:

(a) a polymeric binder or a salt thereof, wherein a monomer of the polymeric binder has the following structure:

I

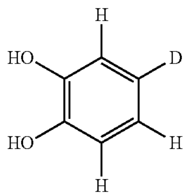

wherein,

D is selected from

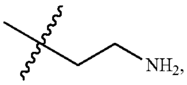,

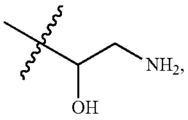,

-continued

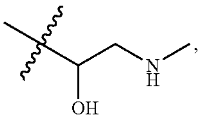,

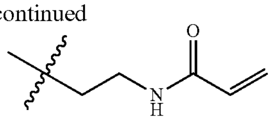,

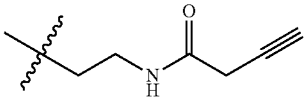

and

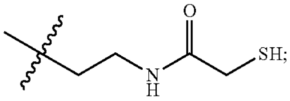;

(b) a high molecular weight polymer selected from a N,N-dimethylacrylamide (PDMA) polymer having a number average molecular weight of ≥200 kDa and a (2-ethyl-2-oxazoline) (POXZ) polymer having a number average molecular weight of ≥200 kDa;

(c) a pharmaceutically active agent; and (d) a low molecular weight cross-linking agent, wherein the cross-linking agent is selected from polyethylenimine (PEI) and polyvinyl pyrrolidone (PVP), having a number average molecular weight of between about 0.30 kDa and about 25 kDa.

* * * * *